United States Patent [19]
Nomura

[11] Patent Number: 6,115,392
[45] Date of Patent: Sep. 5, 2000

[54] COMMUNICATION CONTROL EQUIPMENT AND COMMUNICATION CONTROL METHOD

[75] Inventor: Takashi Nomura, Tokyo, Japan

[73] Assignee: Sony Corporation, Tokyo, Japan

[21] Appl. No.: 08/973,175

[22] PCT Filed: Apr. 4, 1997

[86] PCT No.: PCT/JP97/01178

§ 371 Date: Dec. 3, 1997

§ 102(e) Date: Dec. 3, 1997

[87] PCT Pub. No.: WO97/38513

PCT Pub. Date: Oct. 16, 1997

[30] Foreign Application Priority Data

Apr. 4, 1996 [JP] Japan ................................. 8-082545

[51] Int. Cl.[7] ............................................. H04J 3/16
[52] U.S. Cl. .................... 370/466; 370/401; 370/469; 370/492; 370/501; 348/555; 348/564
[58] Field of Search .................................. 370/401, 402, 370/465, 466, 467, 469, 492, 501; 455/5.1, 6.2; 348/8, 564, 555

[56] References Cited

U.S. PATENT DOCUMENTS 5,745,837   4/1998   Fuhrmann ............................. 455/5.1
5,808,660   9/1998   Sekine et al. .......................... 348/8
5,847,771   12/1998  Cloutier et al. ........................ 348/564

FOREIGN PATENT DOCUMENTS 6-311185   11/1994   Japan ........................... H04L 12/66

OTHER PUBLICATIONS

"Wide–Band ISDN and ATM Technology," Edited by IEICE, Supervised by Aoki et al., Feb. 20, 1995, IEICE, Tokyo, pp. 47–63; FIGS. 3.7, 3.17.

Nikkei Electronics 1996, No. 654, Jan. 29, 1996, Tokyo, pp. 113–120.

A. Anzaloni et al., "Fiber Channel FCS/ATM Interworking: Design and Performance Study," Proceedings of the Global Telecommunications Conference, vol. 3, Nov. 28, 1994, pp. 1801–1807.

A. Scheidegger et al., "International Between B–ISDN and N–ISDN Signalling," Interoperability in Broadband Networks, Jan. 1, 1994, pp. 260–271.

Primary Examiner—Douglas W. Olms
Assistant Examiner—Shick Hom
Attorney, Agent, or Firm—Limbach & Limbach LLP

[57] ABSTRACT

A communication control system capable of lessening burden (load) of the repeater and reducing the number of development steps of the system. Data of the ATM standard delivered to an ATM/1394 repeater 3 through an ATM network 2 from an ATM terminal 1 is converted into data of the IEEE 1394 standard by an ASEL 31. The data thus obtained is transmitted to a 1394 terminal 4. The data of the IEEE 1394 standard transmitted to the 1394 terminal 4 is converted into data of the ATM standard by an ASEL 32.

2 Claims, 46 Drawing Sheets

COMMUNICATION CONTROL EQUIPMENT AND COMMUNICATION CONTROL METHOD

TECHNICAL FIELD

This invention relates to a communication control equipment and a communication control method, and more particularly to a communication control equipment and a communication control method suitable when used, e.g., in video on demand system, etc. for providing multimedia data.

BACKGROUND ART

FIG. 1 shows one example of conceivable configuration of VOD (Video On Demand) system using the ATM (Asynchronous Transfer Mode) network at the backbone side and the IEEE (The Institute of Electrical and Electronic Engineers, Inc.) 1394 serial bus (IEEE 1394 Standards Draft 8.0v2) at the front end side.

An ATM terminal 1 is a server for storing video data, etc., and is connected to an ATM network 2 through UNI (User-Network Interface) to make an offer of video data to 1394 terminals 4-1 to 4-7 (hereinafter referred to as 1394 terminals 4 as occasion may demand when there is no necessity to individually discriminate between 1394 terminals 4-1 to 4-7). An ATM/1394 repeater 3 is connected to the ATM network 2 through UNI and serves to receive video data transmitted from the ATM terminal 1 via the ATM network 2 to make an offer thereof to the 1394 terminals 4 through the IEEE 1394 serial bus. The 1394 terminals 4 receive video data offered through the IEEE 1394 serial bus from the ATM/1394 repeater 3 to display them on respective display units such as CRT or LCD, etc.

In this VOD system, when the ATM terminal 1 carries out communication between the ATM terminal 1 and any 1394 terminal 4, protocol peculiar to ATM must be entirely terminated at the ATM/1394 repeater 3.

In the case where IP over ATM (hereinafter abbreviated as IP/ATM) is used as the standard protocol when, e.g., the ATM terminal 1 carries out transmission/reception of IP (Internet Protocol) packet between the ATM terminal 1 and the 1394 terminal 4, protocol stacks of the U (User) plane and the C (Control) plane of end to end are caused to respectively undergo layout as shown in FIGS. 2 and 3.

Namely, as shown in FIG. 2, the protocol stack of the U plane of the ATM network 2 consists of PHY (physical) layer and ATM layer. Accordingly, the protocol stack of the U plane of the ATM terminal 1 includes PHY layer and ATM layer in correspondence with the ATM network 2, and includes IP/ATM layer and IP layer for carrying out transmission/reception of IP packet. Further, between the ATM layer and the IP/ATM layer, the protocol stack of the U plane of the ATM terminal 1 includes AAL (ATM Adaptation Layer) 5 for carrying out matching/adjustment between data unit (user information from 1 byte up to 64 k bytes) of the high order (upper) application (IP/ATM layer) and user information of 48 bytes handled by cell in a unified manner.

In the protocol stack of the U plane of the ATM/1394 repeater 3, the ATM network 2 side is caused to be of structure similar to the ATM terminal 1. Namely, this protocol stack consists of PHY layer, ATM layer, AAL5 layer, IP/ATM layer and IP layer. On the other hand, the 1394 terminal 4 side is caused to be of structure similar to the protocol stack of the 1394 terminal 4 and consists of 1394 PHY layer, 1394 LINK layer and IP layer. There is no layer corresponding to the IP/ATM layer of the ATM network 2 side (Therefore, labeled null in FIG. 2) (It is to be noted that it is conceivable to place (allocate) protocol like IP/1394). The protocol stack of the U plane of the 1394 terminal 4 consists of 1394 PHY layer, 1394 LINK layer and IP layer.

Moreover, as shown in FIG. 3, the protocol stack of the C plane of the ATM terminal 1 consists of PHY layer, ATM layer, AAL5 layer, SSCF (Service Specific Coordination Function) (ITU (International Telecommunication Union)-TQ.2130)+SSCOP (Service Specific Connection Oriented Prtocol) (ITU-TQ.2110) layer, and Q.2931 (ITU-TQ.2931) layer. The protocol stack of the C plane of the ATM network 2 is caused to be of structure similar to the case of the ATM terminal 1.

In the protocol stack of the C plane of the ATM/1394 repeater 3, the ATM network 2 side is caused to be of structure similar to the case of the ATM terminal 1 and the ATM network 2. On the other hand, the 1394 terminal 4 side is caused to be of structure similar to the protocol stack of the 1394 terminal 4, and consists of 1394 PHY layer, 1394 LINK layer and Original Signaling Protocol layer. The protocol stack of the C plane of the 1394 terminal 4 consists of 1394 PHY layer, 1394 LINK layer and Original Signaling Protocol layer.

Since the concept of VPC (Virtual Pass Connection)/VCC (Virtual Channel Connection) does not exist between the ATM/1394 repeater 3 and the 1394 terminal 4 as shown in FIG. 2, it is conceivable to carry out handling of packet of the U plane by IP header. In that case, for the ATM/1394 repeater 3, routing function by IP is required.

Moreover, since the signaling protocol (Q.2931 layer and SSCF+SSCOP layer) used in UNI of the ATM network 2 cannot be applied between the ATM/1394 repeater 3 and the 1394 terminal 4 as shown in FIG. 3, it is necessary to peculiarly design original signaling protocol corresponding thereto to use such protocol.

However, in the ATM/1394 repeater 3, in the case where handling of packet of the U plane is carried out by using the routing function by IP, it is necessary to copy the entirety of IP packet including data to read therefrom information necessary for routing, resulting in the problem that burden (load) applied to the ATM/1394 repeater 3 is great.

In addition, there occurs the necessity of developing the original signaling protocol used between the ATM/1394 repeater 3 and the 1394 terminal 4 from the first stage. To realize this, great amount of investment is required, resulting in the problem that such approach was not realistic.

DISCLOSURE OF THE INVENTION

This invention has been made in view of such circumstances, and its object is to have ability to lessen the burden on a repeater when transmission/reception of data of different transmission standards is carried out between terminals through the repeater, and to reduce the development steps of the system.

A communication control equipment according to this invention comprises: first converting means for converting data of a second transmission standard received through a repeater into data of a first transmission standard; and second converting means for converting predetermined data of the first transmission standard into data of the second transmission standard.

A communication control method according to this invention comprises: a step of converting data of a first transmission standard received through a repeater into data of a second transmission standard; and a step of converting predetermined data of the second transmission standard into data of the first transmission standard.

Another communication control equipment according to this invention comprises: first converting means for converting data of a first transmission standard transmitted from a first terminal into data of a second transmission standard; second converting means for converting data of the second transmission standard transmitted from a second terminal into data of the first transmission standard; and processing means for processing, by the same signaling protocol as the signaling protocol that the first terminal has, the data of the first transmission standard transmitted from the first terminal and the data of the first transmission standard converted by the second converting means.

Another communication control method according to this invention comprises: a first conversion step of converting data of a first transmission standard transmitted from a first terminal into data of a second transmission standard; a second conversion step of converting data of the second transmission standard transmitted from a second terminal into data of the first transmission standard; and a processing step of processing, by the same signaling protocol as the signaling protocol that the first terminal has, the data of the first transmission standard transmitted from the first terminal and the data of the first transmission standard converted by the second converting means.

Yet another communication control equipment according to this invention is adapted so that the repeater comprises first converting means for converting data of a first transmission standard transmitted from a first terminal into data of a second transmission standard, and second converting means for converting data of the second transmission standard transmitted from a second terminal into data of the first transmission standard; and the second terminal comprises third converting means for converting the data of the second transmission standard which has been caused to undergo transmission (transmitted) from the repeater into data of the first transmission standard, and fourth converting means for converting predetermined data of the first transmission standard into data of the second transmission standard.

Yet another communication control method according to this invention is adapted so that a processing procedure by the repeater comprises a step of converting data of a first transmission standard transmitted from a first terminal into data of a second transmission standard to carry out transmission thereof (transmit it) to a second terminal, and a step of converting data of the second transmission standard transmitted from the second terminal into data of the first transmission standard to carry out transmission thereof (transmit it) to the first terminal; and a processing procedure by the second terminal comprises a step of converting the data of the second transmission standard which has been caused to undergo transmission (transmitted) through the repeater into data of the first transmission standard, and a step of converting predetermined data of the first transmission standard into data of the second transmission standard to carry out transmission thereof (transmit it) to the repeater.

A communication control equipment according to this invention comprises setting means for setting, in advance, by using predetermined control commands, communication channel (path) for transferring data of the transmission standard that the terminal and any other terminal carry out transmission/reception therebetween through the repeater or directly therebetween.

A communication control method according to this invention comprises a step of setting, in advance, by using predetermined control commands, communication channel (path) for transferring data of the transmission standard that the terminal and any other terminal carry out transmission/reception therebetween through the terminal or directly therebetween.

In the communication control equipment according to this invention, the first converting means converts data of the first transmission standard received through the repeater into data of the second transmission standard, and the second converting means converts predetermined data of the second transmission standard into data of the first transmission standard.

In the communication control method according to this invention, data of the first transmission standard received through the repeater is converted into data of the second transmission standard, and predetermined data of the second transmission standard is converted into data of the first transmission standard.

In the communication control equipment and the communication control method according to this invention, data of the first transmission standard transmitted from the first terminal and data of the first transmission standard converted by the second converting means are processed by the same signaling protocol as the signaling protocol that the first terminal has.

In the communication control equipment according to this invention, at the repeater, the first converting means converts data of the first transmission standard transmitted from the first terminal into data of the second transmission standard, and the second converting means converts data of the second transmission standard transmitted from the second terminal into data of the first transmission standard. In addition, at the second terminal, the third converting means converts data of the second transmission standard which has been caused to undergo transmission (transmitted) from the repeater into data of the first transmission standard, and the fourth converting means converts predetermined data of the first transmission standard into data of the second transmission standard.

In the communication control method according to this invention, the repeater converts data of the first transmission standard transmitted from the first terminal into data of the second transmission standard to carry out transmission thereof (transmit it) to the second terminal, and converts data of the second transmission standard transmitted from the second terminal into data of the first transmission standard to carry out transmission thereof (transmit it) to the second terminal. The second terminal converts the data of the second transmission standard which has been caused to undergo transmission (transmitted) through the repeater into data of the first transmission standard, and converts predetermined data of the first transmission standard into data of the second transmission standard to carry out transmission thereof (transmit it) to the repeater.

In the communication control equipment and the communication control method according to this invention, the communication channel (path) for transferring data of the transmission standard that the terminal and any other terminal carry out transmission/reception is set in advance by using predetermined control commands therebetween through the repeater or directly therebeteen.

While the embodiments of this invention will now be described, the features of this invention will be described in a manner as below prior to the description of the embodiments of this invention in the state where corresponding embodiments (one example in this case) are added to the inside of parentheses after respective means in order to clarify the correspondence relationship between respective means of the inventions described in the patent claims and the following embodiments.

A communication control equipment according to this invention comprises first converting means (e.g., ASEL 32 of FIG. 54) for converting data of the second transmission standard (e.g., IEEE 1394 standard) received through the repeater (e.g., ATM/1394 repeater 3 of FIG. 4) into data of the first transmission standard (e.g., ATM standard), and second converting means (e.g., ASEL 32 of FIG. 54) for converting predetermined data of the first transmission standard into data of the second transmission standard.

The communication control equipment according to this invention further comprises processing means (e.g., layer 36 of FIG. 55) for processing data of the first transmission standard by the same signaling protocol as signaling protocol that the terminal has.

A communication control equipment according to this invention comprises first converting means (e.g, ASEL 33 of FIG. 55) for converting data of the first transmission standard (e.g., standard of ATM) transmitted from the first terminal (e.g., ATM terminal 1 of FIG. 4) into data of the second transmission standard (e.g., standard of IEEE 1394), second converting means (e.g., ASEL 33 of FIG. 55) for converting data of the second transmission standard transmitted from the second terminal (e.g., 1394 terminal 4-1 of FIG. 4) into data of the first transmission standard, and processing means (e.g., layer 35 of FIG. 55) for processing, by the same signaling protocol as the signaling protocol that the first terminal has, the data of the first transmission standard transmitted from the first terminal and the data of the first transmission standard converted by the second converting means.

The communication control equipment according to this invention further comprises repeater means (e.g., ASEL 31 of FIG. 54) such that in the case where plural second terminals (e.g., 1394 terminals 22-1 and 23-1 of FIG. 4) are connected onto different transmission channels (paths) of the second transmission standard, it repeats data of the second transmission standard in the U-plane which is caused to undergo transmission/reception between the plural second terminals.

The communication control equipment according to this invention further comprises repeater means (e.g., ASEL 31 of FIG. 54) such that in the case where plural second terminals (e.g., 1394 terminals 22-1 and 22-2 of FIG. 4) are connected onto the same transmission channel (path) of the second transmission standard, it allows data of the second transmission standard in the U-plane which is caused to undergo transmission/reception between the plural second terminals to be substantially therethrough to repeat it.

A communication control equipment according to this invention is such that the repeater (e.g., ATM/1394 repeater 3 of FIG. 4) comprises first converting means (e.g., ASEL 31 of FIG. 54) for converting data of the first transmission standard (e.g., standard of ATM) transmitted from the first terminal (e.g., ATM terminal 1 of FIG. 4) into data of the second transmission standard (e.g., standard of IEEE 1394), and second converting means (e.g., ASEL 31 of FIG. 54) for converting data of the the second transmission standard transmitted from the second terminal (e.g., 1394 terminal 4-1 of FIG. 4) into data of the first transmission standard; and the second terminal comprises third converting means (e.g., ASEL 32 of FIG. 54) for converting data of the second transmission standard which has been caused to undergo transmission (transmitted) from the repeater into data of the first transmission standard, and fourth converting means for converting predetermined data of the first transmission standard into data of the second transmission standard.

A communication control equipment according to this invention comprises setting means for setting, in advance, by predetermined control commands, communication channel (path) for transferring data of the transmission standard that the terminal (e.g., 1394 terminal 4-1 of FIG. 4) and another terminal (e.g., 1394 terminal 4-2 of FIG. 4) carry out transmission/reception therebetween through the repeater (e.g., ATM/1394 repeater 3 of FIG. 4) or directly therebetween.

It is to be noted that the aforesaid description does not mean that the respective means are limited to the above-described components.

BEST MORE FOR CARRYING OUT THE INVENTION

Figure 1:
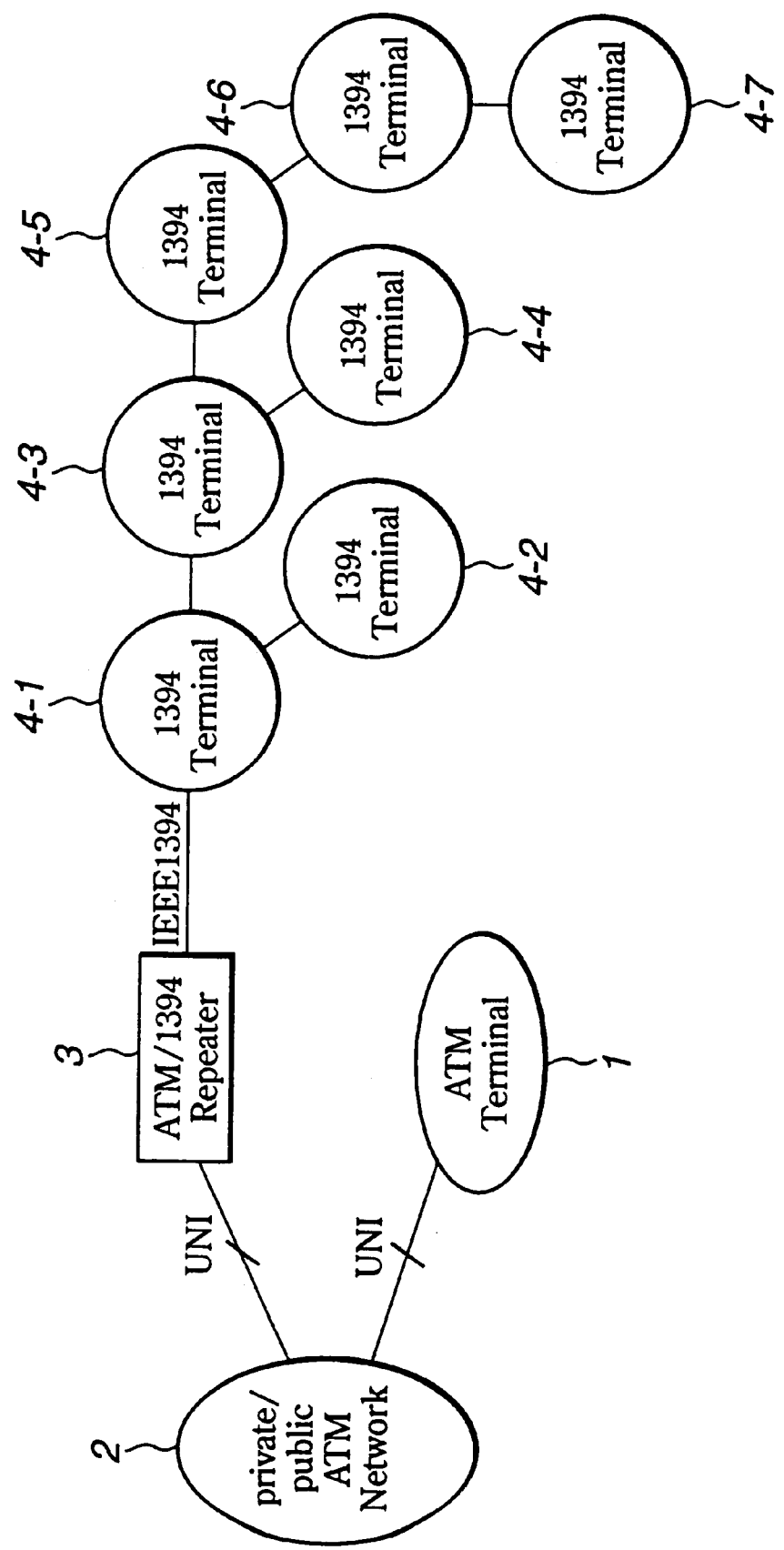
FIG. 1 is a view showing an example of the configuration of a conventional VOD system.
Figure 2:
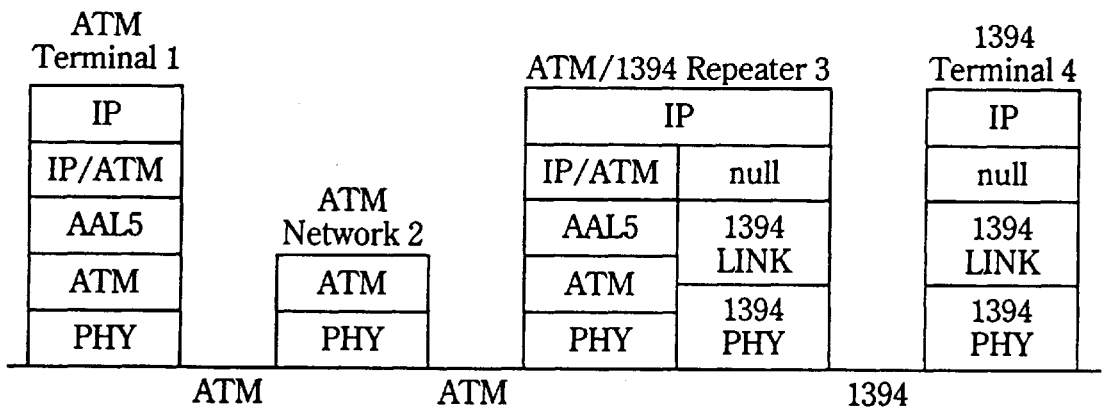
FIG. 2 is a view showing protocol stack of U plane conceivable when IP/ATM is used.
Figure 3:
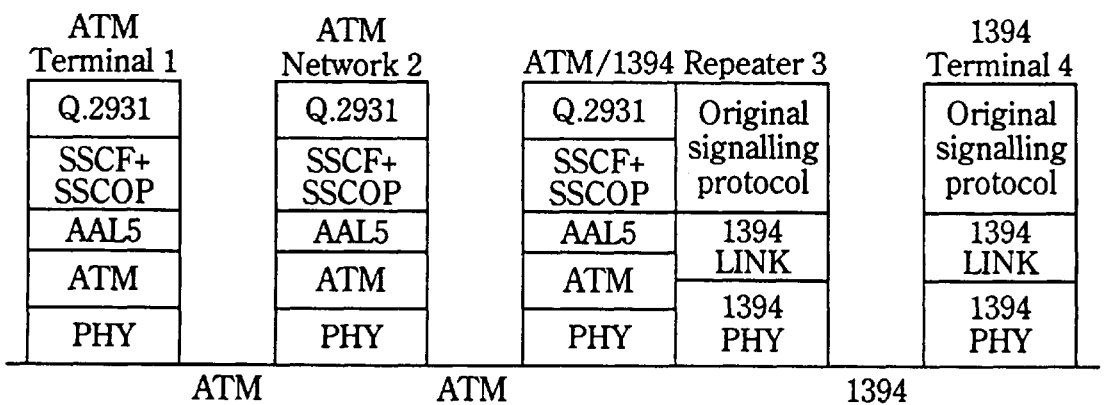
FIG. 3 is a view showing protocol stack of C plane conceivable when IP/ATM is used.
Figure 4:
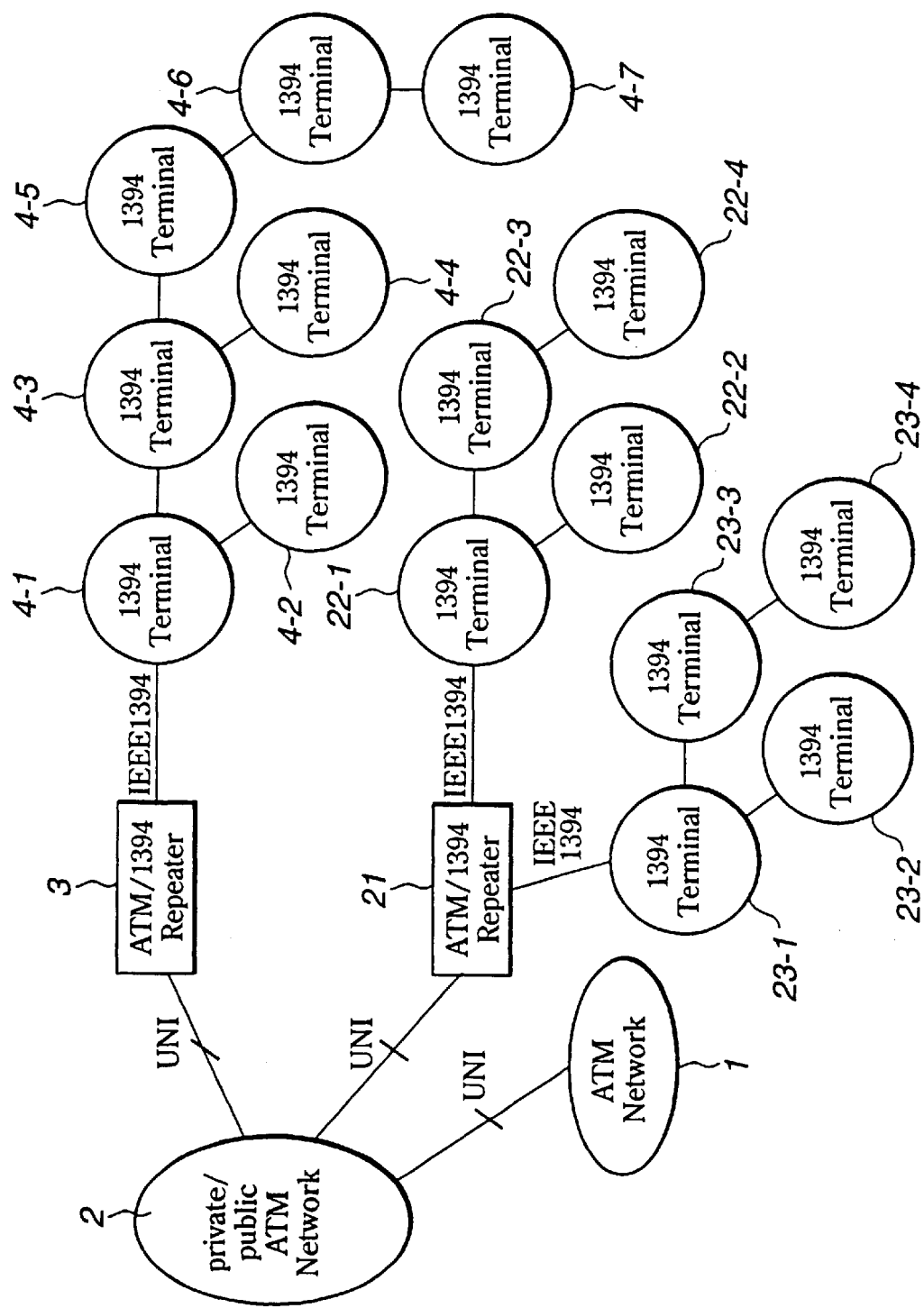
FIG. 4 is a view showing an example of the configuration of VOD system to which a communication control equipment of this invention is applied.

FIG. 4 shows an example of the configuration of the VOD system to which this invention is applied. Similarly to the case shown in FIG. 1, ATM (Asynchronous Transfer Mode) network is used at the backbone side and IEEE 1394 serial bus (IEEE 1394 Standards Draft 8.0v2) is used at the front end side.

ATM terminal 1 is a server for storing video data. This server 1 is connected to ATM network 2 through UNI (User-Network Interface) and is adapted to carry out offer of video data, etc. ATM/1394 repeater 3 is connected to the ATM network 2 through UNI, and is adapted to receive video data from the ATM terminal 1 via the ATM network 2 to make an offer thereof to 1394 terminals 4-1 to 4-7 (When there is no necessity to individually discriminate between 1394 terminals 4-1 to 4-7, they will be hereinafter referred to as 1394 terminals 4 as occasion may demand). The ATM/1394 terminals 4 serve to receive video data provided through the IEEE 1394 serial bus from the ATM/1394 repeater 3 to display them on respective display devices such as CRT or LCD, etc.

Similarly, an ATM/1394 repeater 21 is connected to the ATM network 2 through UNI, and serves to receive video data from the ATM terminal 1 via the ATM network 2 to make an offer thereof to 1394 terminals 22-1 to 22-4 (When there is no necessity to individually discriminate between the 1394 terminals 22-1 to 22-4, they will be hereinafter referred to as 1394 terminals 22 as occasion may demand). The 1394 terminals 22 serve to receive video data provided through the IEEE 1394 serial bus from the ATM/1394 repeater 21 to display them on respective display devices such as CRT or LCD, etc.

To the ATM/1394 repeater 21, 1394 terminals 23-1 to 23-4 are also connected through IEEE 1394 serial bus (serial bus of the system different from that of the IEEE 1394 serial bus to which the 1394 terminals 22 are connected). From the ATM terminal 1, video data are provided (offered) also to these 1394 terminals.

As the connection system of the IEEE 1394 serial bus, both "daisy chain" and "node branch" may be used. In the case of the daisy chain system, as far as 16 number of 1394 terminals (nodes (equipments having 1394 ports)) can be connected, and the maximum length between the terminals is prescribed by the IEEE 1394 standard requirements so that it is caused to be 4.5 meters or less. In the case where the node branch system is used in combination, 63 number of 1394 terminals can be connected at the maximum in accordance with the standard requirements.

The limitation of the number of terminals to be connected in accordance with daisy chain system is based on delay in transmission between terminals of the both ends. Moreover, in the IEEE 1394 standard, bus ID No. is designated by 10 bits of 16 bits for node ID, and Physical ID No. is designated by 6 bits. With respect to one bus, 0 to 62 of Physical ID Nos. can be assigned to the 1394 terminals, and the maximum number of terminals to be connected becomes equal to 63. Since 63 which is the last physical ID No. is used for broadcast, it cannot be assigned to physical ID Nos. with respect to individual terminals.

On the other hand, as the bus ID No., values of 0 to 1022 can be assigned to respective buses. Since 1023 which is the last bus ID No. is used for broadcast, it cannot be assigned to bus ID Nos. with respect to individual buses. Namely, the number of buses can be extended up to 1023 at the maximum. Accordingly, 64449 (=1023×63) nodes can be connected at the maximum within one system.

Each node receives packet sent to the own (self) node ID No. and packet equal in the bus ID No. or sent (addressed) to the Physical ID No. 63 which is broadcast.

Moreover, the 1394 terminals are capable of carrying out plug-in/plug-out of the cable of the IEEE 1394 standard in the state where power is turned ON, i.e., the equipment is operative. At the time point when node is supplemented or deleted, or also at the time when power is turned ON, the 1394 terminals automatically carry out reconstruction of the 1394 network to set the node ID numbers for a second time with respect to respective nodes.

Explanation will now be given in connection with a method of mounting respective layers for carrying out emulation of AAL (ATM Adaptation Layer)/ATM layer (ITU-TI. 363/ITU-TI.361) on link layers (1394 LINK) of the IEEE 1394 standard in devices such as ATM/1394 repeater 3 and 21 belonging to the front end side, and 1394 terminals 4, 22, 23, etc. belonging to the front end side. In this example, such layer is called ASEL (ATM over IEEE 1394 Serial bus Emulation layer).

ASEL conceals the IEEE 1394 serial bus and emulates the AAL/ATM layer with respect to the software of layer (level) which is the same as ASEL or higher than that of the corresponding device. For this reason, in the device where ASEL is mounted, in the own IEEE 1394 serial bus interface, multi (multiple) separation of VPC (Virtual Pass Connection)/VCC (Virtual Channel Connection) can be made. Further, network access protocol software and various application software corresponding to the ATM network 2 can be used as they are.

Figure 5:
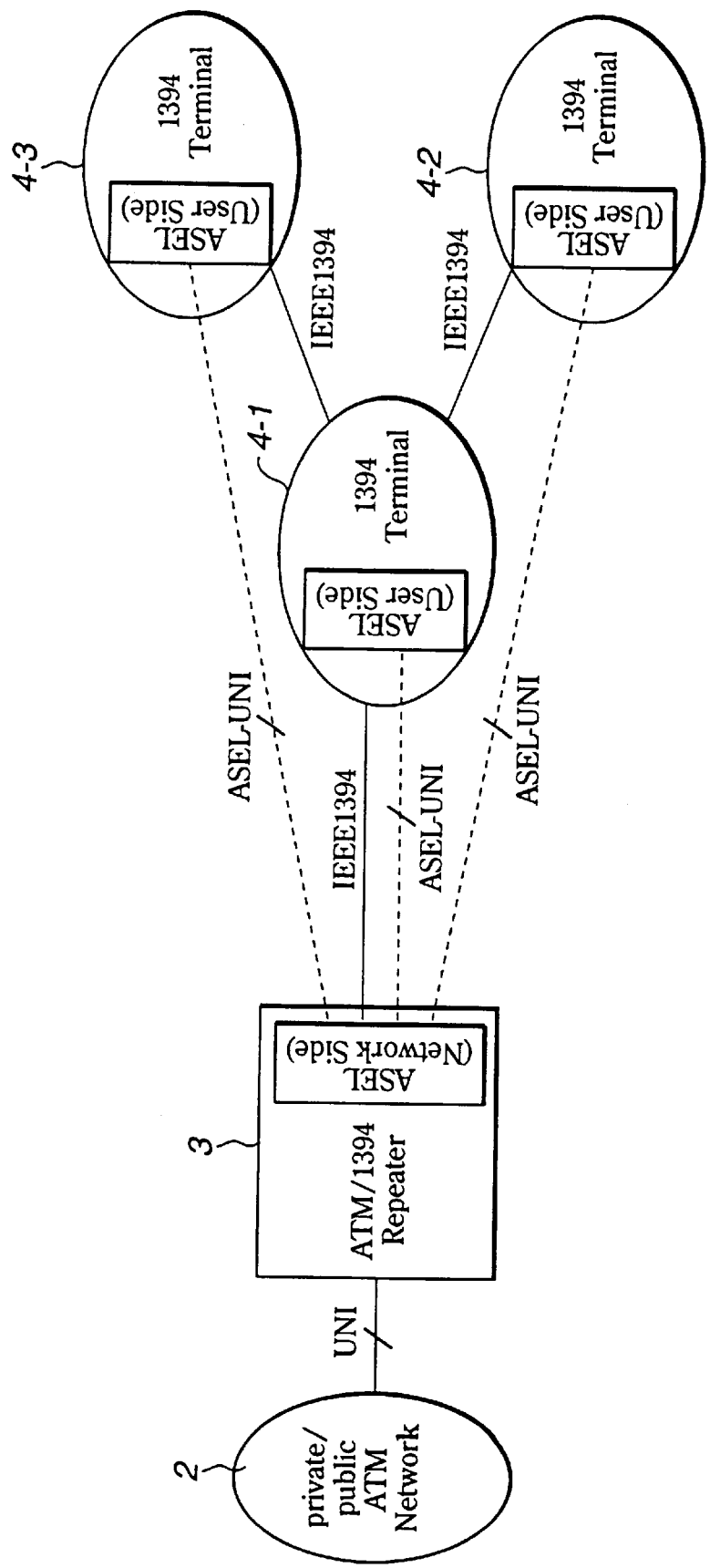
FIG. 5 is a view for explaining the relationship of ASEL-UNI.

FIG. 5 is a view showing that ASEL entities in the ATM/1394 repeater 3 and the 1394 terminals 4-1 to 4-3 are interconnected on the basis of the one-to-one correspondence relationship through respective ASEL-UNIs. As shown in this figure, when viewed physically, plural ASEL-UNIs can exist on a single 1394 serial bus cable.

Moreover, the ASEL entity is divided into operations of the Network side (ATM/1394 repeater 3 side) and User side (1394 terminals 4-1 to 4-3 side) with ASEL-UNI being as the boundary. Respective ASEL-UNIs at the Network side can be discriminated by allowing 1394 Node Unique IDs that the 1394 terminals 4-1 to 4-3 of the User side individually retain (have) and ASEL-UNI IDs assigned to respective ASEL-UNIs to be in correspondence with each other.

Figure 6:
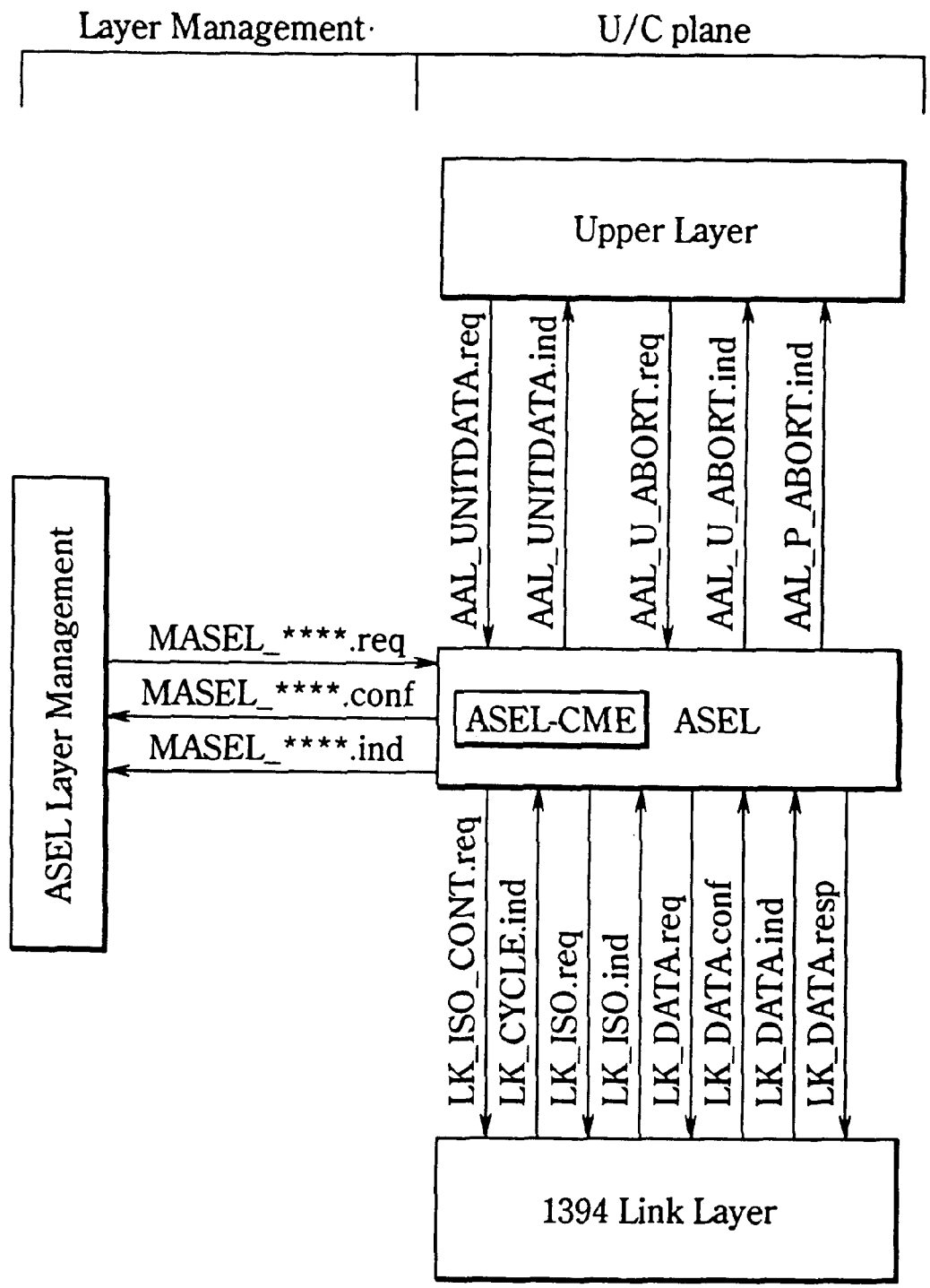
FIG. 6 is a view showing layer related diagram of ASEL.

FIG. 6 shows a layer related diagram indicating location of ASEL. As shown in this figure, the ASEL provides primitives similar to primitives that various AALs provide as primitive with respect to Upper layer. Namely, the ASEL receives AAL_UNITDATA.req (request) from the upper layer to deliver AAL_UNITDATA.ind (indicate). Moreover, the ASEL receives AAL_U_ABORT.req to deliver AAL_U_ABORT.ind. Further, the ASEL delivers AAL_P_ABORT.ind to the upper layer. Thus, software of (the upper layer (e.g., IP layer, IP/ATM layer of FIG. 54 which will be described later and Q.2931 layer, SSCF+ SSCOP of FIG. 55 which will be described layer) of ASEL can behave in a manner similar to the case where lower layer (e.g., 1394 LINK layer, 1394 PHY layer of FIGS. 54 and 55) is AAL.

In this case, AAL_UNITDATA.req and AAL_UNITDATA.ind are primitives for carrying out data transfer to and from the upper layer.

In the AAL_UNITDATA.req and AAL_UNITDATA.ind primitives, the following information are included.

ID for identifying ASEL_UNI (ASEL-UNI ID)

VPI for identifying Virtual Pass (Virtual Pass Identifier)/ VCI for identifying Virtual Channel (Virtual Channel Identifier) value (VPI/VCI value)

AAL5 parameter group (AAL5 parameters): This parameter group is included in the case where AAL type of ASEL-VCC is AAL5.

Interface Data: In the case where AAL5 is operative in the message mode, this parameter corresponds to complete AAL-SDU (Service Data Unit). In the case where AAL5 is operative in the streaming mode, this parameter corresponds to a partial AAL-SDU.

More: This parameter is not used in the message mode. In the streaming mode, this parameter indicates whether or not interface data being received and being transmitted include the last portion of the entirety of AAL-SDU.

Loss Priority: This parameter indicates Loss Priority of AAL-SDU. This parameter is mapped with respect to ASEL-PDU (Protocol Data Unit) header which will be described later.

Congestion Indication: This parameter indicates whether or not AAL-SDU has experienced the congestion state (status). This parameter is mapped with respect to ASEL-PDU header which will be described later.

AAL UserUser Information: This parameter is transparently transferred by ASEL between ASEL upper layer entities of the same rank (layer). This parameter is mapped with respect to ASEL-PDU header which will be described later.

Error Status: This parameter indicates that interface data may include transmission error. This parameter is used only in the case where delivery function of error data is used. This parameter is not included in AAL_UNITDATA.req primitive.

AAL0 parameter group (AAL0 parameters): This parameter group is included in the case where AAL type of ASEL-VCC is AAL0.

Interface Data: This parameter corresponds to always complete AAL-SDU.

Loss Priority: This parameter indicates Loss Priority of AAL-SDU. This parameter is mapped with respect to ASEL-PDU header which will be described later.

Congestion Indication: This parameter indicates whether or not AAL-SDU has experienced congestion state (status). This parameter is mapped with respect to ASEL-PDU header which will be described later.

Error Status: This parameter indicates that interface data may include transmission error. This parameter is used only in the case where delivery function of error data is used. This parameter is not included in AAL_UNITDATA.req primitive.

Further, AAL_U_ABORT.req, AAL_U_ABORT.ind and AAL_P_ABORT.ind primitives are primitive for carrying out abort service to and from the upper layer. These primitives are used only in the case where corresponding ASEL-VCC is in the streaming mode of AAL 3/4 or AAL5.

AAL_U_ABORT.req primitive is used by the upper layer of ASEL in order to start (activate) abort service. AAL_U_ABORT.ind primitive indicates that the upper layer of ASEL should abort AAL-SDU partially delivered by indication (instruction) from the upper layer of the same rank (layer) of the opposite (destination) side (ASEL of opposite side). AAL_P_ABORT.ind primitive is used by ASEL entity in order to indicate that the upper layer of ASEL should abort AAL-SDU partially delivered resulting from the fact that error takes place at ASEL or the lower layer of ASEL.

In AAL_U_ABORT.req, AAL_U_ABORT.ind and AAL_P_ABORT.ind primitives, the following information are included.

ID for identifying ASEL-UNI (ASEL-UNI ID)

VPI/VCI value

Moreover, ASEL uses primitive that IEEE 1394 link layer provides as it is as primitive to and from the lower layer. Namely, ASEL delivers LK_ISO_CONT.req to the lower layer to receive LK_CYCLE.ind. Moreover, ASEL delivers LK_ISO.req to the lower layer to receive LK_ISO.ind. Further, ASEL delivers LK_DATA.req to the lower layer to receive LK_DATA.conf, LK_DATA.ind to deliver LK_DATA.resp to the lower layer. Thus, the 1394 Link layer is not required to become conscious of the upper layer.

LK_ISO_CONT.req primitive is used in making a request for list of (accepted) receive Isochronous channel number in which acceptance of ASEL entity is allowed.

In the LK_ISO_CONT.req primitive, the following information are included.

Bus Index for identifying contained 1394 serial bus (1394 Bus Index)

Accepted receive isochronous channel number list

LK_CYCLE.ind primitive is used in order to allow the 1394 Link layer to inform the ASEL entity that Cycle sync event has taken place.

In the LK_CYCLE.ind primitive, the following information are included.

Bus Index for identifying contained 1394 serial bus (1394 Bus Index)

Current cycle count value (Current cycle count): This parameter indicates that current cycle_count value of Cycle_TIME register should be contained (stored).

Current second count value (Current second count): This parameter indicates current value of BUS_TIME register.

LK_ISO.req and LK_ISO.ind primitives are used in order to carry out transfer of CBR (Constant Bit Rate) data between ASEL and 1394 Link layer. ASEL entity uses LK_ISO.req primitive in order to request the 1394 Link layer for transmission of one Isochronous packet. In addition, the 1394 Link layer uses LK_ISO.ind primitive in order to inform the ASEL entity that one Isochronous packet has been received.

In the LK_ISO.req and LK_ISO.ind primitives, the following information are included.

Bus index for identifying contained 1394 serial bus (1394 Bus Index)

Tag value

Isochronous channel number

Synchronization code: This parameter is not used in the ASEL entity.

Data length

Data: This parameter indicates ASEL-PDU.

Speed: This parameter indicates transmission rate (100M/200M/400M bps) of packet.

Packet status: This parameter indicates result of the receiving operation of packet executed by 1394 Link layer. This parameter is included only in the LK_ISO.ind primitive.

LK_DATA.req primitive is used for carrying out transmission of UBR (Unassigned Bit Rate) or ABR (Available Bit Rate) data. ASEL entity uses this primitive in order to request the 1394 Link layer for transmission of single Asynchronous packet.

In the LK_DATA.req primitive, the following information are included.

Bus Index for identifying contained 1394 serial bus (1394 Bus Index)

Destination Self ID

Destination offset: This parameter is fixed to value for indicating that ASEL-PDU is stored in Data field of this Asynchronous packet.

Transaction code: This parameter is fixed to value (i.e.,=1) of "write request for data block".

Extended transaction code: This parameter is not used in the ASEL entity.

Retry code: This parameter is fixed to value (i.e.,=1) of "retry not supported".

Data length

Data: This parameter indicates ASEL-PDU.

Speed: This parameter indicates transmission rate (100M/200M/400M bps) of packet.

LK_DATA.conf primitive is used by 1394 Link layer in order to allow the upper layer to confirm transmission of one Asynchronous packet.

In the LK_DATA.conf primitive, the following information are included.

Bus Index for identifying contained (accommodated) 1394 serial bus (1394 Bus Index)

Request Status: This parameter indicates result of LK_DATA.req primitive.

Acknowledge: This parameter includes one of values of Ack_code defined in accordance with the IEEE 1394 standard.

LK_DATA.ind primitive is used for carrying out reception of UBR or ABR data. The 1394 Link layer uses this primitive in order to inform ASEL entity that one Asynchronous packet has been received.

In the LK_DATA.ind primitive, the following information are included.

Bus Index for identifying contained (accommodated) 1394 serial bus (1394 Bus Index)

Source Self ID

Destination Self ID

Destination offset: This parameter is fixed to value for indicating that ASEL-PDU is stored in Data field of this Asynchronous packet.

Transaction code: This parameter is fixed to value (i.e.,=1) of "write request for data block"

Extended transaction code: This parameter is not used in ASEL entity.

Transaction label: This parameter is not used in ASEL entity.

Retry code: This parameter is fixed to value (i.e.,=1) of "retry not supported".

Data length

Data: This parameter indicates ASEL-PDU.

Speed: This parameter indicates transmission rate (100M/200M/400M bps) of packet.

Packet status: This parameter indicates result of receiving operation of packet executed by 1394 Link layer.

LK_DATA.resp primitive is used by ASEL entity in order to carry out response with respect to received one Asynchronous packet. Namely, by transmitting one acknowledge packet, that sub action is completed.

In the LK_DATA.resp primitive, the following information are included.

Bus Index for identifying contained (accommodated) 1394 serial bus (1394 Bus Index)

Acknowledge: This parameter includes one of values of Ack_code defined in accordance with IEEE 1394 standard.

Bus Occupancy Control: This parameter controls whether or not the 1394 Link layer releases governing right of the 1394 serial bus after transmission of acknowledge packet.

Speed: This parameter indicates transmission rate (100M/200M/400M bps) of packet.

Further, ASEL carries out transmission/reception of primitives for ASEL management including various management information such as configuration, fault, performance and alarm, etc. relating to the ASEL entity of the opposite (destination) side and the own ASEL entity between the ASEL and (local) ASEL layer management entity.

As the primitive for ASEL layer management, seven kinds of primitives roughly classified are provided. In more practical sense, there are seven kinds primitives of start, reset, connection control, local fault, remote fault, local error and data transfer.

Initially, as primitive relating to starting (Act) of ASEL, MASEL_Act.req from the ASEL layer management is accepted (received) to deliver MASEL_Act.ind. The MASEL_Act.req primitive is used by ASEL layer management of User side in order to request that the ASEL entity is shifted to the starting state (Actstatus). The MASEL_Act.ind primitive is used by ASEL entity in order to inform ASEL layer management that the ASEL entity has been shifted to the starting state (Actstatus).

In the MASEL_Act.req and MASEL_Act.ind primitives, the following information are included.

ID for identifying ASEL-UNI (ASEL-UNI ID)

Bus Index for identifying contained (accommodated) 1394 serial bus (1394 BUS Index): This parameter is not included in the MASEL_ACT.req primitive.

As primitive relating to reset of ASEL, MASEL_Reset.req from ASEL layer management is accepted (received). The MASEL_Reset.req primitive is used by ASEL layer management in order to request that ASEL entity shifts to the reset status (Resetstatus).

In the MASEL_Reset.req primitive, the following information are included.

ID for identifying ASEL-UNI (ASEL-UNI ID)

As primitive relating to connection control of ASEL, MASEL_ConSet.req and MASEL_Con.Rec.req from ASEL layer management are accepted (received) to provide MASEL_ConSet.conf. Moreover, MASEL_ConReI.req from ASEL layer management is accepted (received) to provide MASEL_ConReI.conf.

MASEL_ConSet.req primitive is used by ASEL layer management in order to request that new ASEL-VCC is set.

In MASEL_ConSet.req primitive, the following information are included.

ID for identifying ASEL-UNI (ASEL-UNI ID)

VPI/VCI value

ID for uniquely identifying (discriminating between) respective ASEL connections on all ASEL-UNIs existing in the ASEL entity (ASEL Connection ID)

AAL Type

Routing Area: This parameter indicates routing area of ASEL-VCC to be set. As value of the parameter, five kinds of parameter values of External/Internal and same 1394 Bus/Internal and other 1394 Bus/Terminate/Unknown can be taken.

Topology: This parameter indicates form of ASEL-VCC. As value of parameter, two kinds of parameter values of Point-Point/Point-Multipoint can be taken.

AAL5 Specific information: This parameter is used only in the case where AAL type parameter is AAL5.
Error SDU delivery to Upper Layer
Transmit Maximum SDU Size
Receive Maximum SDU Size AAL0 Specific information: This parameter is used only in the case where AAL type parameter is AAL0.
Error SDU delivery to Upper Layer Transmit Bandwidth Receive Bandwidth QoS class: This parameter determines Quality of Service of ASEL-VCC. As value of the parameter, four kinds of parameter values of UBR/CBR/VBR (Variable Bit Rate)/ABR can be taken.

ABR traffic information: This parameter is used only in the case where QoS class parameter is ABR.
Minimum Transmit Rate
Minimum Receive Rate
Initial Transmit Rate
Initial Receive Rate
Transmit Trm: This parameter is used only at User side.
Transmit Allowed Rate Decrease Time Error: This parameter is used only at User side.
Transmit Rate Increase Factor: This parameter is used only at User side.
Transmit Rate Decrease Factor: This parameter is used only at User side.
Transmit Cutoff Decrease Factor: This parameter is used only at User side.

Transmit Segmentation size: This parameter is equal to divided respective transmit ASEL-PDU lengths (sizes). This parameter is not used in ASEL-VCC of AAL0 type.

Receive Sequence Number: This parameter determines whether or not check of SN (Sequence Number) field of received ASEL-PDU header should be carried out.

MASEL_ConRec.req primitive is used by ASEL layer management of User side in order to request recovery (restore) of ASEL-VCC in ASEL-UNI which has been shifted to Reset status resulting from bus reset of 1394 and has been then restored to Act status for a second time.

MASEL_ConSet.conf primitive is used by ASEL entity in order that ASEL layer management confirms result of the operation with respect to MASEL_ConSet.req or MASEL_ConRec.req primitives. In addition, the ASEL entity uses MASEL_ConSet.conf primitive in order to inform that the ASEL-VCC has been restored.

MASEL_ConRel.req primitive is used for releasing ASEL-VCC by ASEL layer management.

MASEL_ConRel.conf primitive is used by ASEL entity in order that the ASEL layer management confirms result of the operation with respect to the MASEL_ConRel.req primitive.

In the MASEL_ConRec.req, MASEL_ConSet.conf, MASEL_ConRel.req and MASEL_ConRel.conf primitives, the following information are included.

ID for idenfitying ASEL-UNI (ASEL-UNI ID)

VPI/VCI value

ID for uniquely identifying (discriminating between) respective ASEL connections on all ASEL-UNIs existing in the ASEL entity (ASEL Connection ID)

As primitive relating to local fault of ASEL, MASEL_BusHalt.ind and MASEL_ExpireEr.ind are delivered with respect to the ASEL layer management. Since these primitives mean that serious (fatal) fault has taken place in the local ASEL entity, the ASEL layer management entity and the application software should immediately release all resources relating to the ASEL-UNI where fault has taken place.

MASEL_BusHalt.ind primitive indicates at User side that 1394 serial bus is stopped and indicates at Network side that 1394 serial bus is stopped or 1394 terminal of User side is lost.

MASEL_ExpireEr.ind primitive indicates that serious (fatal) error followed by timer expiration has taken place in the local ASEL entity.

In the MASEL_BusHalt.ind and MASEL_ExpireEr.ind primitives, the following information are included.

ID for identifying ASEL-UNI (ASEL-UNI ID)

As primitive relating to remote fault of ASEL, MASEL_FatalEr.ind is delivered with respect to ASEL layer management. Since this primitive means that any serious (fatal) error has taken place in the remote ASEL entity, the ASEL layer management entity and the application software should immediately release all resources relating to the ASEL-VCC where fault has taken place.

In MASEL_FatalEr.ind primitive, the following information are included.

ID for identifying ASEL-UNI (ASEL-UNI ID)

VPI/VCI value

ID for uniquely identifying (discriminating between) respective ASEL connections on all ASEL-UNIs existing in the ASEL entity (ASEL Connection ID)

Error Code: This parameter is a parameter obtained by coding the fault content which has taken place in the remote ASEL entity.

As primitive relating to local error of ASEL, MASEL_IsoEr.ind, MASEL_DestEr.ind and MASEL_StsEr.ind are delivered with respect to the ASEL layer management.

Since the MASEL_IsoEr.ind and MASEL_DestEr.ind primitives mean that error relating to ASEL-VCC setting has taken place in the local ASEL entity, the ASEL layer management entity and the application software should quickly release all resources relating to the ASEL-VCC where fault has taken place.

In MASEL_IsoEr.ind and MASEL_DestEr.ind primitives, the following information are included.

ID for identifying ASEL-UNI (ASEL-UNI ID)

VPI/VCI value

ID for uniquely identifying (discriminating between) respective ASEL connections on all ASEL-UNIs existing in the ASEL entity (ASEL Connection ID)

MASEL_StsEr.ind primitive indicates that error relating to status transition has taken place in the local ASEL entity.

In the MASEL_StsEr.ind primitive, the following information are included.

ID for identifying ASEL-UNI (ASEL-UNI ID)

As primitive for carrying out data transfer including layer management information of ASEL, MASEL_DATA.req is accepted (received) from ASEL layer management to deliver MASEL_DATA.ind. These primitives are used for transferring arbitrary management information between ASEL layer management entities of the same rank (layer) of the opposite (destination) side.

Parameters in the MASEL_DATA.req and MASEL_DATA.ind primitives include parameters having the same content as AAL0 parameters in the AAL_UNITDATA.req and AAL_UNITDATA.ind primitives. This is because AAL type of ASEL-PDU for transferring these primitives uses AAL0 at all times.

In the MASEL_DATA.req and MASEL_DATA.ind primitives, the following information are included.

ID for identifying ASEL-UNI (ASEL-UNI ID)

VPI/VCI value

Management ID: This parameter is used in order to identify kind of management information included as interface data.

Interface Data: This parameter always corresponds to complete AAL-SDU.

Loss Priority: This parameter indicates Loss Priority of AAL-SDU. This parameter is mapped with respect to ASEL-PDU header which will be described later.

Congestion Indication: This parameter indicates whether or not AAL-SDU has experienced the congestion state (status). This parameter is mapped with respect to ASEL-PDU header which will be described later.

Error Status: This parameter indicates that interface data may include transmission error. This parameter is used only in the case where delivery function of error data is used. This parameter is not included in the MASEL_DATA.req primitive.

The main functions of ASEL will now be described. First of all, VPC/VCC multi (multiple) separation in respective ASEL-UNIs can be made. Namely, ASEL entity permits plural VPC/VCC to be set on Isochronous channel. It is to be noted that VPI (Virtual Path Identification)/VCI (Virtual Channel Identification) values of VPC/VCC set on different Isochronous channels may overlap with each other.

Moreover, the ASEL entity permits setting of plural VPI/VCI values and discrimination therebetween every Dest (Destination)-ID which is node ID No. of the destination (opposite side) at the time of transmission and every Src (Source)-ID which is the own (source) node ID No. at the time of reception.

It is to be noted that VPI/VCI values of VPC/VCC in different Dest-ID or Src-ID may overlap with each other. Various parameters relating to VPC/VCC are set by using MASEL_ConSet.req primitive from ASEL layer management.

Secondly, ASEL guarantees QoS (Quality of Service). Namely, ASEL carries out CBR (Constant Bit Rate) service of ATM by using the Isochronous packet of the IEEE 1394 standard, and carries out UBR (Unassigned Bit Rate) service and ABR (Available Bit Rate) service of ATM by using the Asynchronous packet of the IEEE 1394 standard to guarantee QoS with respect to ASEL user.

Figure 7:
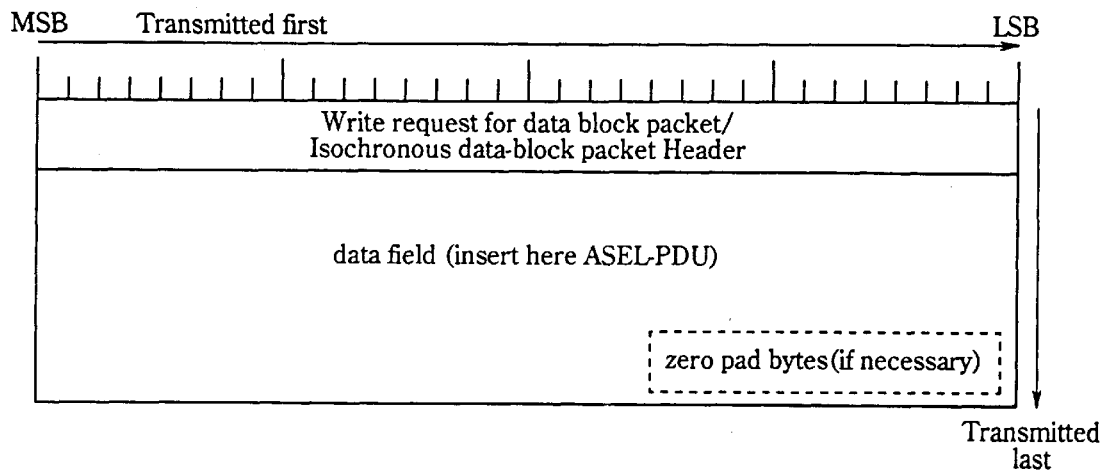
FIG. 7 is a view showing insertion field of ASEL-PDU.

FIG. 7 shows data format of packet caused to undergo transmission/reception in the IEEE 1394 standard. This packet consists of header portion and data field. In the header portion, in the case of Asynchronous packet, information such as destination address, source node address and transfer datasize, etc. are stored; in the case of the Isochronous packet, information such as channel ID, etc. is stored. Data to be actually caused to undergo transmission (transmitted) are stored in quadlet units (4 byte units) in the data field. The size of the data field is adjustable. In the data field, zero pad bytes are suitably inserted as occasion demands into the last portion of data so that size of the packet becomes 4 byte units.

In the case where the transmission rate (speed) is 100 Mbps (mega bits/sec), the maximum length (size) of the packet becomes equal to 1024 bytes in the case of the Isochronous packet of the IEEE 1394 standard, and becomes equal to 512 bytes in the case of the Asynchronous packet of the IEEE 1394 standard. In addition, prior to carrying out data transfer, transmit segment size parameters of MASEL_ConSet.req primitive are set every respective ASEL-VCCs in the ASEL entity. Thus, with respect to packets which exceed any one of these values, those packets are transmitted in the state divided into plural packets.

For example, in the case of the Asynchronous packet of the IEEE 1394 standard, packet transmitted from a predetermined node is transferred to all nodes within the IEEE 1394 serial bus. Accordingly, respective nodes read the header portion of this packet to read it thereinto when data of this packet is packet data addressed to the own node. Moreover, in the case of the Isochronous packet of the IEEE 1394 standard, channel ID is used without using node address. For example, in the case where data are simultaneously transferred from plural nodes, channel IDs for identifying (discriminating between) their contents are respectively set at data to be transferred. Thus, the node which receives data sets channel ID corresponding to predetermined transfer data to accept (receive) only desired data. Accordingly, two nodes or more can also accept (receive) data of the same channel ID. In this way, data can be transferred from a predetermined node to any other predetermined node.

Moreover, as has been shown in FIG. 7, ASEL-PDU (Protocol Data Unit) is inserted into data field of Write request for data block packet or Isochronous data-block packet format of Asynchronous packet formats with data block payload prescribed in the IEEE 1394 standard. As described later with reference to FIGS. 8 to 10, ASEL-PDU consists of header portion and payload portion.

In the case of transferring ASEL-PDU, values of the fields described below are fixed in the header of the Asynchronous packet (Write request for data block packet).

Destination offset field: The field value is set to specific offset value for indicating that ASEL-PDU is stored in the data field of this Asynchronous packet.

Transaction code field: 0001: write request for data block

Extended transaction code field: 0000

In the case of transferring ASEL-PDU, values of the fields described below are fixed in the header of the Isochronous packet (Isochronous data-block packet).

Transaction code field: 1010: Isochronous data block

Figure 8:
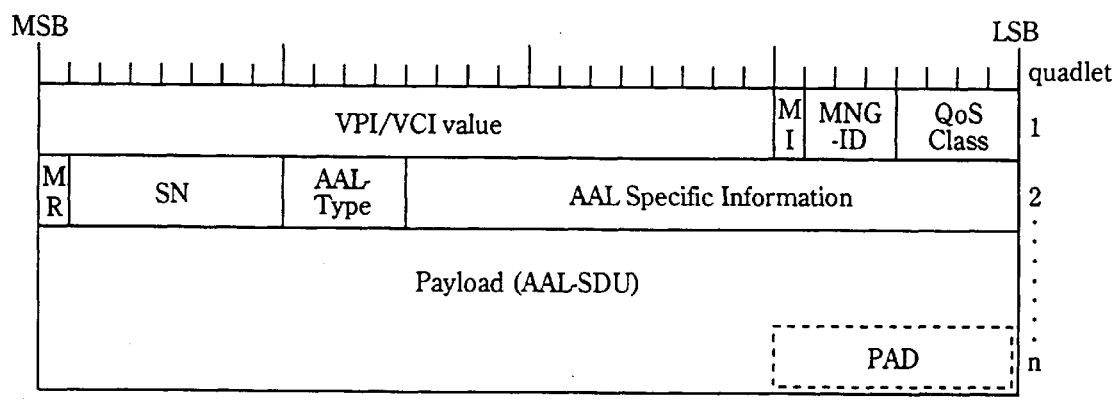
FIG. 8 is a view showing format common to all AAL types of ASEL-PDU and coding example thereof.
Figure 9:
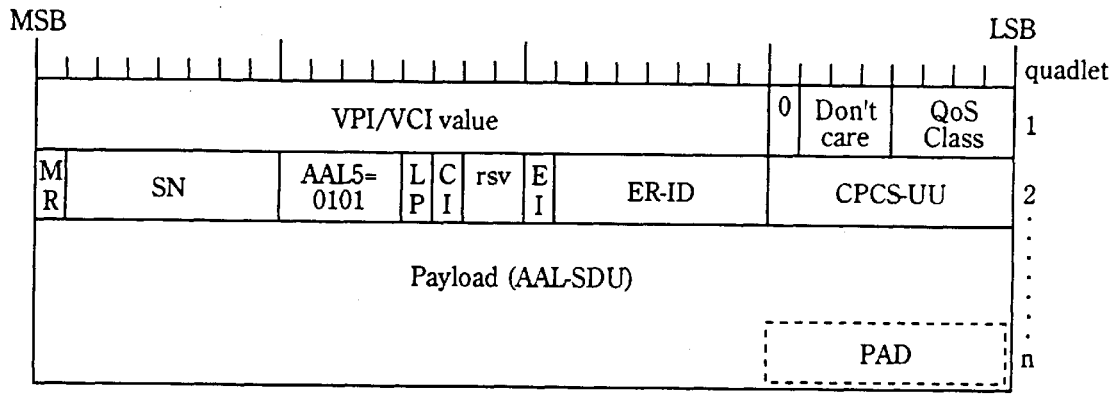
FIG. 9 is a view showing format and coding example of ASEL-PDU (AAL5 Type).
Figure 10:
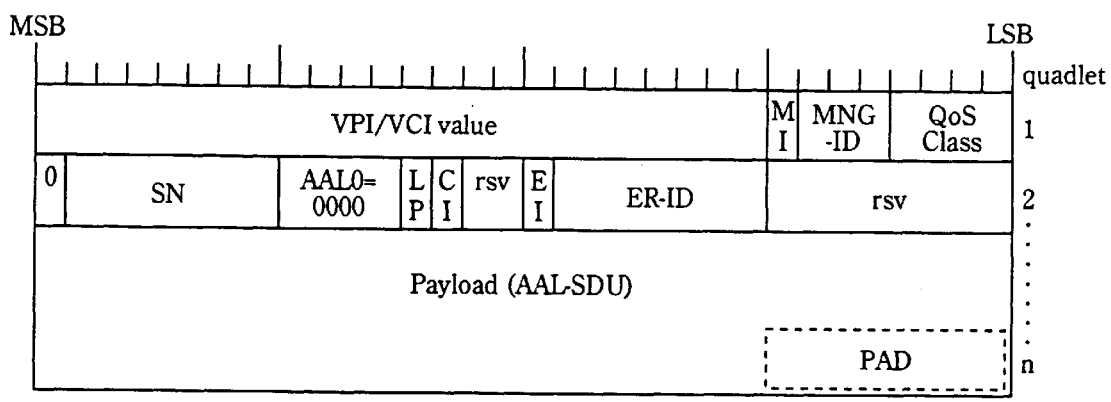
FIG. 10 is a view showing format and coding example of ASEL-PDU (AAL0 Type).

As shown in FIGS. 8 to 10, the ASEL-PDU consists of header portion and payload portion.

In the ASEL-PDU header, the following information are included.

VPI/VCI information for identifying VPC/VCC

ASEL layer management discrimination information

QoS class

AAL-SDU (Service Data Unit) last (final) indication

AAL-SDU sequence No.

AAL type discrimination information

AAL specific information

Moreover, ASEL-PDU payload includes information as described below.

AAL-SDU

ASEL realizes the above-described various functions by using ASEL-PDU as shown in FIG. 8 between ASEL entities of the same rank (layer). FIG. 8 shows format of ASEL-PDU common to all AAL types.

In this figure, VPI/VCI value is VPI/VCI value field, and 1 byte is assigned to VPI value and 2 bytes are assigned to VCI value. This permits emulation of VPI and VCI in ATM.

MI is Management information Indicator field consisting of 1 bit, and indicates whether or not the content of AAL-SDU is ASEL layer management information. When that content is not ASEL layer management information, value 0 is set, while that content is ASEL layer management information, value 1 is set.

MNG-ID is ASEL Layer Management Identifier field of 3 bits. When this field is Peer ASEL Entity management, value 000 is set, and when this field is Segment F5 flow OAM, value 001 is set. When this field is End—End F5 flow OAM, value 010 is set. Further, when this field is Resource management, value 011 is set. Other values are reserved. It is here noted that "reserved" means undefined state.

QoS Class is QoS Class field of 4 bits. When URB service is used, value 0000 is set. When CBR service is used, value 0001 is set. Moreover, in the case where VBR (Variable Bit Rate) service is used, value 0010 is set. Further, in the case where ABR (Available Bit Rate) service is used, value 0011 is set. Other values are reserved.

MR is More Indication field of 1 bit, and indicates whether or not PDU caused to undergo transmission/reception includes the terminating portion of AAL-SDU. When the terminating portion of AAL-SDU is included, value 0 is set. When the terminating portion of AAL-SDU is not included, value 1 is set.

SN is Sequence Number field of 7 bits, and is caused to undergo management every VPI/VCI value. Every time ASEL-PDU in which the content of AAL-SDU is information except for ASEL layer management information is transmitted, 1 is added by modulo 128. In the case where the content of AAL-SDU includes ASEL layer management information, this field is not added. Accordingly, in the case where values of the SN field are discontinuous, the receiving side can detect that losing (missing) or erroneous insertion of ASEL-PDU has taken place resulting from transmission error, etc. on the way.

AAL-Type field is constituted with 4 bits and indicates type of AAL. When type of AAL is AAL0 (is equal to null AAL or raw cell), i.e., there is no AAL, value 0000 is set. When type of AAL is AAL 1, value 0001 is set. When type of AAL is AAL 2, value 0010 is set. When type of AAL is AAL 3 or 4, value 0011 is set. When type of AAL is AAL5, value 0101 is set. In addition, value 0100 and other values are reserved.

AAL Specific Information field consists of 20 bits, and specific information are stored every respective AAL types. Payload (AAL-SDU) field has variable length, and stores SDU caused to undergo transmission/reception to and from the upper layer or the layer management. PAD field is zero pad bytes within data field of Asynchronous/Isochronous packet of the IEEE 1394 standard, and Payload field is inserted so that there results multiple of integer of 4 bytes.

FIG. 9 shows format and coding example of ASEL-PDU (AAL5 Type). In the ASEL-PDU of AAL5 Type, value 0 is set in MI field shown in FIG. 8 and value 0101 is set in AAL Type field. Further, information peculiar to AAL5 Type is stored in AAL Specific Information field. Namely, LP is Loss Priority field of 1 bit, and value 0 is set at the time of low loss priority and value 1 is set at the time of high loss priority. LP field is used when preferentially undergoing aborting (disposal) from cells which are not important in the case where there results Congestion state within the system. For example, a processing is conducted such that cells where value 0 is set are difficult to undergo aborting (disposal), and cells where value 1 is set are easy to undergo aborting (disposal).

CI is Congestion Indicator field of 1 bit. When there is no Congestion past record, value 0 is set. When there is Congestion past record, value 1 is set. 2 bits subsequent thereto are reserved.

EI is Error Indicator field of 1 bit. When there is no error, value 0 is set. When error exists, value 1 is set. ER-ID is Error Identifier field of 7 bits. In the case of non-use, value 0000000 is set. Value 0000001 to Value 0111111 are reserved. In the case of CPCS (Common Part Convergence Sublayer) CRC error, value 1000001 is set. In the case of CPCS-SDU Length error, value 1000010 is set. Other values are reserved.

The next CPCS-UU is CPCS-User to User information field of 8 bits.

FIG. 10 shows format and coding example of ASEL-PDU (AAL0 Type). In the format of ASEL-PDU of AAL0 type, value 0 is set with respect to MR field shown in FIG. 8 and value 0000 is set with respect to AAL Type field. Further, information peculiar to AAL0 Type is stored into AAL Specific Information field. Namely, LP is Loss Priority field of 1 bit. In the case of low loss priority, value 0 is set. In the case of high loss priority, value 1 is set. CI is Congestion Indicator field of 1 bit. When no congestion past record exists, value 0 is set. When congestion past record exists, value 1 is set. 2 bits subsequent thereto are reserved.

EI is Error Indicator field of 1 bit. When there is no error, value 0 is set. When there is error, value 1 is set. ER-ID is Error Identifier field of 7 bits. In the case where this field is not used, value 0000000 is set. At the time of OAM (Operation And Maintenance) cell EDC (Error Detection Code) error, value 0000001 is set. Other values are reserved. The next (subsequent) 8 bits are reserved.

The specification of the ASEL connection management which is one of functions of ASEL will now be indicated.

Figure 11:
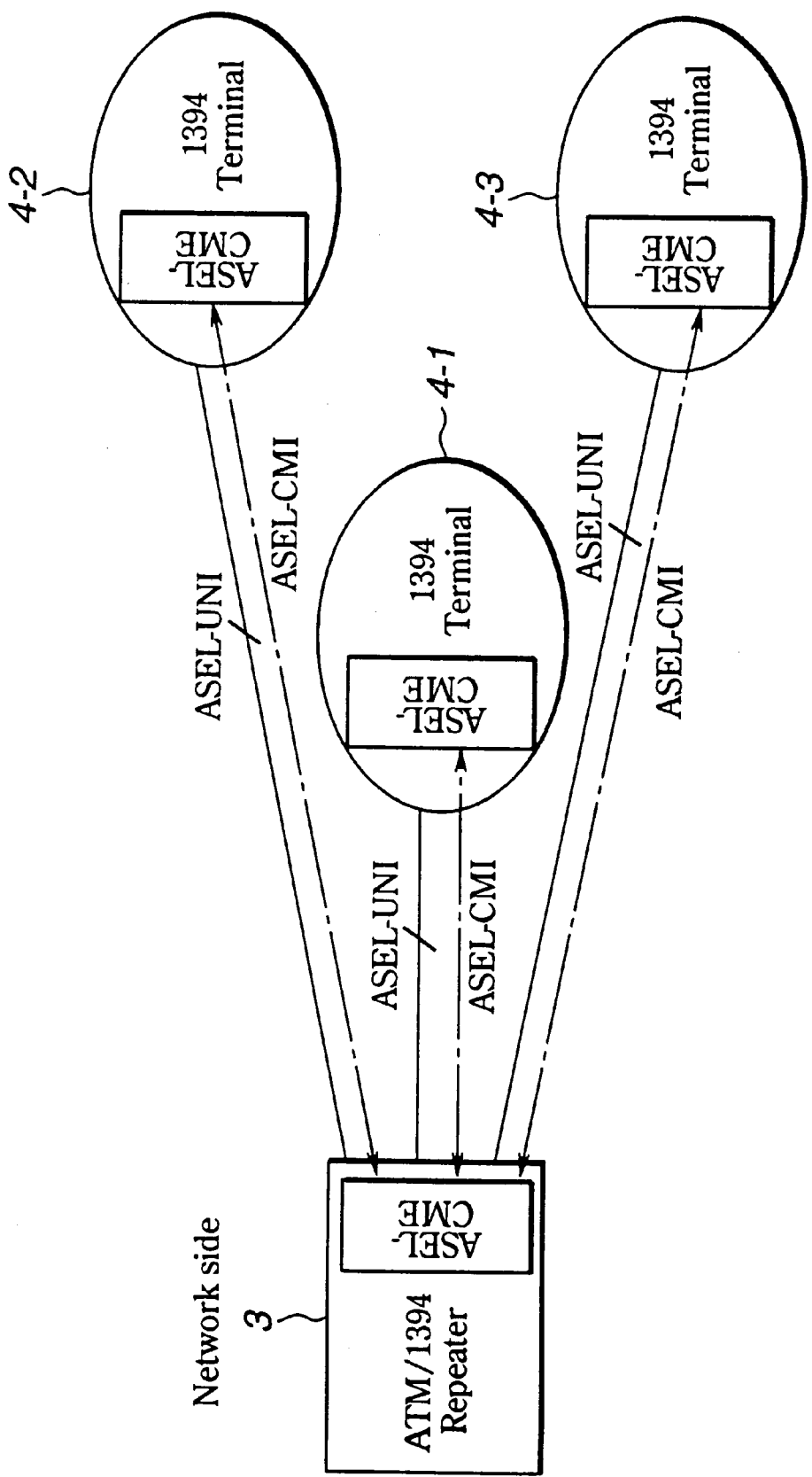
FIG. 11 is a view for explaining the relationship between ASEL-CMI and ASEL-UNI.

As shown in FIG. 11, respective one ASEL-CMIs (Connection Management Interfaces) exist on ASEL-UNIs. The ASEL-CMI is interface for interconnecting ASEL-CMEs (Connection Management Entities) mounted in ATM/1394 repeater 3 which is the Network side and 1394 terminals 4-1 to 4-3 which are User Side.

The functions of ASEL-CMI are indicated below.

ASEL-PDUs called "ASEL Connection Management Protocol (ASEL-CMP)" are transferred through ASEL-CMI.

ASEL-CMP transfers message between ASEL-CMEs of the same rank (layer) by ASEL-PDUs using 1394 Asynchronous packet of the AAL0 type to control ASEL-VCC.

Coding of respective fields of ASEL-PDU header used in the message of ASEL-CMP is as follows:
VPI/VCI valuye=all "0"
MI=1
MNG-ID=000 (Same Rank (Layer) ASEL Entity Management)
QoS class=0000
ALL-Type=AAL0

List of messages used in ASEL-CMP is shown in Table 1 and Table 2. The message of the Table 1 are messages in which there is possibility that ASEL-CME may be caused to undergo status transition when that message transmitted or received. The messages of the Table 2 are messages in which no state transition takes place.

TABLE 1

Message of ASEL-CMP where status transition takes place

| Name | Direction | Connection Form | Parameter |
| --- | --- | --- | --- |
| WakeUp | U→N | Broadcast | User side Self ID, User side Node Unique ID |
| ActReq | N→U | One-to-One | User side Self ID, User side Node Unique ID, Network side Self ID, Network side Node Unique ID |
| ActAck | U→N | One-to-One | Error Code |

TABLE 2

Message of ASEL-CMP where no status transition takes place

| Name | Direction | Connection Form | Parameter |
| --- | --- | --- | --- |
| IsoReq | U→N | One-to-One | Assigned VPI/VCI |
| IsoRply | N→U | One-to-One | Assigned VPI/VCI, Assigned Isochronous Channel Value, ASEL-VCC Operation Speed |
| DestIDReq | U→N | One-to-One | Assigned VPI/VCI, |
| DestIDRply | N→U | One-to-One | Assigned VPI/VCI, Destination Self ID, ASEL-VCC Operation Speed |

WakeUp message (its format will be described later with reference to FIG. 15) is used when respective ASEL-CMEs of User side inform Network side that their own starting operations have been completed. This message always uses broadcast address as Destination ID of 1394 Asynchronous packet.

ActReq message (its format will be described later with reference to FIG. 16) is used when after WakeUp message is received, ASEL-CME of Network side requests respective User sides for starting of ASEL-CMEs, and requests registration of Self ID (e.g., at the time of power ON, etc., ID automatically added by the IEEE 1394 standard) and Node Unique ID of Network side.

ActAck message (its format will be described later with reference to FIG. 17) is used when ASEL-CME of User side informs Network side of result of the operation with respect to ActReq reception.

IsoReq message (its format will be described later with reference to FIG. 18) is used when ASEL-CME of User side requests Network side for value of Isochronous channel which solves assigned VPI/VCI.

IsoRply message (its format will be described later with reference to FIG. 19) is used when ASEL-CME of Network side responds to IsoReq in order to assign Isochronous channel to User side.

DestIDReq message (its format will be described later with reference to FIG. 20) is used when ASEL-CME of User side requests Network side for value of Destination ID of Asynchronous packet which solves assigned VPI/VCI.

DestIDRply message (its format will be described later with reference to FIG. 21) is used when ASEL-CME of Network side responds to DestIDReq in order to teach Self ID of destination node to User side.

Figure 12:
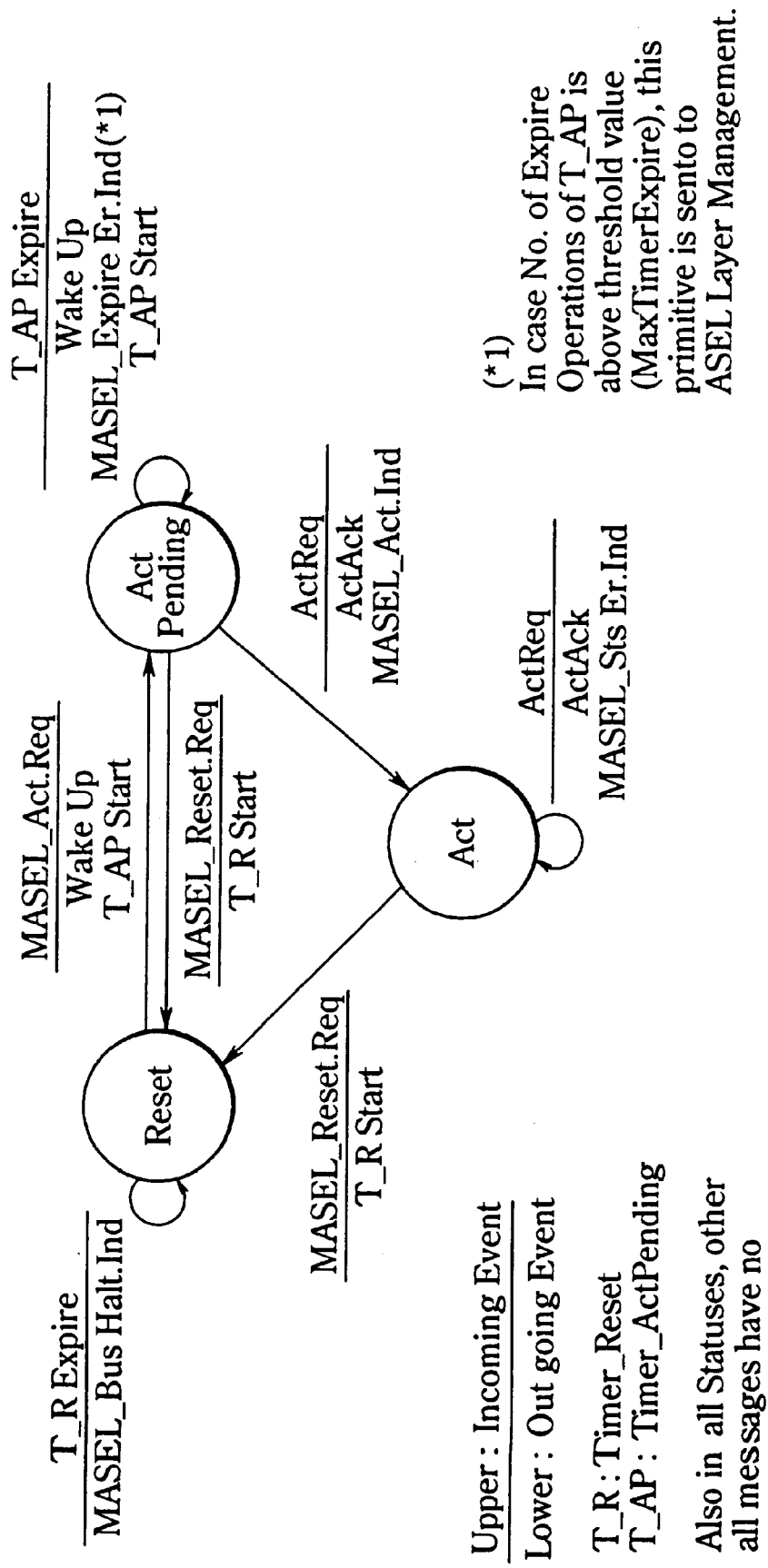
FIG. 12 is a view for explaining status transition of ASEL-CME at User side.
Figure 13:
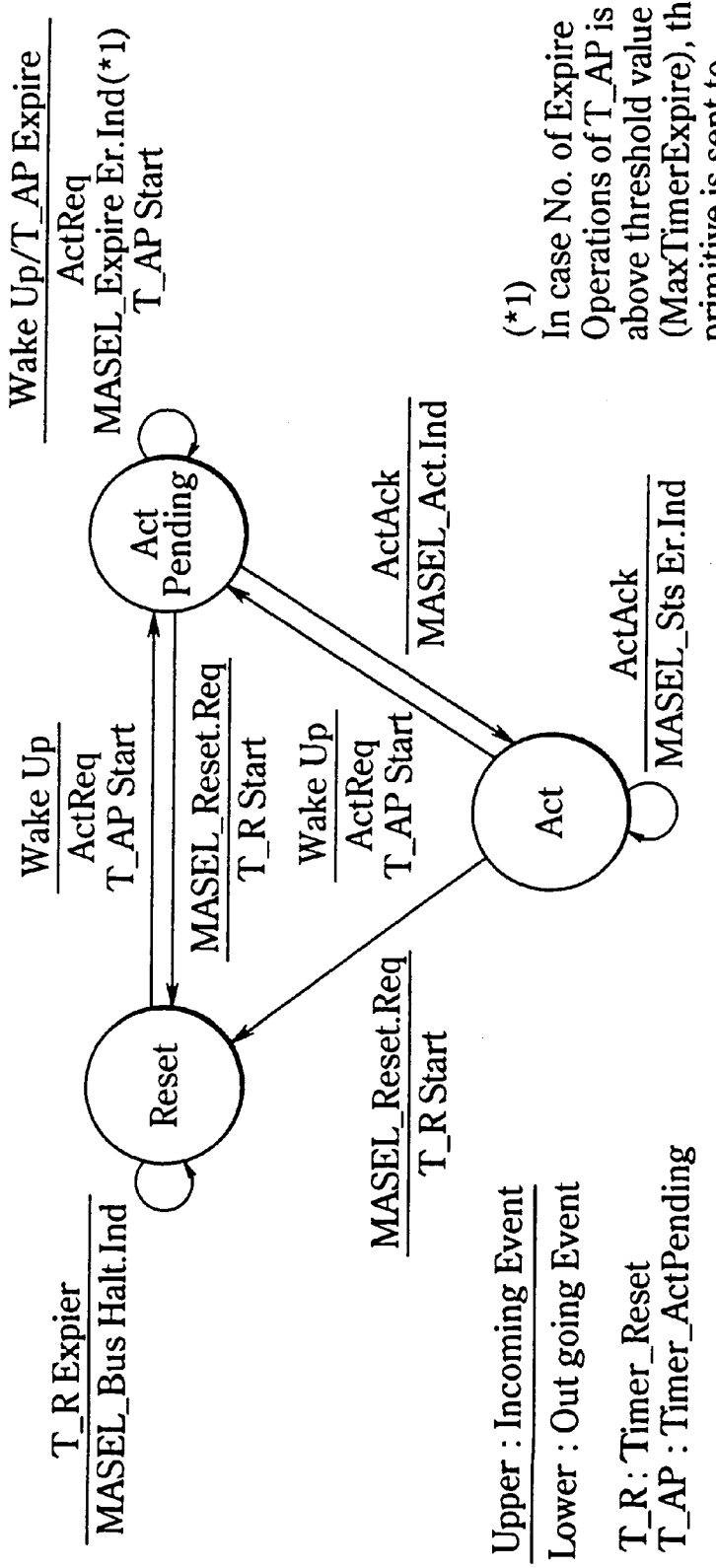
FIG. 13 is a view for explaining status transition of ASEL-CME at Network side.

Status transitions in ASEL-CMEs of User side and Network side are respectively shown in FIGS. 12 and 13.

Status transitions independently take place every respective ASEL-CMIs. For this reason, the device in which plural ASEL-CMIs exist is required to carry out management of the statuses every corresponding respective ASEL-CMEs.

In FIGS. 12 and 13, Reset Status indicates whether or not tree topology is established immediately after initialization state or reset of 1394 serial bus; ActPending Status indicates the statuses (states) waiting for ActReq message reception from Network side at User side (FIG. 12) and ActAck message reception from User side at Network side (FIG. 13); and Act Status indicates the status where Network side and User side both recognize to each other that ASEL-CMEs are activated.

Only in the Act Status, ASEL-CMEs of Network side and User side can carry out transmission/reception of message for acquiring resources shown in the Table 2 (i.e., IsoReq, IsoRply, DestIDReq, DestIDRply).

Further, Timer_Reset indicates bus reset allowed time period of 1394 serial bus. Ordinarily, even in the case where 1394 bus reset takes place, 1394 bus is restored from the reset status for (within) several 100 $\mu$s. ASEL-VCC must not be released by such momentary transition to the reset status. Namely, until Timer_Reset is expired, respective ASEL-CMEs of Network side and User side must maintain all settings of ASEL-VCC. However, until respective ASEL-CMEs are restored to Act Status, Asynchronous packets in ASEL-VCCs of topology type of Point—Point will be caused to undergo disposal (aborting). This is because DestinationIDs in these Asynchronous Packets are uncertained at this time point.

In addition, Timer-ActPending indicates timing for re-sending (re-transmitting) Wake up message at User side or ActReq message at Network side.

Figure 14:
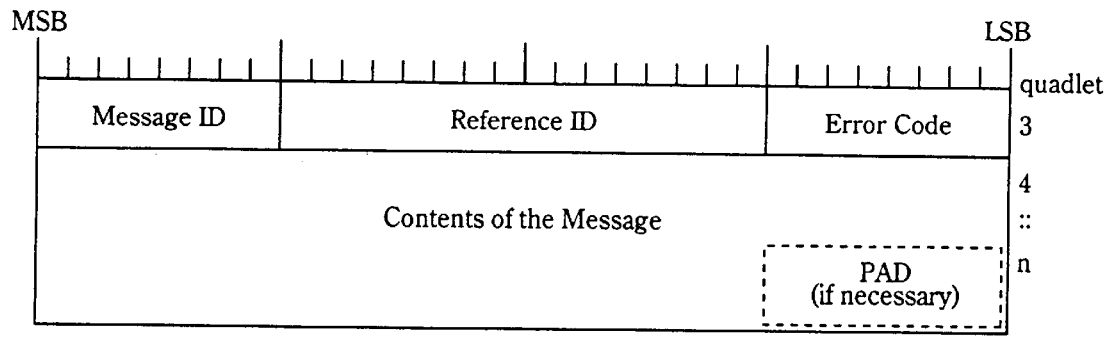
FIG. 14 is a view showing format of field common to ASEL-CMP message.

FIG. 14 shows format of field common to all ASEL-CMP messages.

In FIG. 14, Message ID field consists of 8 bits and indicates kind of ASEL-CMP messages. Value 00000000 is not yet used. In the case of the Wake up message, value 00000001 is set. In the case of ActReq message, value 00000010 is set. In the case of ActAck, value 00000011 is set. In the case of IsoReq message, value 00000100 is set. In the case of IsoRply message, value 00000101 is set. In the case of DestIDReq message, value 00000110 is set. In the case of DestIDRply message, value 00000111 is set. In addition, other values are reserved.

Reference ID field consists of 16 bits, and indicates ID Nos. that Network side and User side make reference to each other in order that contradiction of the status transition does not take place therebetween. In the case where ASEL-CME of User side transmits Wake up message in carrying out transition from Reset Status, ASEL-CME of User side must assign new Reference ID of unique value to that Wake up message in that ASEL-CMI. ASEL-CMEs of User side and Network side must use this value as current Reference ID. Further, in the case where an arbitrary message except for Wake up message having value different from value of current Reference ID is received, that message must be disregarded.

Error Code field consists of 8 bits, and indicates factor of error or alarm which has taken place in ASEL-CME. Error Code fields are defined every respective messages. The detail of coding rule will be described later. In the case where error and alarm do not exist, value 00000000 is set.

In the case where event to be alarmed takes place, value 10 is set at the high order 2 bits. In the case where message with alarm is received, processing is continued as far as possible. In the case where event subject to serious (fatal) error takes place, value 11 is set at the high order 2 bits. In the case where message with error is received, ASEL layer management is immediately informed of error. Other values are reserved.

Figure 15:
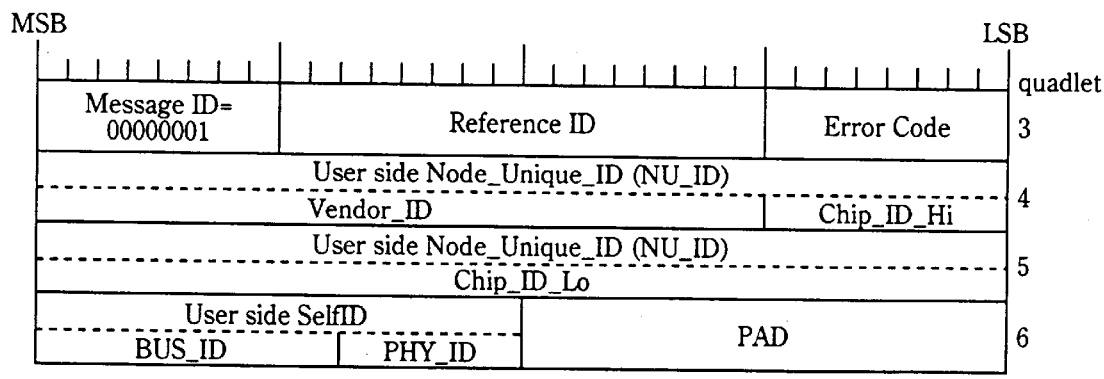
FIG. 15 is a view showing format of WakeUp message.

Format of Wake up message is shown in FIG. 15.

In FIG. 15, with respect to coding of Error Code field, in the case where there is no error, value 00000000 is set. In the case of alarm of re-sending (retransmission) of message, value 10000001 is set. Other values are reserved.

User side Node_Unique_ID (NU_ID) field consists of 64 bits, and global and unique value of Node Unique ID that 1394 terminal of User side retains (has) is set by ASEL-CME of User side. The high order 24 bits indicate Vendor_ID and the low order 40 bits indicate Chip_ID.

User side Self ID field consists of 16 bits, and value of Self ID which is node address of User side is set by ASEL-CME of User side. The high order 10 bits indicate BUS_ID and the low order 6 bits indicate PHY_ID.

Figure 16:
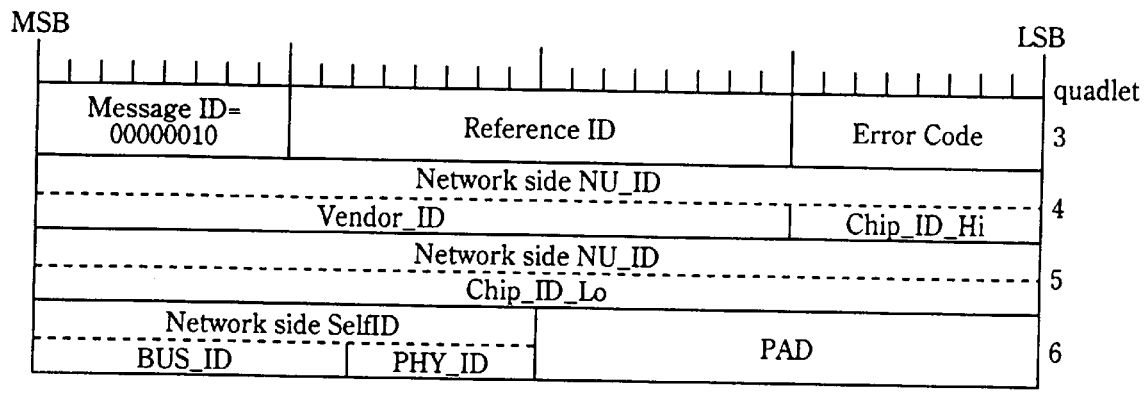
FIG. 16 is a view showing format of ActReq message.

Format of ActReq message is shown in FIG. 16.

In FIG. 16, with respect to coding of Error Code field, in the case where there is no error, value 00000000 is set. In the case of alarm of re-sending (retransmission) of message, value 10000001 is set. Further, in the case of alarm of topology change, value 10000010 is set. Other values are reserved.

Network side Node_Unique_ID (NU_ID) field consists of 64 bits, and one of global and unique values of Node Unique ID that device of Network side retains (has) every 1394 serial bus is set by ASEL-CME of User side. The high order 24 bits indicate Vendor_ID and the low order 40 bits indicate Chip_ID.

Network side self ID field consists of 16 bits, and value of Self ID which is node address of Network side is set by ASEL-CME of Network side. The high order 10 bits indicate BUS_ID and the low order 6 bits indicate PHY_ID.

Figure 17:
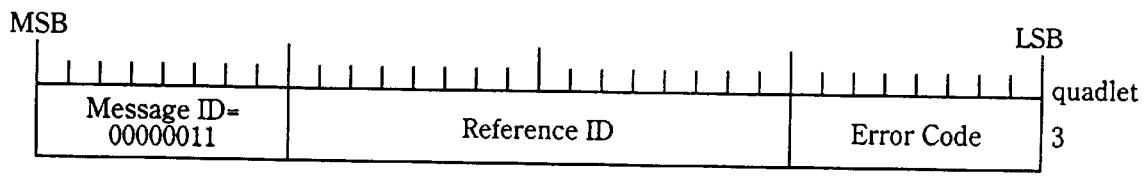
FIG. 17 is a view showing format of ActAck message.

Format of ActAck message is shown in FIG. 17.

In FIG. 17, with respect to coding of Error Code field, in the case where there is no error, value 00000000 is set. In the case of serious (fatal) error of failure in starting, value 11000001 is set. Other values are reserved.

Figure 18:
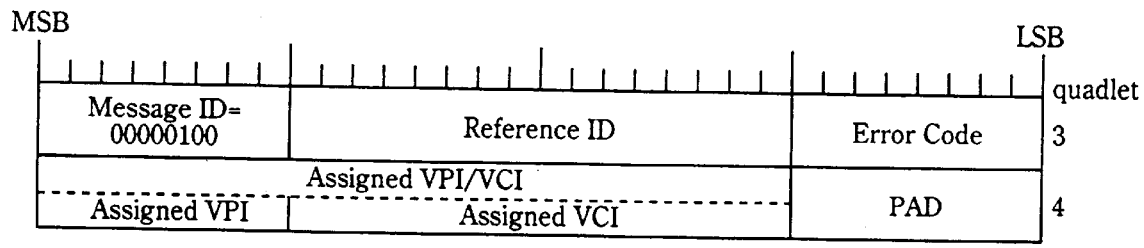
FIG. 18 a view showing format of IsoReq message.

Format of IsoReq message is shown in FIG. 18.

In FIG. 18, with respect to coding of Error Code field, in the case where there is no error, value 00000000 is set. In the case of alarm of re-sending (retransmission) of message, value 10000001 is set.

Assigned VPI/VCI field consists of 24 bits, and VPI value (8 bits) and VCI value (16 bits) assigned by MASEL-ConSet.req primitive from the own ASEL layer management are set.

Figure 19:
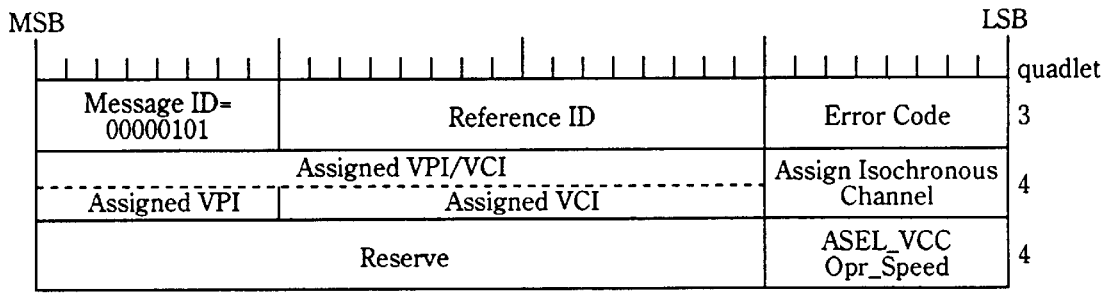
FIG. 19 is a view showing format of IsoRply message.

Format of IsoRply message is shown in FIG. 19.

In FIG. 19, with respect to coding of Error Code field, in the case where there is no error, value 00000000 is set. In the case of serious (fatal) error where no available Isochronous channel exists, value 11000010 is set.

Assigned VPI/VCI field consists of 24 bits, and VPI value (8 bits) and VCI value (16 bits) included in IsoReq message from User side are set.

Assign Isochronous Channel field consists of 8 bits, and Tag field of 1394 Isochronous packet header is set at the high order 2 bits. Isochronous channel that the Network side has assigned is set at the low order 6 bits.

As an example of how to use Tag field, this field is used as bit-map for filtering at the time of reception of Isochronous packet. For example, an approach is employed to allow the high order bit of 2 bits to be Listen Bit of Network Side and to allow the low order bit thereof to be Listen Bit of User Side to accept packet only in the case where corresponding bit indicates "1". This way of use is effective in the case there is a necessity such that when filtering function by the Isochronous channel is not sufficient (e.g., the number of channels which can be set is small, etc.), respective nodes prevent reception of unnecessary packets as simple as possible. For example, Tag field of Dummy packet transmitted when there is no packet to be sent is set to (0, 0), thereby making it possible to disregard reception of unnecessary packet without discriminating value of Isochronous channel. In addition, (0, 1) is assigned to ASEL-VCC that only User side should receive, (1, 0) is assigned to ASEL-VCC that only Network Side should receive, and (1, 1) is assigned to ASEL-VCC that User Side and Network side should both receive.

Moreover, with respect to Tag field, there may be also employed a way of use to extend the number of channels of Isochronous channel. Namely, Isochronous channel of 6 bits is extended to 8 bits to use the high order 2 bits thereof as Tag field. At this time, value 00 of Tag field is not used. Thus, as the entirety of field, values from the value 00000000 up to the value 00111111 result in values which cannot be utilized. As a result, values from the value 01000000 up to the value 11111111 are set as available (utilizable) Isochronous channel.

ASEL-VCC Opr_Speed field consists of 8 bits, and indicates data transferrable speed in this ASEL-VCC. In the case of S100 (100 Mbps), value 00000000 is set. In the case of S200 (200 Mbps), value 00000001 is set. Further, in the case of S400 (400 Mbps), value 00000010 is set. Other values are reserved.

Figure 20:
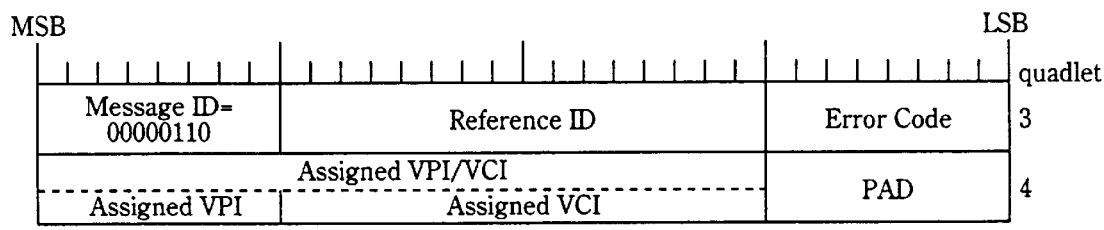
FIG. 20 is a view showing format of DestIDReq message.

Format of DestIDReq message is shown in FIG. 20.

In FIG. 20, with respect to coding of Error Code field, in the case where there is no error, value 00000000 is set. In the case of alarm of re-sending (retransmission) of message, value 10000001 is set.

Assigned VPI/VCI field consists of 24 bits, and VPI value (8 bits) and VCI value (16 bits) assigned by MASEL_ConSet.req primitive from the own ASEL layer management are set.

Figure 21:
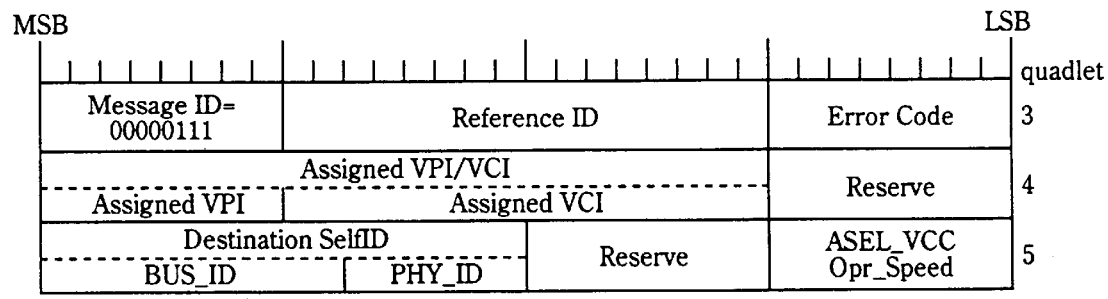
FIG. 21 is a view showing format of DestIDRply message.

Format of DestIDRply message is shown in FIG. 21.

In FIG. 21, with respect to coding of Error Code field, in the case where there is no error, value 00000000 is set. In the case of serious (fatal) error such that Destination ID cannot be found, value 11000011 is set.

Assigned VPI/VCI field consists of 24 bits, and VPI value (8 bits) and VCI value (16 bits) included in DestIDReq message from User side are set.

Destination Self ID field consists of 16 bits, and value of Self ID which is node address of the destination corresponding to this ASEL-VCC is set. The high order 10 bits indicate BUS_ID and the low order 6 bits indicate PHY_ID.

ASEL-VCC Opr_Speed field consists of 8 bits, and indicates data transferrable speed in this ASEL-VCC. In the case of S100 (100 Mbps), value 00000000 is set. In the case of S200 (200 Mbps), value 00000001 is set. Further, in the case of S400 (400 Mbps), value 00000010 is set. Other values are reserved.

Figure 22:
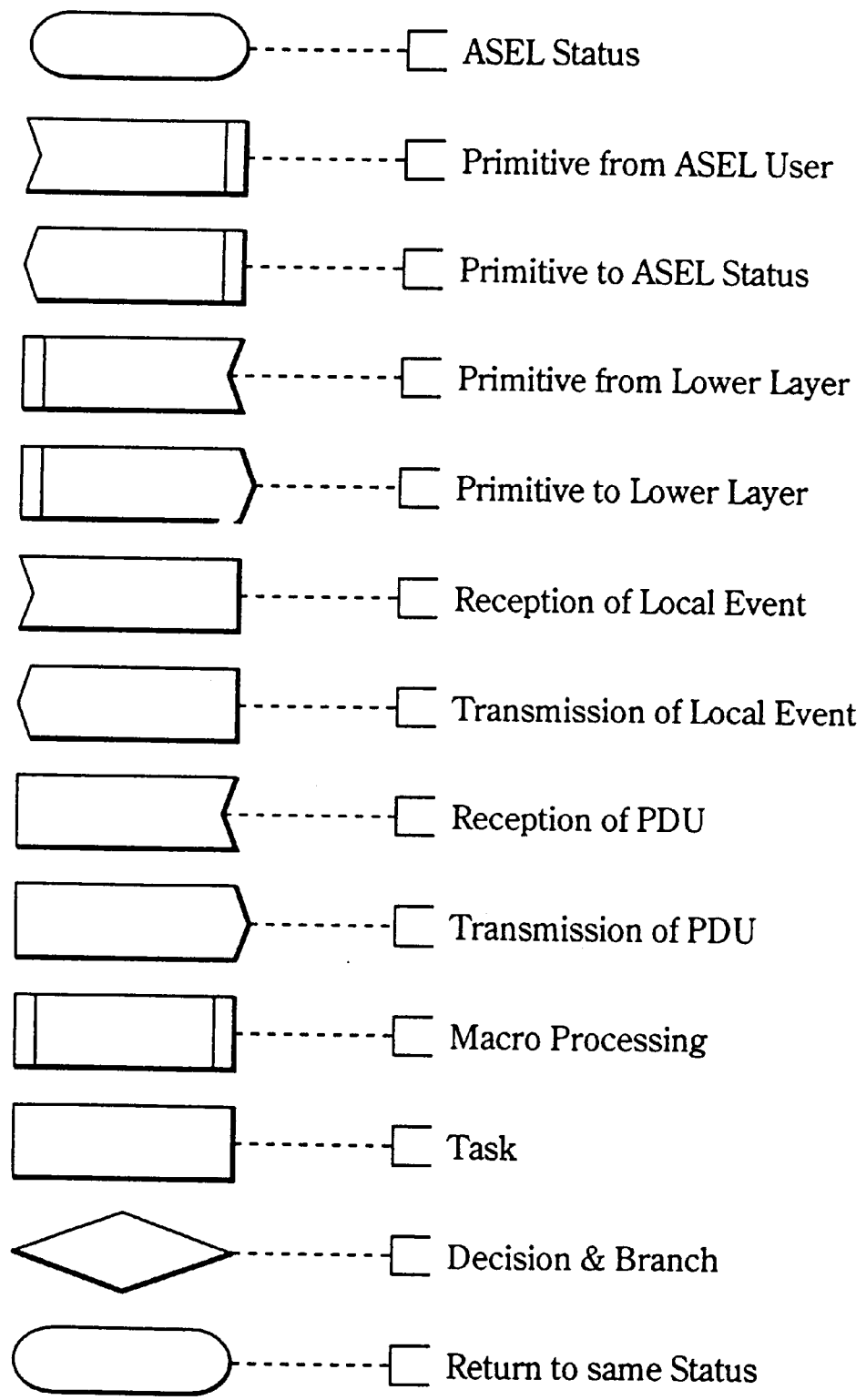
FIG. 22 is a view for explaining SDL.

Explanation will now be given in connection with the process of the status transition of ASEL-CME by using the flowchart represented by SDL (State and Description Language). In this case, the list of SDL keys is shown in FIG. 22. Respective symbols shown in the flowcharts of FIGS. 23 to 25 have meanings as shown in FIG. 22. The process relating to commands of ASEL-CME at User side shown in FIG. 12 is shown in FIGS. 23 to 28, and the process relating to commands of ASEL-CME at Network side shown in FIG. 13 is shown in FIGS. 29 to 35. Further, data transfer process of the transmitting side is shown in FIGS. 36 to 43, and data transfer process of the receiving side is shown in FIGS. 44 to 53.

These processes will now be described. Prior thereto, parameters indicated in the respective processes will be explained as below.

The following parameters are set in a manner common to ASEL entities.

aselLayerOprMode indicates whether ASEL entity is operative in the mode of User side or in the mode of Network side, and can take three kinds of values of Unknown (0), User side (1) and Network side (2).

aselLayerTimer_Reset indicates time (time period) from Timer_Reset start up to expiration, and is represented by integer value ranging from 1 to 64. Unit is second. Default value is 32.

aselLayerTimer_ActPending indicates time (time period) from Timer_ActPending start up to expiration, and is represented by integer value ranging from 1 to 64. Unit is second. Default value is 1.

aselLayerMaxTimerExpire indicates maximum value of the allowable number of expirations of Timer_Act Pending timer, and can take value ranging from 1 to 255. Default value is 4.

aselLayer1394DestOffset indicates special Destination Offset address used for discriminating that the content (payload) of Asynchronous write request packet being received is ASEL-PDU, and can take integer values of 48 bits (0 to 0xffffffffffff).

The following parameters are set independently every ASEL-UNIs.

aselLayerUniId indicates value for uniquely identifying ASEL-UNI (ASEL-UNI ID value).

aselLayer1394BusIndex indicates value for uniquely identifying (discriminating) 1394 serial bus existing on the ASEL-UNI (1394 Bus Index value).

aselLayerStatus indicates current operating Status of ASEL-UNI, and can take three kinds of values of Reset (0), ActPending (1) and Act (2) similarly to Status of ASEL-CME. Initial value is Reset (0).

aselLayerNetSideNodeUniqId globally indicates unique value for identifying 1394 node of Network side of ASEL-UNI (Network Side Node_Unique_ID value), and can take integer values of 64 bits (0 to 0xffff ffff ffff ffff).

aselLayerUserSideNodeUniqId globally indicates unique value for identifying 1394 node of User side of ASEL-UNI (User side Node_Unique_ID value), and can take integer values of 64 bits (0 to 0xffff ffff ffff ffff).

aselLayerNetSideNodeSelfId indicates physical address value on 1394 serial bus for identifying 1394 node of Network side of ASEL-UNI (network side SelfID), and can take integer values of 16 bits (0 to 0xffff). The initial value and the value after clear are assumed to be 0xffff.

aselLayerUserSideNodeSelfId indicates physical address value on the 1394 serial bus for identifying 1394 node of User side of ASEL-UNI (User side SelfID), and can take integer values of 16 bits (0 to 0xffff). The initial value and the value after clear are assumed to be 0xffff.

The following parameters are set independently every ASEL-VCCs.

aselVccVpi indicates VPI value of ASEL-VCC, and can take value ranging from 0 to 255.

aselVccVci indicates VCI value of ASEL-VCC, and can take value ranging from 0 to 65535.

aselVccConnId indicates value for uniquely identifying ASEL-VCC through all ASEL-UNIs (ASEL Connection ID value).

aselVccRouteArea indicates the range of routing of ASEL-VCC, and can take five kinds of values of External (1), Internal and same 1394 bus (2), Internal and other 1394 bus (3), Terminate (4) and Unknown (5). External (1) routing indicates that calling party or called party does not exist on all ASEL-UNIs.

aselVccTopology indicates type of topology of set ASEL-VCC, and can take two kinds of values of Point—Point (1) and Point-Multipoint (2).

aselVccStatus indicates status of ASEL-VCC, and can take two kinds of values of Down (0) and Up (1). The upper layer of ASEL can carry out data transfer only when this status is Up (1).

aselVccAalType indicates AAL type that ASEL-VCC uses, and can take five kinds of values of AAL0(0), AAL1(1), AAL3/4(3) and AAL5(5). In the case where ASEL-VCC does not use AAL, AAL(0) is set.

aselVccQosType indicates bidirectional QoSclass of transmission and reception of ASEL-VCC, and can take four kinds of values of UBR(0), CBR(1), VBR(2) and ABR(3).

aselVccOprSpeed indicates data transferrable speed of ASEL-VCC, and can take three kinds of values of S100(0), S200(1) and S400(2).

aselVccTransmitSegLen is used in dividing long AAL-SDU into several data units of the same length except for the last data unit. Those data units are transmitted as ASEL-SDU. Value of this parameter is equal to each ASEL_PDU length to be transmitted, and is indicated by integer value of byte unit.

aselVccReceiveSeqUse sets, every ASEL-VCC, whether or not ASEL entity uses Sequence Number of received ASEL header, and can take two kinds of values of No use (0) and Use (1).

aselVccIsoChannel indicates Tag value and Isochronous channel value that ASEL-VCC uses, and is represented by integer value ranging from 0 to 255.

aselVccIsoDelayVariationTolerance indicates allowed value of delay fluctuation with respect to ASEL-PDU in ASEL-VCC on Isochronous link, and is represented by No. of ASEL-PDUs per unit time.

aselVccIsoTransmitBand indicates transmit band of ASEL-PDU in ASEL-VCC on Isochronous link, and unit is represented by 64 Kbps (1 Byte/Cycle).

aselVccIsoReceiveBand indicates receive band of ASEL-PDU in ASEL-VCC on Isochronous link, and unit is represented by 64 Kbps (1 Byte/Cycle).

aselVccAsyncDestId indicates Destination ID used at the time of transmission of ASEL-PDU at ASEL-VCC on Asynchronous link.

aselVccAsyncPeakTransmitRate indicates peak transmit rate of ASEL-PDU in ASEL-VCC on Asynchronous link, and unit is represented by 64 Kbps. This parameter can limit sum total of ASEL-PDU lengths per unit time.

aselvccAsyncPeakReceiveRate indicates peak receive rate of ASEL-PDU in ASEL-VCC on Asynchronous link, and unit is represented by 64 Kbps.

The following parameters are independently set every AAL on ASEL-VCC.

aselAalConnVpi indicates VPI value of ASEL-VCC which is using AAL.

aselAalConnVci indicates VCI value of ASEL-VCC which is using AAL.

aselAa15ConnErSduDeliver is related to only ASEL-VCC which is using AAL5. In the case where CRC error is found out in received AAL5-SDU, whether or not corresponding SDU is delivered to the upper layer can be selected as emulation function of AAL5 in ASEL entity.

aselAa15ConnTransmitMaxSduSize indicates the maximum AAL5-SDU size (unit is octet) supported in the transmit direction of ASEL-VCC, and can take value ranging from 0 to 65535. Default value is 9188.

aselAa15ConnReceiveMaxSduSize indicates the maximum AAL5-SDU size (unit is octet) supported in the receive direction of ASEL-VCC, and can take value ranging from 0 to 65535. Default value is 9188.

aselAal0ConnErSduDeliver is related to only ASEL-VCC which is using AAL0. In the case where CRC error is found out in received AAL0-SDU, whether or not corresponding SDU is delivered to the upper layer can be selected as emulation function of AAL0 in ASEL entity.

The following parameters are independently set every ASEL-VCC in which QoS Class is ABR.

aselVccAbrVpi indicates VPI value of ABR ASEL-VCC.

aselVccAbrVci indicates VCI value of ABR ASEL-VCC aselVccAbrMinTransmitRate indicates the minimum transmit rate of ASEL-PDU in ABR ASEL-VCC, and unit is represented by 64 Kbps.

aselVccAbrMinReceiveRate indicates the minimum receive rate of ASEL-PDU in ABR ASEL-VCC and unit is represented by 64 Kbps.

aselVccAbrInitialTransmitRate indicates initial transmit rate of ASEL-PDU in ABR ASEL-VCC and unit is represented by 64 Kbps. This parameter derives sum total of the first ASEL-PDU lengths per unit time where occurrence of data starts. Value of this parameter must not be greater than aselVccAsyncPealTransmitRate and is ordinarily smaller than that value.

aselVccAbrInitialReceiveRate indicates initial receive rate of ASEL-PDU in ABR ASEL-VCC and unit is represented by 64 Kbps.

aselVccAbrAllowedTransmitRate indicates transmittable rate of ASEL-PDU in ABR ASEL-VCC and unit is represented by 64 Kbps. This parameter can limit sum total of ASEL-PDU lengths per unit time. Value of this parameter must not be greater than aselVccAsyncPeakTransmitRate and is ordinarily smaller than that value.

aselVccAbrAllowedReceiveRate indicates receivable rate of ASEL-PDU in ABR ASEL-VCC and unit is represented by 64 Kbps.

aselVccAbrTransmitTrm indicates, by mili second, upper limit of transmit RM cell interval included in ASEL_PDU in active generation source, and can take eight kinds of values of trm0point78125(1), trmipoint5625 (2), trm3point125(3), trm6point25(4), trm12point5(5), trm25(6), trm50(7), trm100(8). Default value is trm100 (8).

aselVccAbrTransmitCdf is cut off decrease factor, and make a control so as to decrease rate in a manner related to missing or delay of RM cell in the opposite direction included in ASEL-PDU. This parameter can take eight kinds of values of cdfo(1), cdfOneOver64(2), cdfOneOver32(3), cdfOneOver16(4), cdfOneOver8(5), cdfOneOver4(6), cdfOneOver2(7), cdfOne(8). According as this value is caused to be greater value, the rate is resultantly decreased in a short time. Default value is cdfOneOver16(4).

aselVccAbrTransmitRif is rate increase factor, and makes a control so as to increase rate in the case where RM cell in the opposite direction included in ASEL-PDU is received along with CI=0 and NI=0. This parameter can take 16 kinds of values of rifOneOver32768(1), rifOneOver16384(2), rifOneOver8192(3), rifOneOver4096(4), rifOneOver2048(5), rifOneOver1024(6), rifOneOver512(7), rifOneOver256(8), rifOneOver128(9), rifOneOver64(10), rifOneOver32(11), rifOneOver16(12), rifOneOver8(13), rifOneOver4(14), rifOneOver2(15), rifOne (16). According as this value is caused to be greater value, the rate is resultantly increased in a short time. Default value is rifOneOver16(12).

aselVccAbrTransmitRdf is rate decrease factor, and makes a control so as to decrease rate in the case where RM cell in the opposite direction included in ASEL-PDU is received along with CI=1. This parameter can take 16 kinds of values of rdfOneOver32768(1), rdfOneOver16384(2), rdfOneOver8192(3), rdfOneOver4096(4), rdfOneOver2048(5), rdfOneOver1024(6), rdfOneOver512(7), rdfOneOver256(8), rdfOneOver128(9), rdfOneOver64(10), rdfOneOver32(11), rdfOneOver16(12), rdfOneOver8(13), rdfOneOver4(14), rdfOneOver2(15), rdfOne(16). According as this value is caused to be greater value, the rate is resultantly decreased in a short time. Default value is rdfOneOver16(12).

aselVccAbrTransmitAdtf is ACR decrease time factor and indicates allowed time of interval for transmitting RM cells included in ASEL-PDU before ACR is decreased into ICR, and can take value ranging from 1 to 1023 (unit is 10 mili sec.). According as this value is caused to be greater value, the current rate can be resultantly maintained for a long time. Default value is 50 (500 ms).

Figure 23:
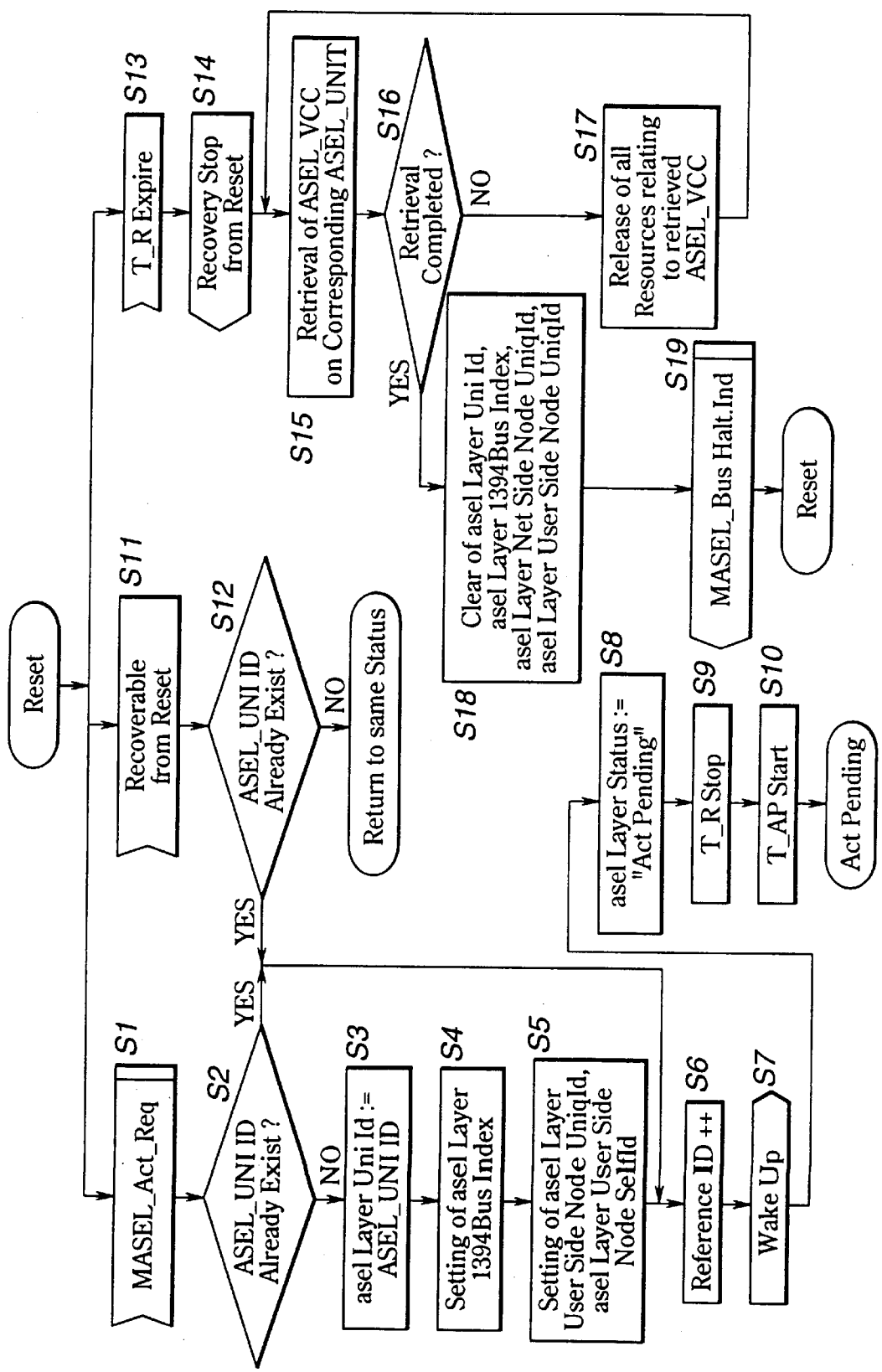
FIG. 23 is a flowchart for explaining processing of status transition from the status of Reset of FIG. 12.

The status transition in Reset of User side of FIG. 12 will now be described with reference to the flowchart of FIG. 23. The processing of steps S1 to S10 of FIG. 23 are the processing in the case of carrying out transition from the status of Reset to the status of ActPending, and the processing of steps S13 to S19 are the processing in the case of carrying out transition to the status of Reset for a second time. The routes (paths) corresponding to the processing of the steps S11, S12 are not shown in FIG. 12.

When primitive of MASEL_Act_Req is received from ASEL layer management at step S1, ASEL-CME judges at step S2 whether or not ASEL-UNI ID already exists. In the case where this ID does not yet exist, the processing operation proceeds to step S3, at which ASEL-CME sets ASEL-UNI ID at aselLayerUniId.

Then, the processing operation proceeds to step S4, at which aselLayer1394BusIndex is set. Further, at step S5, aselLayerUserSideNodeUniqId and aselLayerUserSideNodeSelfId are set. In this example, in the case where it is judged at the step S2 that ASEL-UNI ID already exist, the processing of the steps S3 to S5 are skipped.

Then, the processing operation proceeds to step S6, at which Reference ID is incremented. Thereafter, at step S7, message of WakeUp is outputted to ASEL-CME of Network side. At step S8, ActPending is set at aselLayerStatus. Then, at step S9, Timer_Reset is stopped. At step S10, Timer_ActPending is started. Then, transition to the status of ActPending is carried out.

When local event of Timer_Reset Expire (expiration) is received at step S13, the processing operation proceeds to step S14, at which transmit processing of local event of recovery stop from Reset is carried out. Then, the processing operation proceeds to step S15, at which ASEL-VCC on corresponding ASEL-UNI is retrieved. At step S16, whether or not retrieval is completed is judged. If the retrieval is not completed, the processing operation proceeds to step S17, at which processing for releasing all resources relating to the retrieved ASEL-VCC is executed. Thereafter, the processing operation returns to the step S15. The processing of the step S15 and steps subsequent thereto will be repeatedly executed.

In the case where it has been judged at the step S16 that retrieval has been completed, the processing operation proceeds to step S18, at which aselLayerUniId, aselLayer1394BusIndex, aselLayerNetSideNodeUniqId, aselLayerUserSideNodeUniqId are respectively cleared. Thereafter, the processing operation proceeds to step S19, at which primitive of MASEL_BusHalt.Ind is outputted with respect to the ASEL layer management. Thus, there results the status of Reset (the system control status returns to the Status of Reset) for a second time. After primitive of MASEL_BusHalt.Ind is received, the application software immediately releases resources relating to all VCCs on ASEL_UNI.

On the other hand, in the case where recoverable local event from Reset is received at step S11, the processing operation proceeds to step S12. Thus, whether or not ASEL-UNIID already exists is judged. If ASEL-UNIID does not exist, there results the status of Reset (the system control status returns to the status of Reset) for a second time. If ASEL-UNIID exists, the processing operation proceeds to step S6, at which the processing of the step S6 and processing subsequent thereto are executed. Thus, transition to the status of ActPending is carried out.

Figure 24:
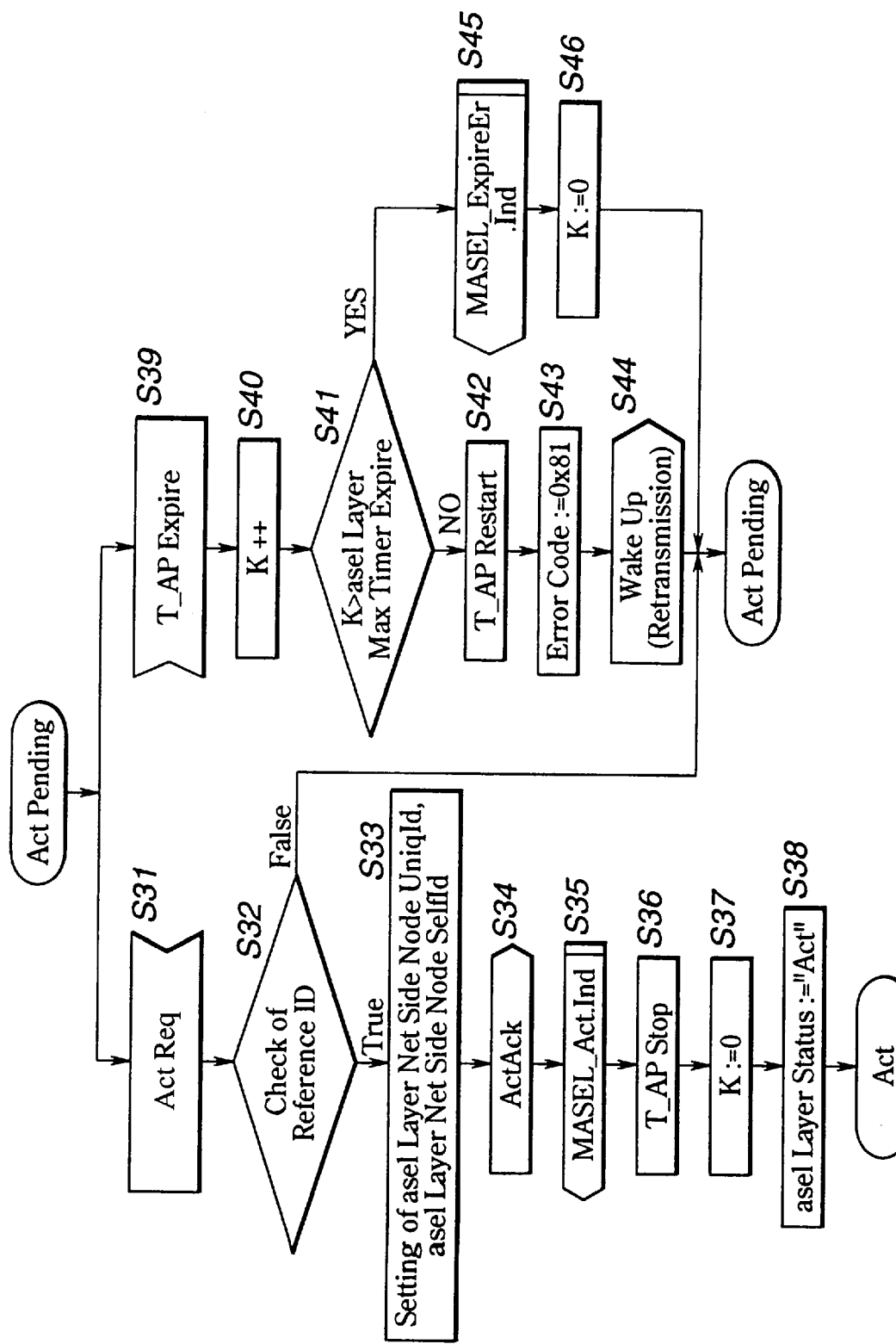
FIG. 24 is a flowchart for explaining processing of status transition from the status of ActPending of FIG. 12.

The status transition of ActPending will now be described with reference to FIG. 24. Processing of steps S31 to S38 indicate processing in the case where transition is carried out from the status of ActPending to the status of Act, and processing of steps S39 to S46 indicate processing in the case where the system control status returns from the status of ActPending to status of ActPending for a second time.

When PDU of ActReq is received from ASEL-CME of Network side at step S31, whether or not Reference ID is True is checked at step S32. In the case where this ID is True, the processing operation proceeds to step S33, at which aselLayerNetSideNode UniqId and aselLayerNetSideNodeSelfId are set. At step S34, PDU of ActAck is transmitted to ASEL-CME of Network side. At step S35, MASEL_Act.Ind is transmitted with respect to the ASEL layer management.

Then, the processing operation proceeds to step S36, at which Timer_ActPending is stopped. At step S37, 0 is set with respect to K. At step S38, Act is set at aselLayerStatus. Then, transition to the status of Act is carried out.

At step S32, in the case where Reference ID is judged to be False, there results the status of ActPending for a second time (the system control status returns to the status of ActPending).

In the case where local event indicating that Timer_ActPending has been expired is received at step S39, the processing operation proceeds to step S40, at which K is incremented. This K indicates the number of expire operations of Timer_ActPending. Then, at step S41, whether or not K is greater than aselLayerMaxTimerExpire is judged. In the case where it is judged that K is greater than aselLayerMaxTimerExpire, the processing operation proceeds to step S45, at which MASEL_expireEr.Ind is outputted with respect to the ASEL layer management. At step S46, 0 is set with respect to K. Thus, there results the status of ActPending for a second time (the system control status returns to the status of actpending).

In the case where it is judged at the step S41 that K and aselLayerMaxTimerExpire are equal to each other, or K is smaller than the latter, the processing operation proceeds to step S42. Thus, Timer_ActPending is re-started. At step S43, 0x81 is set at Error Code. At step S44, message of WakeUp is transmitted (is re-transmitted) to ASEL-CME of Network side as PDU. Thus, there results the status of ActPending for a second time (the system control status returns to the status of Actpending).

The processing in the case where the system control status returns to the status of Act for a second time from the status of Act will now be described with reference to FIGS. 25 and 26.

Figure 25:
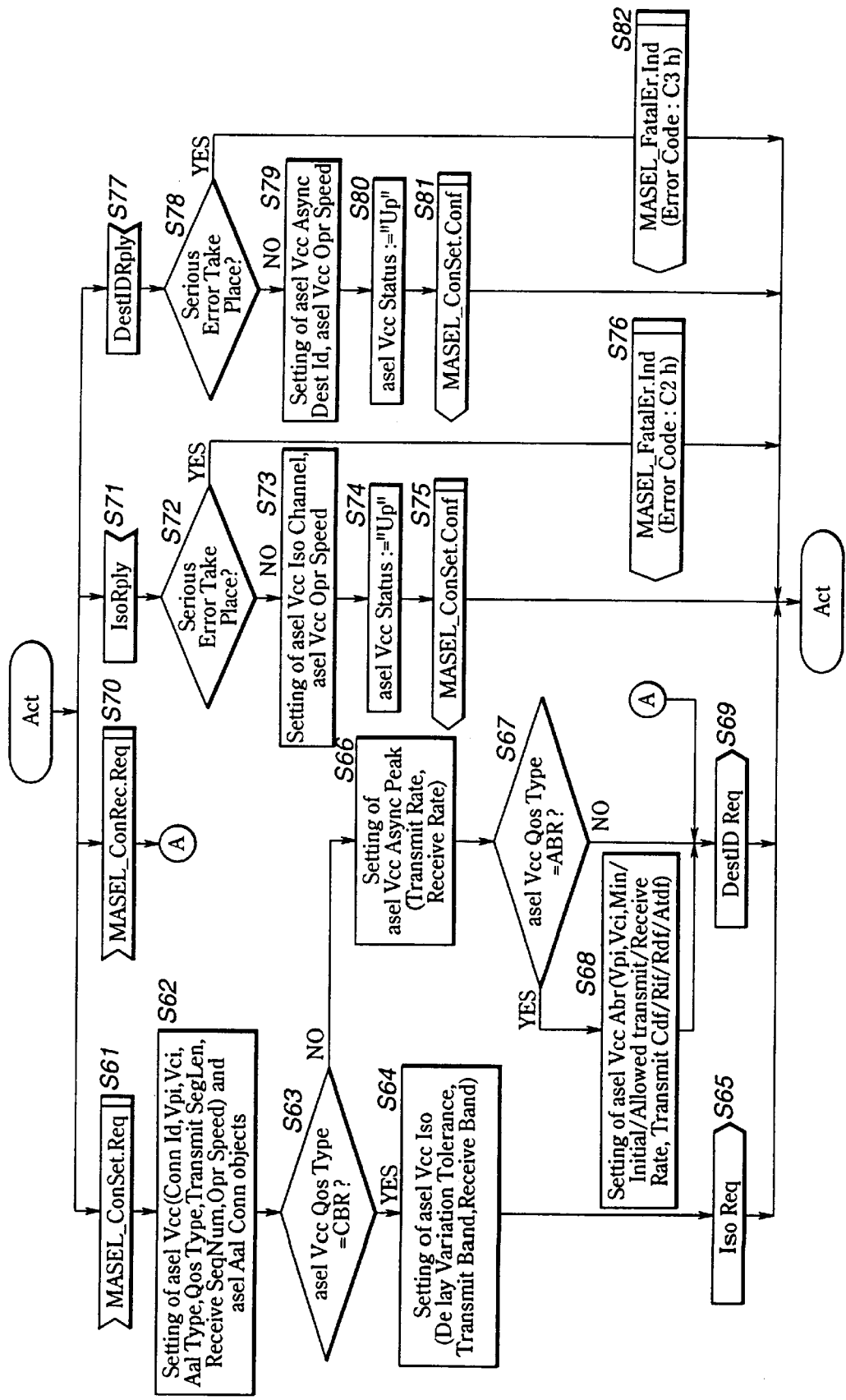
FIG. 25 is a flowchart for explaining processing of status transition from the status of Act of FIG. 12.

In FIG. 25, when MASEL_ConSet.Req is received from ASEL layer management at step S61, aselVccConnId, aselVccVpi, aselVccVci, aselVccAalType, aselVccQosType, aselVccTransmitSegLen, aselVccReceiveSeqNum, aselVccOprSpeed, aselAalConn objects are set at step S62. Then, the processing operation proceeds to step S63, at which whether or not aselVccQosType is set at CBR is judged. In the case where the aselVccQosType is set at CBR, the processing operation proceeds to step S64, at which aselVccIsoDelayVariationTolerance,aselVccIsoTransmitBand, aselVccIsoReceiveBand are set. Then, at step S65, IsoReq is transmitted to ASEL-CME of Network side as PDU. Thus, there results the status of Act for a second time (the system control status returns to the status of Act).

In the case where it is judged at the step S63 that CBR is not set at aselVccQosType, the processing operation proceeds to step S66, at which aselVccAsyncPeakTransmitRate, aselVccAsyncPeakReceiveRate are set. Then, at step S67, whether or not ABR is set at aselVccQosType is judged. In the case where it is judged that ABR is not set at aselVccQosType, the processing operation proceeds to step S69, at which PDU of DestIDReq is transmitted to ASEL-CME of Network side. Thus, there results the status of Act for a second time (the system control status returns to status of Act).

In the case where it is judged at the step S67 that ABR is set at aselVccQosType, the processing operation proceeds to step S68, at which aselVccAbrVpi, aselVccAbrVci, aselVccAbrMinTransmitRate, aselVccAbrMinReceiveRate, aselVccAbrInitialTransmitRate, aselVccAbrInitialReceiveRate,aselVccAbrAllowedTransmitRate, aselVccAbrAllowedReceiveRate, aselVccAbrTransmitCdf, aselVccAbrTransmitRif, aselVccAbrTransmitRdf, aselVccAbrTransmitAtdf are respectively set. Thereafter, the processing operation proceeds to step S69 to output PDU of DestIDReq to ASEL-CME of Network side. Thus, there results the status of Act for a second time (the system control status returns to the status of Act).

When, MASEL_ConRec.Req is received from ASEL layer management at step S70, the processing operation proceeds to step S69 to transmit DestIDReq to ASEL-CME of Network side. Thus, there results the status of Act for a second time (the system control status returns to the status of Act).

When PDU of IsoRply is received from ASEL-CME of Network side at step S71, the processing operation proceeds to step S72, at which whether or not serious (fatal) error takes place is judged. In the case where it has been judged that serious (fatal) error takes place, the processing operation proceeds to step S76, at which MASEL_FatalEr.Ind (ErrorCode is caused to be C2h) is outputted with respect to the ASEL layer management. Thus, there results the status of Act for a second time (the system control status returns to the status of Act).

In the case where it is judged at the step S72 that serious (fatal) error does not take place, the processing operation proceeds to step S73, at which aselVccIsoChannel, aselVccOprSpeed are set. At step S74, Up is set at aselVccStatus. Then, at step S75, MASEL_ConSet.Conf is outputted to ASEL layer management. Thus, there results the status of Act for a second time (the systemm control status returns to the status of Act).

When DestIDRply is received from ASEL-CME of Network side at step S77, the processing operation proceeds to step S78, at which whether or not serious (fatal) error takes place is judged. In the case where it has been judged that serious (fatal) error takes place, the processing operation proceeds to step S82, at which MASEL_FatalEr.Ind (ErrorCode is caused to be C3h) is outputted with respect to the ASEL layer management. Thus, there results the status of Act for a second time (the system control status returns to the status of Act).

In the case where it has been judged at the step S78 that serious (fatal) does not take place, the processing operation proceeds to step S79, at which aselVccAsyncDestID and aselVccOprSpeed are set. At step S80, Up is set at aselVccStatus. Further, at step S81, MASEL_ConSet.Conf is outputted with respect to the ASEL layer management. Thus, there results the status of Act for a second time (the system control status returns to the status of Act).

Figure 26:
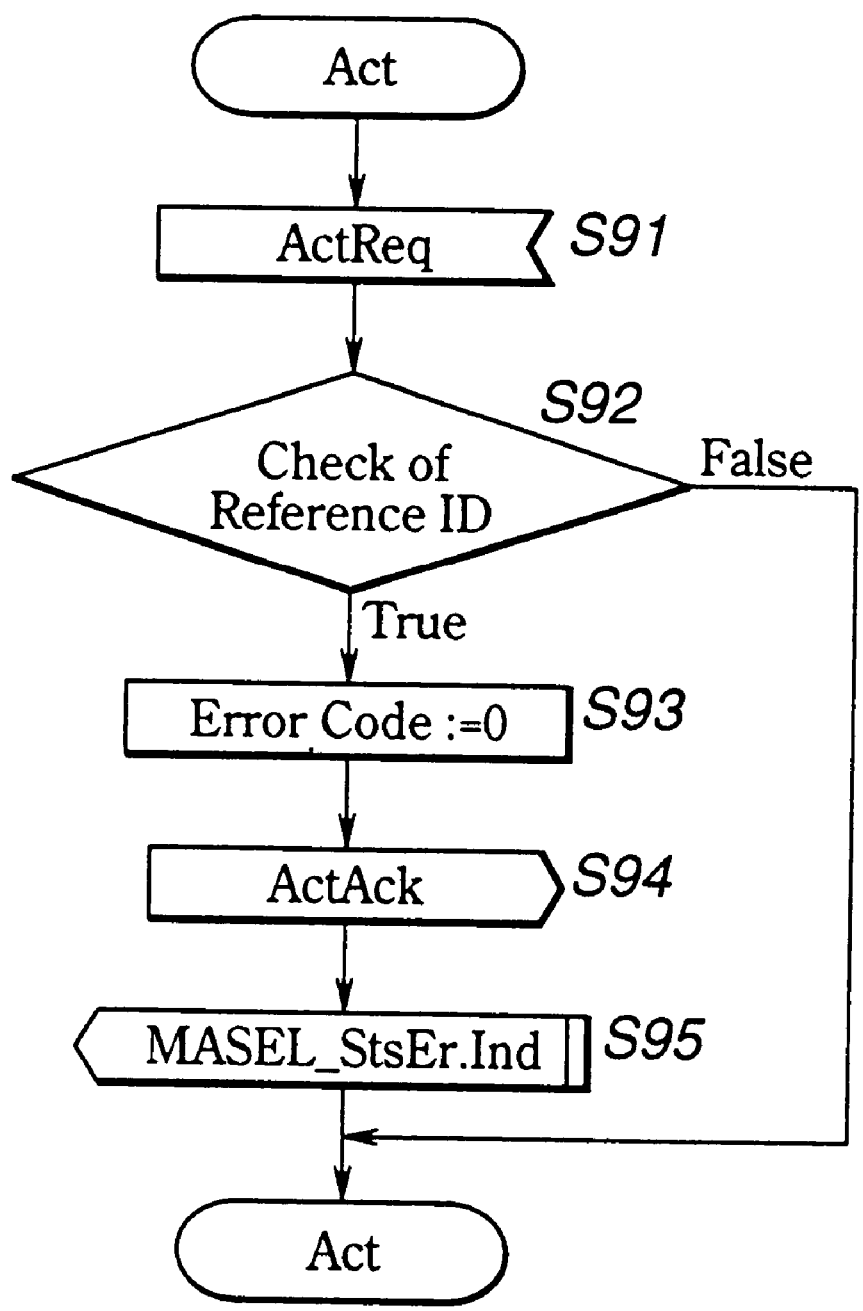
FIG. 26 is a flowchart for explaining processing of status transition from the status of Act of FIG. 12.

In FIG. 26, when ActReq is received from ASEL-CME of Network side at step S91, whether or not Reference ID is True is judged at step S92. In the case where this ID is judged to be True, the processing operation proceeds to step S93, at which 0 is set at Error Code. At step S94, ActAck is transmitted to ASEL-CME of Network side. Then, at step S95, MASEL_StsEr.Ind is outputted to ASEL layer management. Thus, there results the status of Act for a second time (the system control status returns to the status of Act). In the case where it has been judged at step S92 that Reference ID is False, the processing of steps S93 to S95 are skipped. Thus, there immediately results the status of Act (the system control status immediately returns to the status of Act).

Figure 27:
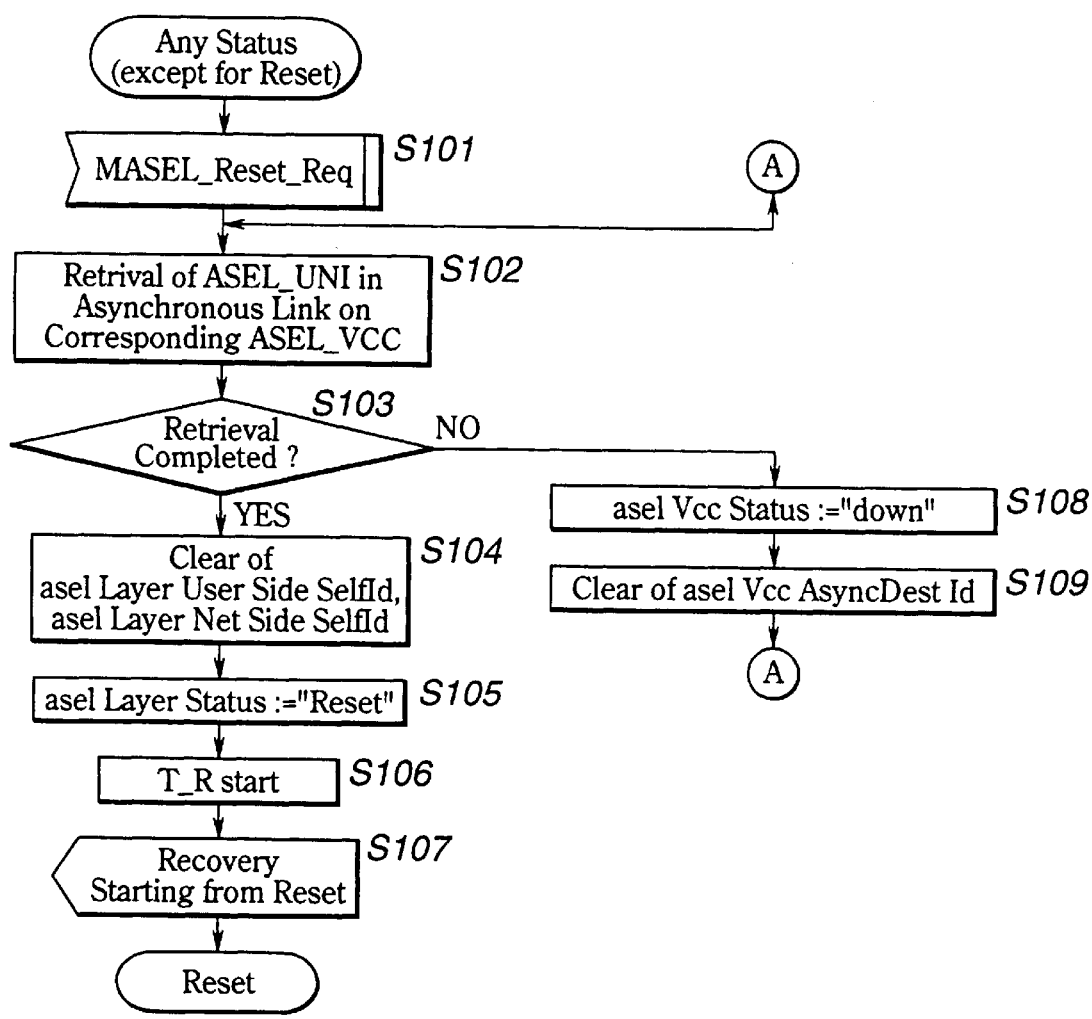
FIG. 27 is a flowchart for explaining processing of status transition from any status of FIG. 12.

Further, in any (arbitrary) status (status of ActPending or Act) except for Reset shown in FIG. 12, processing shown in the flowchart of FIG. 27 is carried out. Thus, transition to the status of Reset takes place.

Namely, when MASEL_Reset.Req is received from the ASEL layer management at step S101, ASEL-VCC in Asynchronous Link on corresponding ASEL-UNI is retrieved at step S102. At step 103, whether or not this retrieval is completed is judged. If this retrieval is not completed, the processing operation proceeds to step S108, at which down is set at aselVccStatus. Then, at step S109, aselVccAsyncDestId is cleared, and the processing operation returns to the step S102. Thus, the processing of the step S102 and steps subsequent thereto will be repeatedly executed.

In the case where it is judged at step S103 that retrieval is completed, the processing operation proceeds to step S104, at which aselLayerUserSideSelfId and aselLayerNetSideSelfId are cleared. At step S105, Reset is set at aselLayerStatus. At step S106, Timer_Reset is started. Further, at step S107, local event in recovery starting state from Reset is transmitted. Thus, transition to the status of Reset is carried out.

Figure 28:
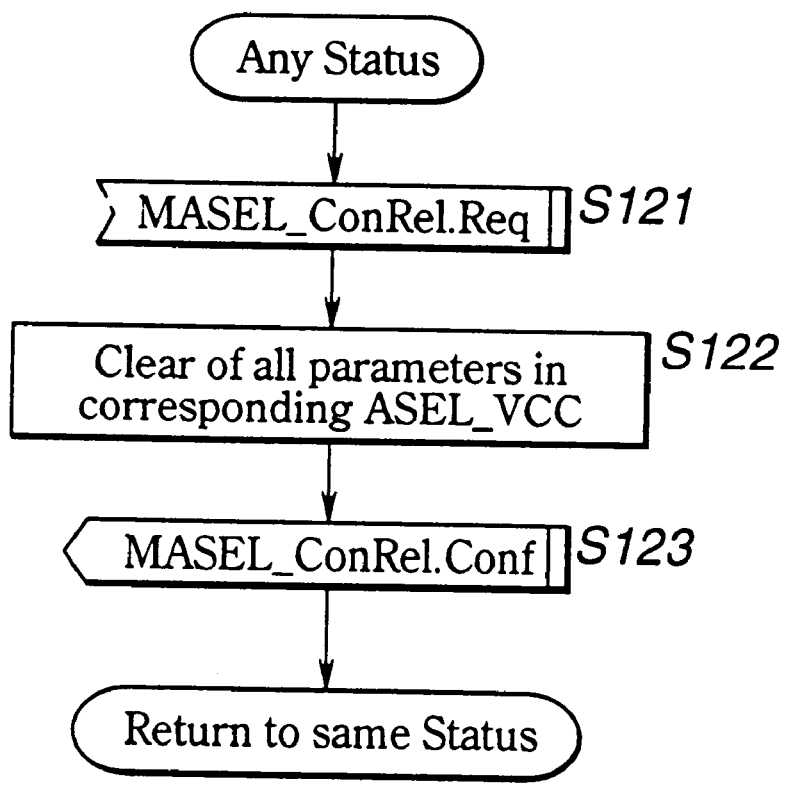
FIG. 28 is a flowchart for explaining processing of status transition from any status of FIG. 12.

Moreover, in all of three statuses of FIG. 12, processing shown in FIG. 28 is carried out. Namely, when MASEL_ConRel.Req is received from ASEL layer management at step S121, the processing operation proceeds to step S122, at which all parameters in corresponding ASEL-VCC are cleared. Then, at step S123, MASEL_ConRel.Conf is outputted to the ASEL layer management. Thus, there results the original status (the system control status returns to the original status).

Figure 29:
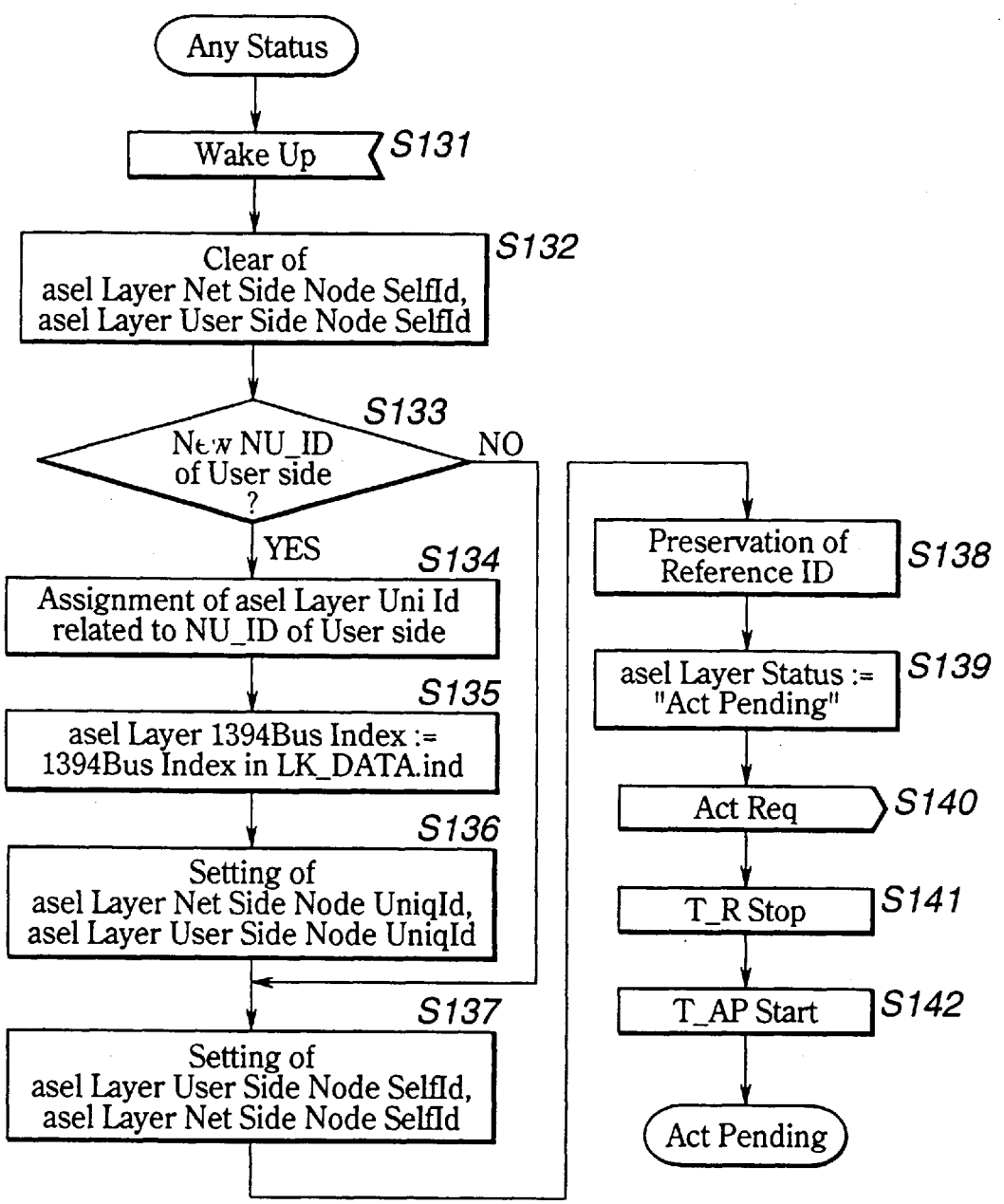
FIG. 29 is a flowchart for explaining processing of status transition from any status of FIG. 13.

Explanation will now be given with reference to the flowcharts of FIGS. 29 to 35 in connection with the status transition in three statuses of Network side of FIG. 13. FIG. 29 shows processing carried out in any one of three statuses of FIG. 13. Initially, when WakeUp is received from ASEL-CME of User side at step S131, aselLayerNetSideNodeSelfID and aselLayerUserSideNodeSelfID are cleared at step S132. Then, the processing operation proceeds to step S133, at which whether or not NU_ID of terminal of User side which has transmitted WakeUp message is new NU_ID of User side different from NU_ID until that time is judged.

In the case where it is judged that corresponding NU_ID is new NU_ID of User side, the processing operation proceeds to step S134, at which assignment processing of aselLayerUniID caused to be in relevancy to NU_ID of User side is executed. Then, the processing operation processing proceeds to step S135, at which 1394 Bus Index in LK_DATA.ind is set at aselLayer1394BusIndex. At step S136, aselLayerNetSideNodeUniqId, aselLayerUserSideNodeUniqId are set. In the case where it is judged at the step S133 that NU_ID of terminal of User side which has transmitted WakeUp message is not new NU_ID of User side, the above-mentioned processing of steps S134 to S136 are skipped.

Then, the processing operation proceeds to step S137, at which aselLayerUserSideNodeSelfId, aselLayerNetSideNodeSelfId are set. At step S138, Reference ID is preserved (stored). Further, at step S139, ActPending is set at aselLayerStatus. At step S140, ActReq is transmitted to ASEL-CME of User side. At step S141, Timer_Reset is stopped. In addition, at step S142, after Timer_ActPending is started, transition to the status of ActPending is carried out.

Namely, in this way, processing of transition or return from the status of Reset, the status of Act or the status of ActPending to the status of ActPending is carried out.

Figure 30:
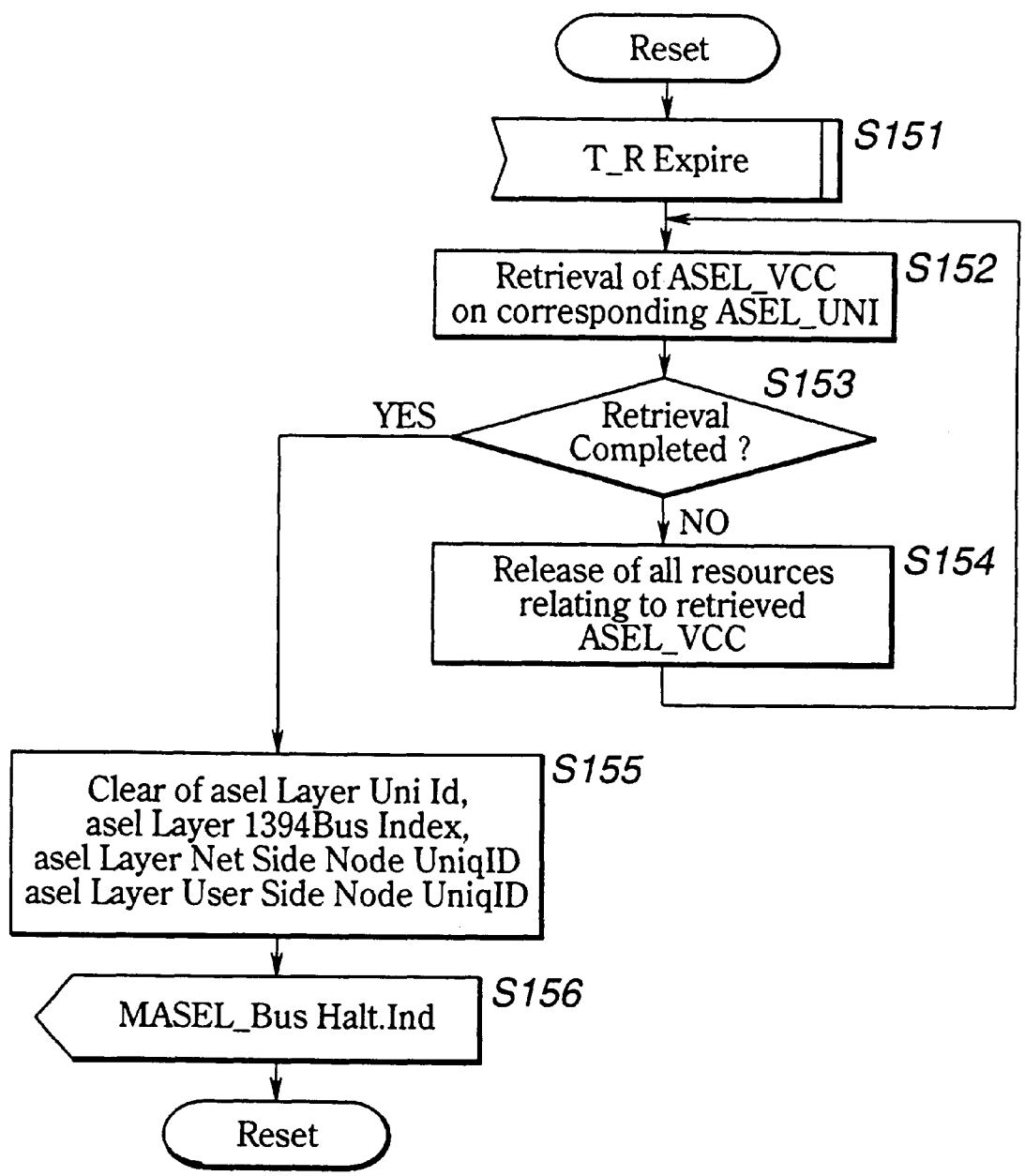
FIG. 30 is a flowchart for explaining processing of status transition from the status of Reset of FIG. 13.

FIG. 30 shows processing in the case where the system control status returns, from the status of Reset of FIG. 13, to that status for a second time. In this processing, initially, when local event of Timer_Reset expire is received at step S151, ASEL-VCC on corresponding ASEL-UNI is retrieved at step S152. Then, at step S153, whether or not retrieval is completed is judged. If retrieval is not completed, the processing operation proceeds to step S154, at which processing for releasing all resources relating to the retrieved ASEL-VCC is executed. Then, the processing operation returns to the step S152. Thus, processing at this step and steps subsequent thereto are repeatedly executed.

In the case where it is judged at the step S153 that retrieval is completed, the processing operation proceeds to step S155, at which aselLayerUniId, AselLayer1394BusIndex, aselLayerNetSideNodeUniqId, aselLayerUserSideNodeUniqId are cleared. Then, at step S156, MASEL_BusHalt.Ind is outputted to ASEL layer management. Thus, there results the status of Reset for a second time (the system control status returns to the status of Reset. When MASEL_BusHalt.Ind is outputted to ASEL layer management at the step S156, application software releases, after this primitive is received, resource relating to all VCCs on ASEL-UNI similarly to the case at the step S19 of FIG. 23.

Figure 31:
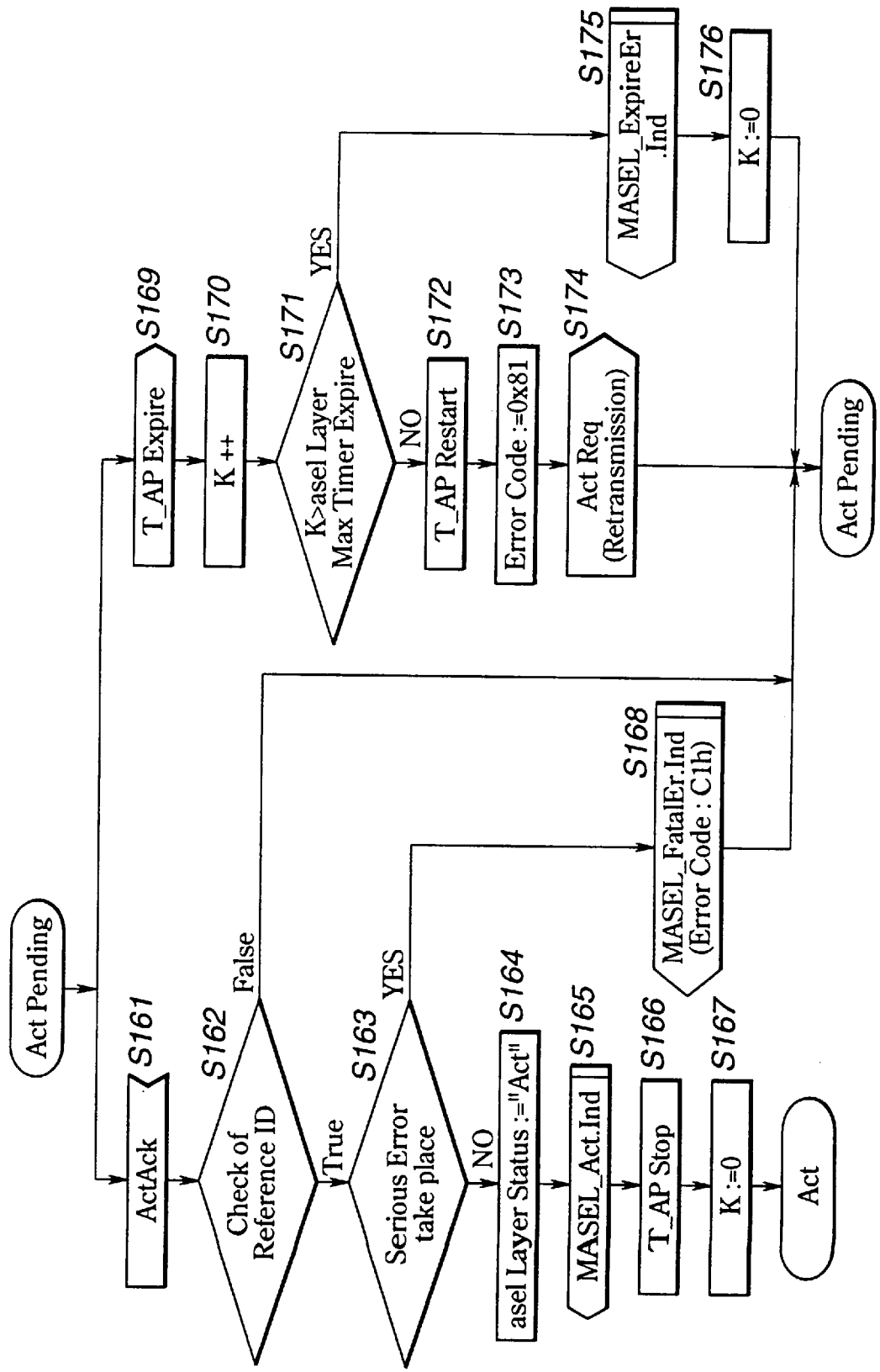
FIG. 31 is a flowchart for explaining processing of status transition from the status of ActPending of FIG. 13.

Explanation will now be given with reference to FIG. 31 in connection with processing in the case where transition from the status of ActPending of FIG. 13 to the status of Act is carried out (steps S161 to S167) and processing in the case where the system control status returns, from the status of ActPending, to that status for a second time (steps S161, S162, S163 and S168 to S176).

When ActAck is received from ASEL-CME of User side at step S161, check of Reference ID is carried out at step S162. In the case where it is judged that Reference ID is True, the processing operation proceeds to step S163, at which whether or not serious (fatal) error takes place is judged. In the case where serious (fatal) error does not take place, the processing operation proceeds to step S164, at which Act is set at aselLayerStatus. Then, at step S165, MASEL_ACT.Ind is outputted to ASEL layer management. At step S166, Timer_ActPending is stopped. At step S167, 0 is set with respect to K. Thus, transition to the status of Act is carried out.

In the case where it is judged at the step S162 that Reference ID is False, transition to the status of ActPending is immediately carried out. Moreover, in the case where it is judged at the step S163 that serious (fatal) error takes place, the processing operation proceeds to step S168. Thus, after MASEL_FatalEr.Ind (Error Code is caused to be C1h) is outputted to ASEL layer management, transition to the status of ActPending is carried out.

In the case where event of Timer_ActPending expire is received at step S169, the processing operation proceeds to step S170, at which parameter K equal to the number of expire operations of Timer_ActPending is incremented by 1. Thereafter, the processing operation proceeds to step S171, at which whether or not K is greater than aselLayerMaxTimerExpire is judged. In the case where it is judged that K is greater than aselLayerMaxTimerExpire, the processing operation proceeds to step S175, at which MASEL_ExpireEr.Ind is outputted to ASEL layer management. Thereafter, at step S176, 0 is set with respect to K. Thus, there results the status of ActPending for a second time (the system control status returns to the status of ActPending).

In the case where it is judged at the step S171 that value of K is equal to aselLayerMaxTimerExpire or is smaller than that, the processing operation proceeds to step S172, at which processing for re-starting Timer_ActPending is carried out. Then, at step S173, 0x81 is set at Error Code. At step S174, ActReq is transmitted (re-transmitted) to ASEL-CME of User side. Thus, there results the status of ActPending for a second time (the system control status returns to the status of ActPending).

Explanation will now be given with reference to the flowcharts of FIGS. 32 and 33 in connection with the processing in the case where the system control status returns, from the status Act of FIG. 13, to that status for a second time.

Figure 32:
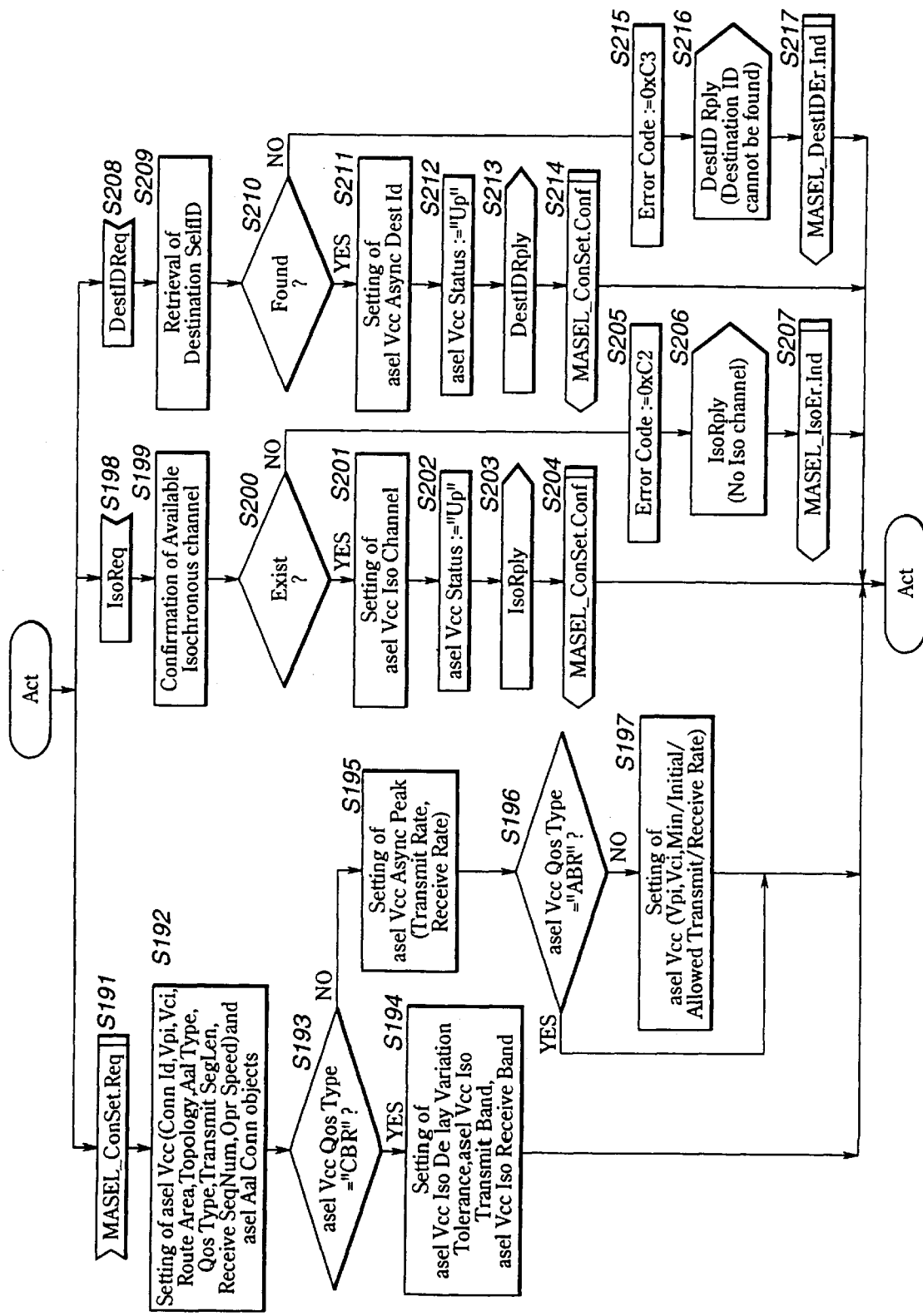
FIG. 32 is a flowchart for explaining processing of status transition from the status of Act of FIG. 13.

When MASEL_ConSet.Req is received from ASEL layer management in the status of Act at step S191 of FIG. 32, the processing operation proceeds to step S192, at which aselVccConnId, aselVccVpi, aselVccVci, aselVccRouteArea, aselVccTopology, aselVccAalType, aselVccQosType, aselVccTransmitSegLen, aselVccReceiveSeqNum, aselVccOprSpeed, aselAalConn objects are set.

Then, the processing operation proceeds to step S193, at which whether or not CBR is set at aselVccQosType is judged. In the case where it is judged that CBR is set at aselVccQosType, the processing operation proceeds to step S194, at which aselVccIsoDelayVariationTolerance, aselVccIsoTransmitBand, aselVccIsoReceiveBand are set. Then, there results the status of Act for a second time (the system control status returns to the status of Act).

In the case where it is judged at the step S193 that CBR is not set at aselVccQosType, the processing operation proceeds to step S195, at which aselVccAsyncPeakTransmitRate, aselVccAsyncPeakReceiveRate are set. Then, the processing operation proceeds to step S196, at which whether or not aselVccQosType is ABR is judged. In the case where aselVccQosType is ABR, the processing operation proceeds to step S197, at which aselVccAbrVpi, aselVccAbrVci, aselVccAbrMinTransmitRate, aselVccAbrMinReceiveRate, aselVccAbrInitialTransmitRate,aselVccAbrInitialReceiveRate, aselVccAbrAllowedTransmitRate, aselVccAbrAllowedReceiveRate are set. In the case where it is judged at the step S196 that aselVccQosType is not ABR, the processing of the step S197 is skipped. Thus, there results the status of Act for a second time (the system control status returns to the status of Act).

When IsoReq is received from ASEL-CME of User side at step S198 in the status of Act, the processing operation proceeds to step S199, at which confirmation of available Isochronous channel is carried out. Then, at step S200, whether or not available Isochronous channel exists is judged. In the case where it is judged that available Isochronous channel exists, the processing operation proceeds to step S201, at which corresponding channel is set with respect to aselVccIsoChannel. At step S202, Up is set at aselVccStatus. Then, at step S203, IsoRply is transmitted to ASEL-CME of User side. At step S204, MASEL_Con.Set.Conf is outputted with respect to ASEL layer management. Thereafter, there results the status of Act for a second time (the system control status returns to the status of Act).

In the case where it is judged at the step S200 that available Isochronous channel does not exist, the processing operation proceeds to step S205, at which 0xC2 is set at Error Code. At step 206, IsoRply indicating that Iso channel does not exist is transmitted to ASEL-CME of User side. At step S207, MASEL_IsoEr.Ind is outputted with respect to ASEL layer management. Thus, there results the status of Act for a second time (the system control status returns to the status of Act).

In the case where DestIDReq is received from ASEL-CME of User side at step S208, the processing operation proceeds to step S209, at which retrieval processing of Destination SelfID is carried out. At step S210, whether or not Destination SelfID is retrieved (found) is judged. In the case where Destination SelfID is retrieved, the processing operation proceeds to step S211, at which its result is set at aselVccAsyncDestID. At step S212, Up is further set at aselVccStatus. At step S213, DestIDRply is transmitted to ASEL-CME of User side. Further, at step S214, MASEL_ConSet.Conf is outputted to ASEL layer management. Thus, there results the status of Act for a second time (the system control status returns to the Status of Act).

In the case where it is judged at step S210 that Destination SelfID is not retrieved, the processing operation proceeds to step S215, at which 0xC3 is set with respect to Error Code. At step S216, DestIDRply indicating that Destination ID cannot be found is transmitted to ASEL-CME of User side. Further, at step S217, MASEL_DestIDEr.Ind is outputted to ASEL layer management. Thereafter, there results the status of Act for a second time (the system control status returns to the status of Act).

Figure 33:
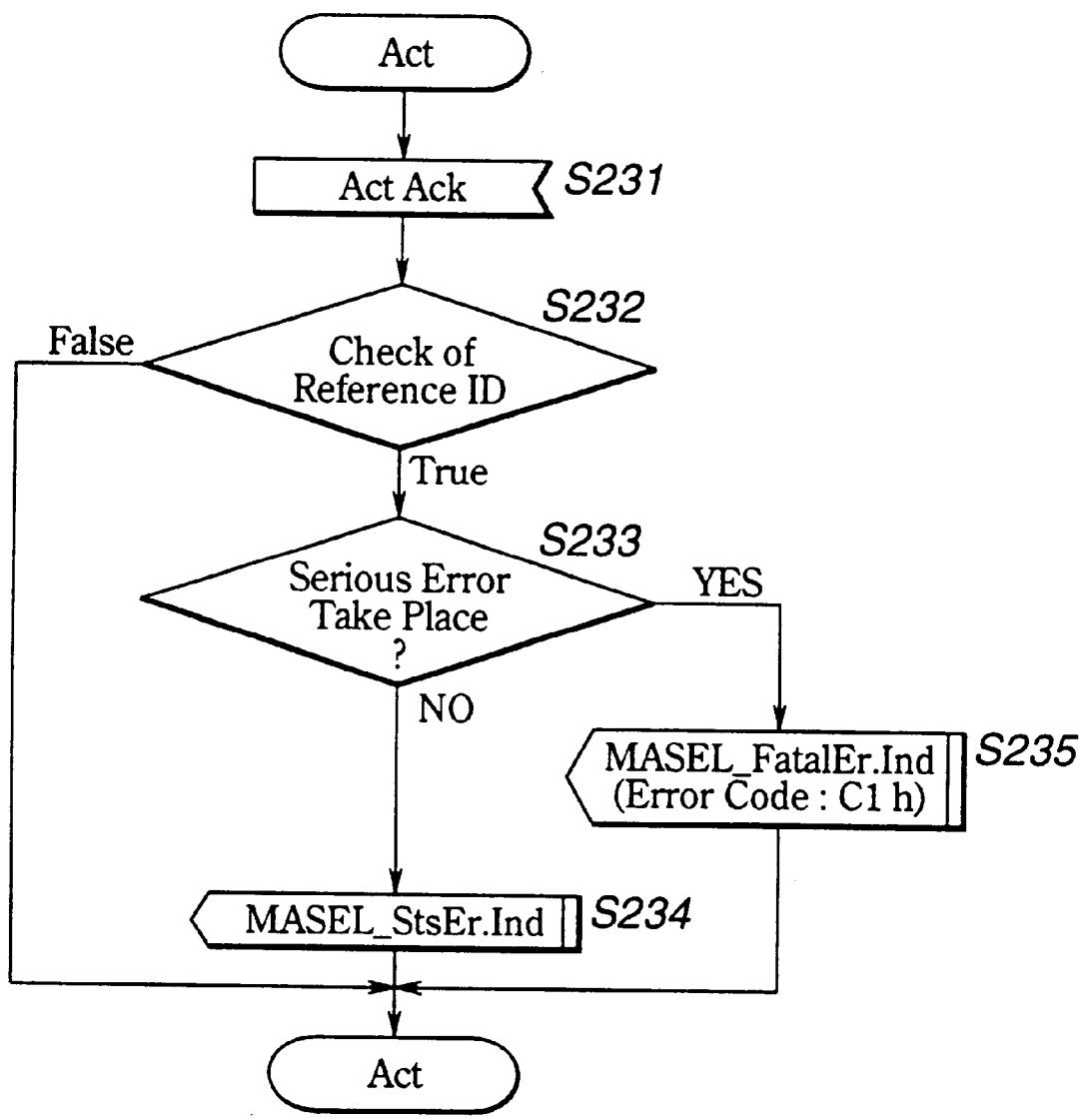
FIG. 33 is a flowchart for explaining processing of status transition from the status of Act of FIG. 13.

In FIG. 33, when ActAck is received from ASEL-CME of User side at step S231, whether or not Reference ID is True is judged at step S232. In the case where this ID is True, the processing operation proceeds to step S233, at which whether or not serious (fatal) error takes place is judged. In the case where it is judged that serious (fatal) error takes place, the processing operation proceeds to step S235, at which MASEL_FatalEr.Ind (C1h is set at Error Code) is outputted to ASEL layer management. Thus, there results the status of Act for a second time (the system control status returns to the status of Act).

In the case where it is judged at the step S233 that serious (fatal) error does not take place, the processing operation proceeds to step S234, at which MASEL_StsEr.Ind is outputted to ASEL layer management. Thereafter, there results the status of Act for a second time (the system control status returns to status of Act).

In the case where it is judged at the step S232 that Reference ID is False, the processing of steps S233 to S235 are skipped. Thus, there results the status of Act for a second time (the system control status returns to the status of Act).

Figure 34:
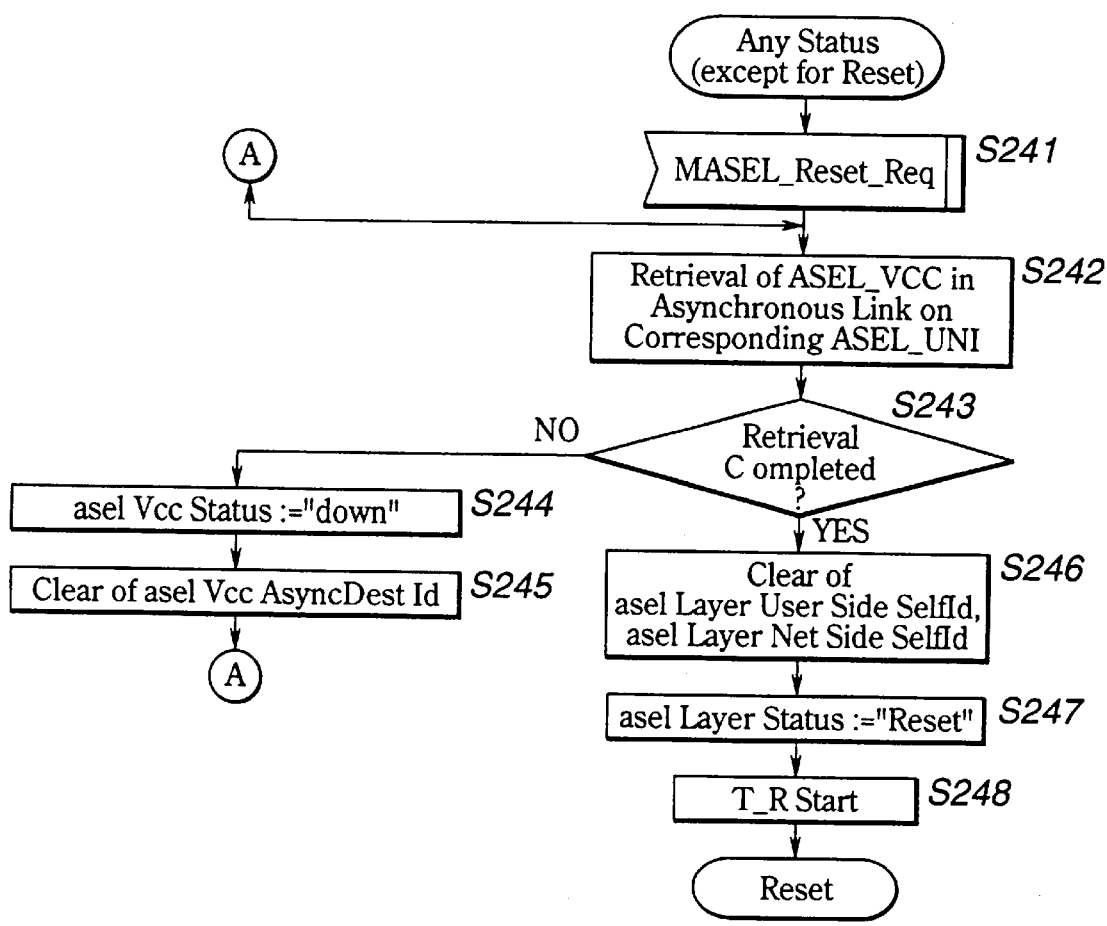
FIG. 34 is a flowchart for explaining processing of status transition from any status of FIG. 13.

Further, in the status except for Reset of FIG. 13, i.e., in the status of Actpending or the status of Act, processing of transition to Reset is carried out by processing of FIG. 34.

In this case, when MASEL_Reset.Req is received from ASEL layer management at step S241, processing for retrieving ASEL-VCC in Asynchronous Link on corresponding ASEL-UNI is carried out at step S242. At step S243, whether or not retrieval has been completed is judged. In the case where retrieval has not yet been completed, the processing operation proceeds to step S244, at which down is set at aselVccStatus. After aselVccAsyncDestID is cleared at step S245, the processing operation returns to the step S242. Thus, processing at the step S242 and those at steps subsequent thereto are repeatedly executed.

In the case where it is judged at the step S243 that retrieval has been completed, the processing operation proceeds to step S246, at which aselLayerUserSideSelfId and aselLayerNetSideSelfId are cleared. At step S247, Reset is set with respect to aselLayerStatus. At step S248, Timer_Reset is started. Thereafter, transition to the status of Reset is carried out.

Figure 35:
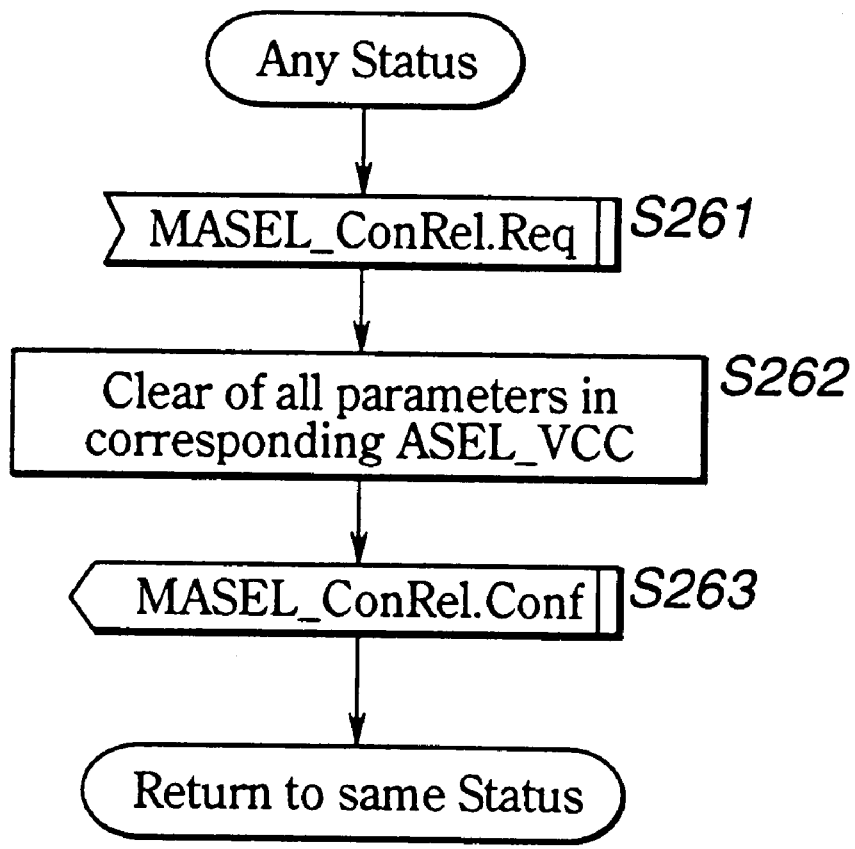
FIG. 35 is a flowchart for explaining processing of status processing from any status of FIG. 13.

Further, in any (arbitrary) status of three statuses of FIG. 13, processing indicated by the flowchart of FIG. 35 is carried out. In this case, when MASEL_ConRel.Req is received from ASEL layer management at step S261, all parameters in corresponding ASEL-VCC are cleared at step S262. Then, at step S263, MASEL_ConRef.Conf is outputted to ASEL layer management. Thereafter, there results the original status for a second time (the system control status returns to the original status).

Explanation will be given with reference to the flowcharts of FIGS. 36 to 43 in connection with the processing in the case of transmitting data from Upper Layer of FIG. 6 to 1394 Link layer, or from ASEL layer management to 1394 Link layer.

Figure 36:
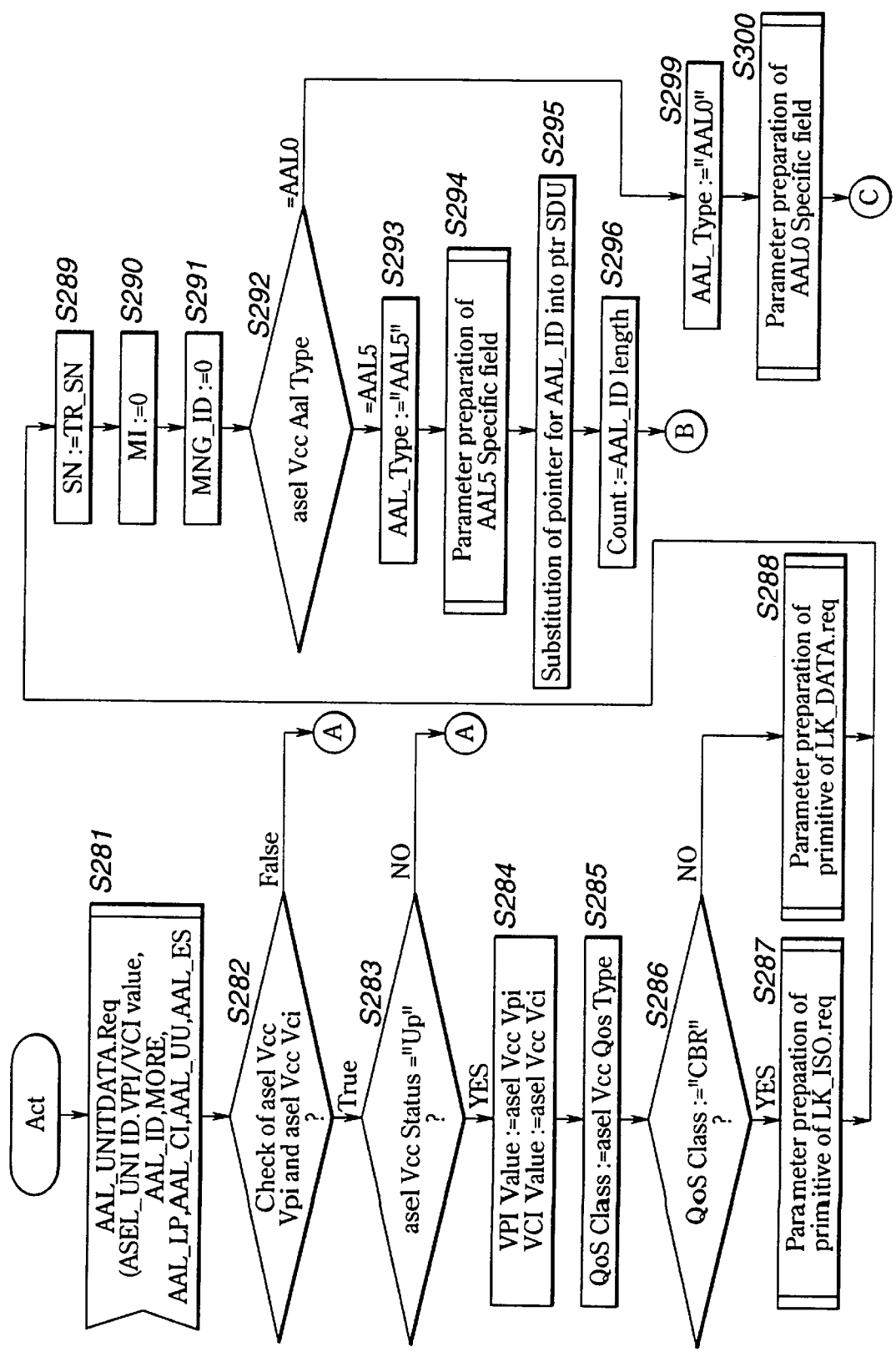
FIG. 36 is a flowchart for explaining processing of data transfer from the status of Act.
Figure 37:
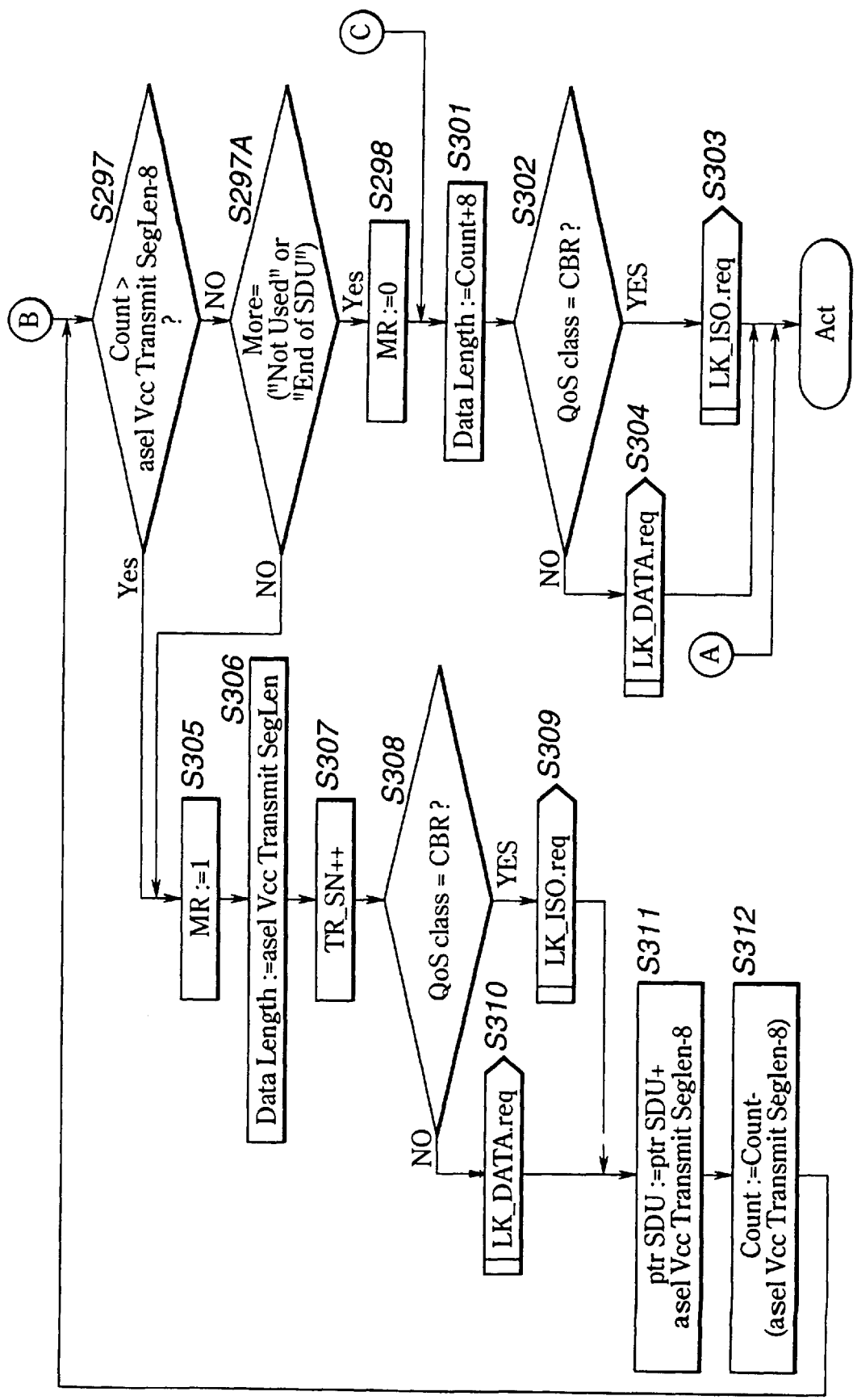
FIG. 37 is a flowchart for explaining processing in the case where data is transferred.

FIGS. 36 and 37 show processing in the case where LK_ISO.req or LK_DATA.req is outputted to 1394 Link layer when ASEL receives input of ALL_UNITDATA.Req from Upper Layer.

Initially, at step S281, in the status of Act, AAL_UNITDATA.Req is received from Upper Layer. In this AAL_UNITDATA.Req, ASEL-UNI ID, VPI/VCI Value, AAL-ID, More, AAL-LP, ALL-CI, AAL-UU, AAL-ES are included.

Then, the processing operation proceeds to step S282, at which check as to whether or not aselVccVpi and aselVccVci corresponding to ASEL-UNI ID and VPI/VCI Value exist is carried out. In the case where it is judged that result of this check is True, the processing operation proceeds to step S283, at which whether or not aselVccStatus is Up is judged. In the case where Up is set with respect to aselVccStatus, the processing operation proceeds to step S284, at which value of aselVccVpi is set with respect to VPI Value of ASEL header and value of aselVccVci is set with respect to VCI Value. In this example, in the case where result of the check was False at the step S282, or in the case where it was judged at the step S283 that Up is not set with respect to aselVccStatus, there results the status of Act for a second time (the system control status returns to the status of Act).

Then, at step S285, aselVccQosType is set at QoS class. At step S286, whether or not QoS class is CBR is judged. In the case where it is judged that QoS class is CBR, the processing operation proceeds to step S287, at which parameter preparation processing of primitive of LK_ISO.req is executed. The detail of this processing will be described later with reference to the flowchart of FIG. 40.

In the case where it is judged at the step S286 that QoS class is not CBR, the processing operation proceeds to step S288, at which parameter preparation processing of primitive of LK_DATA.req is executed. The detail of this processing will be described later with reference to the flowchart of FIG. 41.

Then, the processing operation proceeds to step S289, at which TR_SN is set at SN. In this example, this parameter SN indicates Sequence Number value at the transmitting side, and has independent values every respective ASEL-VCCs. In addition, TR_SN is parameter incremented at step S307 as described later.

Then, at step S290, 0 is set with respect to MI. At step S291, 0 is set with respect to MNG-ID.

At step S292, whether aselVccAalType is either AAL5 or AAL0 is judged. In the case where it is judged that aselVccAalType is AAL5, the processing operation proceeds to step S293, at which AAL5 is set at AAL_Type. Then, at step S294, parameter preparation processing of AAL5 Specific field is executed. The detail of this processing will be described later with reference to the flowchart of FIG. 42.

Then, at step S295, pointer to buffer in which AAL-ID is stored is set at ptrSDU. At step S296, length of AAL-ID is set at Count. At step S297, whether or not value of Count is greater than value obtained by subtracting 8 from aselVccTransmitSegLen is judged. At this time, in the case where judgement of No is carried out, the processing operation proceeds to step S297A, at which whether More is "Not Used (i.e., unused) or "End of SDU" (i.e., including the last portion of AAL-SDU) is judged. In the case where it is judged that More is "Not Used" or "End of ADU", the processing operation proceeds to step S298, at which 0 is set with respect to MR. At step S301, value obtained by adding 8 to Count is set at Data Length.

Further, at step S302, whether or not QoS class is CBR is judged. At this time, in the case where judgment of Yes is carried out, the processing operation proceeds to step S303, at which LK_ISO.req is outputted to 1394 Link layer. Thereafter, there results the status of Act for a second time (the system control status returns to the status of ACT). In the case where it is judged at the step S302 that QoSclass is not CBR, LK_DATA.Req is outputted to 1394 Link layer at step S304. Thereafter, there results the status of Act for a second time (the system control status returns to the status of Act).

In the case where it is judged at the step S292 that aselVccAalType is AAL0, the processing operation proceeds to step S299, at which AAL0 is set at (with respect to) AAL_Type. Then, at step S300, parameter preparation processing of AAL0 Specific field is executed. The detail of this processing will be described later with reference to the flowchart of FIG. 43. Thereafter, the processing operation proceeds to step S301. Thus, the processing of the step S301 and processing subsequent thereto are executed.

On the other hand, in the case where it is judged at the step S297 that value of Count is greater than value obtained by subtracting 8 from aselVccTransmitSegLen, the processing operation proceeds to step S305, at which 1 is set with respect to MR. Then, at step S306, value of aselVccTransmitSegLen is set at Data length. At step S307, value of TR_SN is incremented. At step S308, whether or not QoSclass is CBR is judged. In the case where judgment of Yes is carried out at this step, the processing operation proceeds to step S309, at which LK_ISO.req is outputted to 1394 Link layer. In the case where judgment of No is carried out at the step S308, LK_DATA.req is outputted to 1394 Link layer at step S310.

Then, the processing operation proceeds to step S311, at which value obtained by subtracting 8 from aselVccTransmitSegLen is added to current value of ptrSDU. Then, the processing operation proceeds to step S312, at which value of Count is decremented by value obtained by subtracting 8 from aselVccTransmitSegLen. Thereafter, the processing operation returns to the step S297. Thus, the processing of the step S297 and steps subsequent thereto are repeatedly executed.

Also in the case where it is judged at the step S297A that More is not "Not Used" or "End of PDU", the processing operation proceeds to the step S305. Thus, the processing of the step S305 and steps subsequent thereto are carried out.

Figure 38:
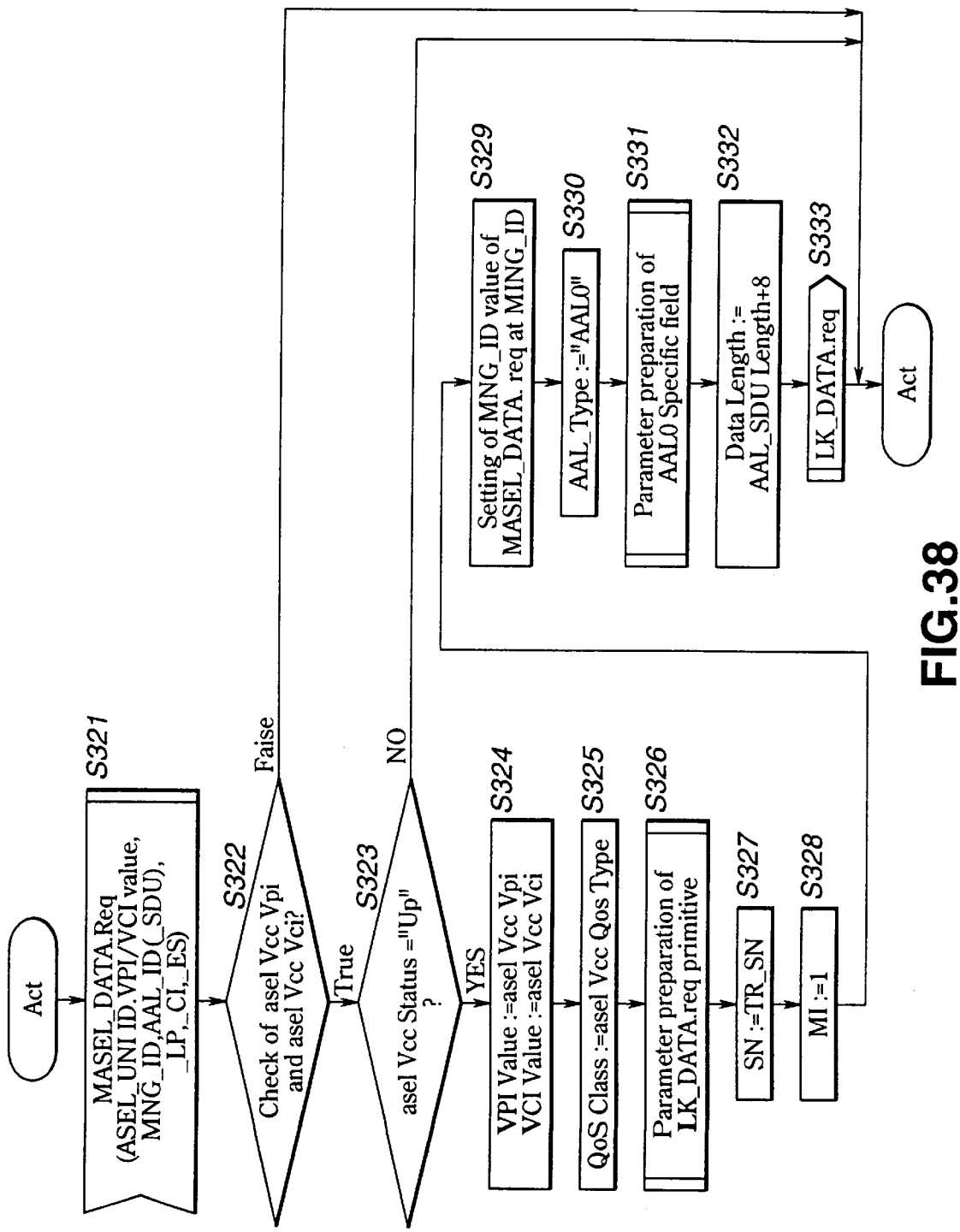
FIG. 38 is a flowchart for explaining processing in the case where data is transferred.

FIG. 38 shows the processing that ASEL outputs LK_DATA.req with respect to 1394 Link layer when MASEL_DATA.Req is received from ASEL layer management in FIG. 6.

Namely, in the status of Act, at step S321, MASEL_DATA.Req is received from ASEL layer management. In this MASEL_DATA.Req, ASEL-UNI ID, VPI/VCI Value, MNG-ID, AAL-ID(SDU), AAL-LP, AAL-CI, AAL-ES are included.

Then, at step S322, whether or not aselVccVpi and aselVccVci corresponding to each other exist is judged. In the case where aselVccVpi and aselVccVci exist, the processing operation proceeds to step S323, at which whether or not Up is set at aselVccStatus is judged. In the case where judgment of Yes is carried out at the step S323, the processing operation proceeds to step S324, at which value of aselVccVpi is set at VPI Value of ASEL header and value of aselVccVci is set at VCI Value. At step S325, value of aselVccQosType is set at QoSClass. At step S326, parameter preparation processing of primitive of LK_DATA.req (detail of this processing will be described later with reference to FIG. 41) is executed.

Then, at step S327, TR_SN is set at (with respect to) SN. At step S328, 1 is set with respect to MI. Further, at step S329, value of MNG-ID in MASEL_DATA.req is set at (with respect to) MNG-ID. At step S330, AAL0 is set with respect to AAL_Type.

Then, at step S331, parameter preparation processing of AAL0 Specific Field (detail of this processing will be described later with reference to FIG. 43) is executed.

Then, at step S332, value obtained by adding 8 to length of AAL-SDU is set with respect to Data length. At step S333, LK_DATA.req is outputted to 1394 Link layer. Thereafter, there results the status of Act for a second time (the system control status returns to status of Act).

In the case where it is judged at the step S322 that aselVccVpi and aselVccVci are False, processing is not particularly carried out. Thus, there results the status of Act for a second time (the system control status returns to the status of Act). Also in the case where it is judged at the step S323 that Up is not set at acelVccStatus, processing similar to the above is conducted.

Figure 39:
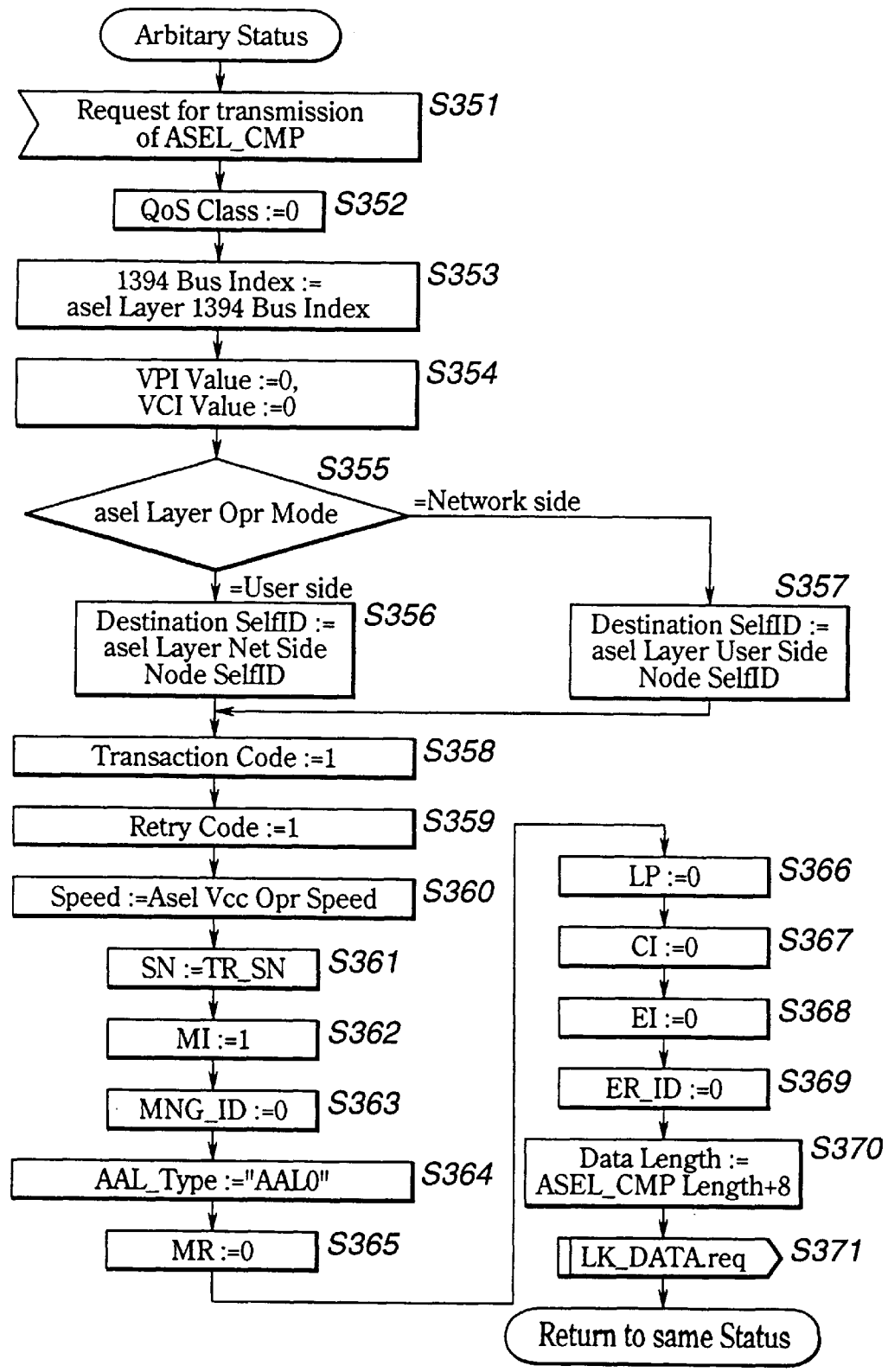
FIG. 39 is a flowchart for explaining processing in the case where data is transferred.

FIG. 39 represents transfer processing of ASEL-CMP carried out in arbitrary status. When local event of request for transmission of ASEL_CMP is received at step S351, 0 is set with respect to QoS class at step S352. At step S353, value of aselLayer 1394 BusIndex is set with respect to 1394 Bus Index. At step S354, 0 (zeros) are respectively set with respect to VPI Value and VCI Value of ASEL header.

Then, at step S355, whether aselLayeroprMode is User side or Network side is judged. In the case where it is judged that aselLayeroprMode is User side, the processing operation proceeds to step S356, at which aselLayerNetSideNodeSelfId is set with respect to Destination SelfID. In the case where it is judged at the step S355 that aselLayeroprMode is Network side, the processing operation proceeds to step S357, at which aselLayerUserSideNodeSelfId is set with respect to Destination SelfID.

Then, the processing operation proceeds to step S358, at which 1 is set with respect to Transaction Code. At step S359, 1 is set with respect to Retry Code. At step S360, value of AselVccOprSpeed is set with respect to Speed. At step S361, TR_SN is set with respect to SN. At step S362, 1 is further set with respect to M1. At step S363, 0 is set with respect to MNG-ID. At step S364, AAL0 is set with respect to AAL_Type.

Further, at step S365, 0 is set with respect to MR. At step S366, 0 is set with respect to LP. At step S367, 0 is set with respect to CI. At step S368, 0 is set with respect to EI. At step S369, 0 is set with respect to ER-ID. Then, at step S370, value obtained by adding 8 to length of ASEL_CMP is set with respect to Data length. At step S371, LK_DATA.req is outputted to 1394 Link layer. Thus, there results the original status for a second time (the systemm control status returns to the original status).

Figure 40:
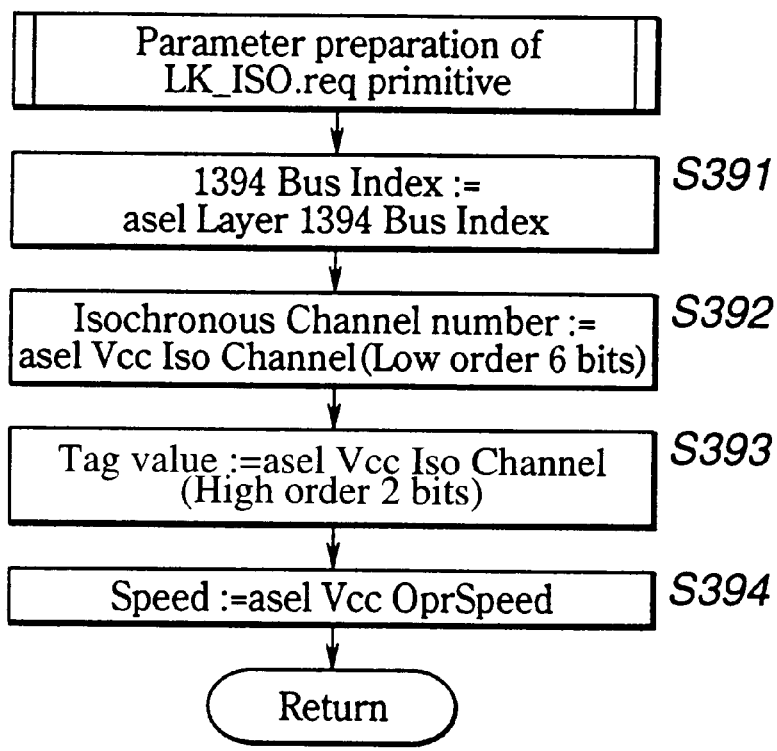
FIG. 40 is a flowchart for explaining more detailed processing of step S287 of FIG. 36.

Explanation will now be given with reference to FIGS. 40 to 43 in connection with more detailed processing of the subroutine included in the above-described processing of FIGS. 36 and 38. FIG. 40 shows the detail of the parameter preparation processisng of LK_ISO.req primitive of the step S287 of FIG. 36. In this processing, initially, at step S391, value of aselLayer1394BusIndex is first set with respect to 1394 Bus Index. At step S392, value of the low order 6 bits of aselVccIsoChannel is set with respect to Isochronous Channel number. Further, at step S393, value of the high order 2 bits of aselVccIsoChannel is set with respect to Tag value. At step S394, value of aselVccOprSpeed is set with respect to Speed.

Figure 41:
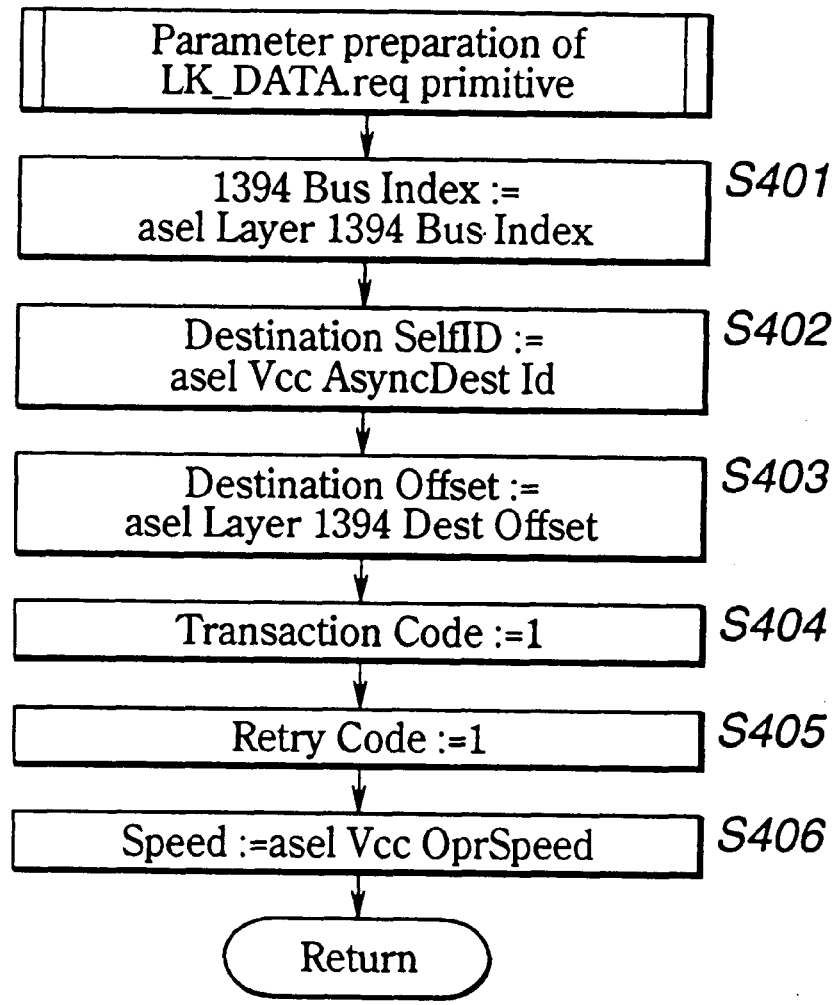
FIG. 41 is a flowchart for explaining more detailed processing of step S288 of FIG. 36.

FIG. 41 shows the detail of the parameter preparation processing of LK_DATA.req primitive at the step S288 of FIG. 36 and the step S326 of FIG. 38. Initially, at step S401, value of aselLayer1394BusIndex is set with respect to 1394 Bus Index. At step S402, value of aselVccAsyncDestId is set with respect to Destination SelfID. Further, at step S403, value of aselLayer1394DestOffset is set with respect to Destination offset. At steps S404 and S405, values of 1 are respectively set with respect to Transaction Code and Retry code. Then, at step S406, value of aselVccOprSpeed is set with respect to Speed.

Figure 42:
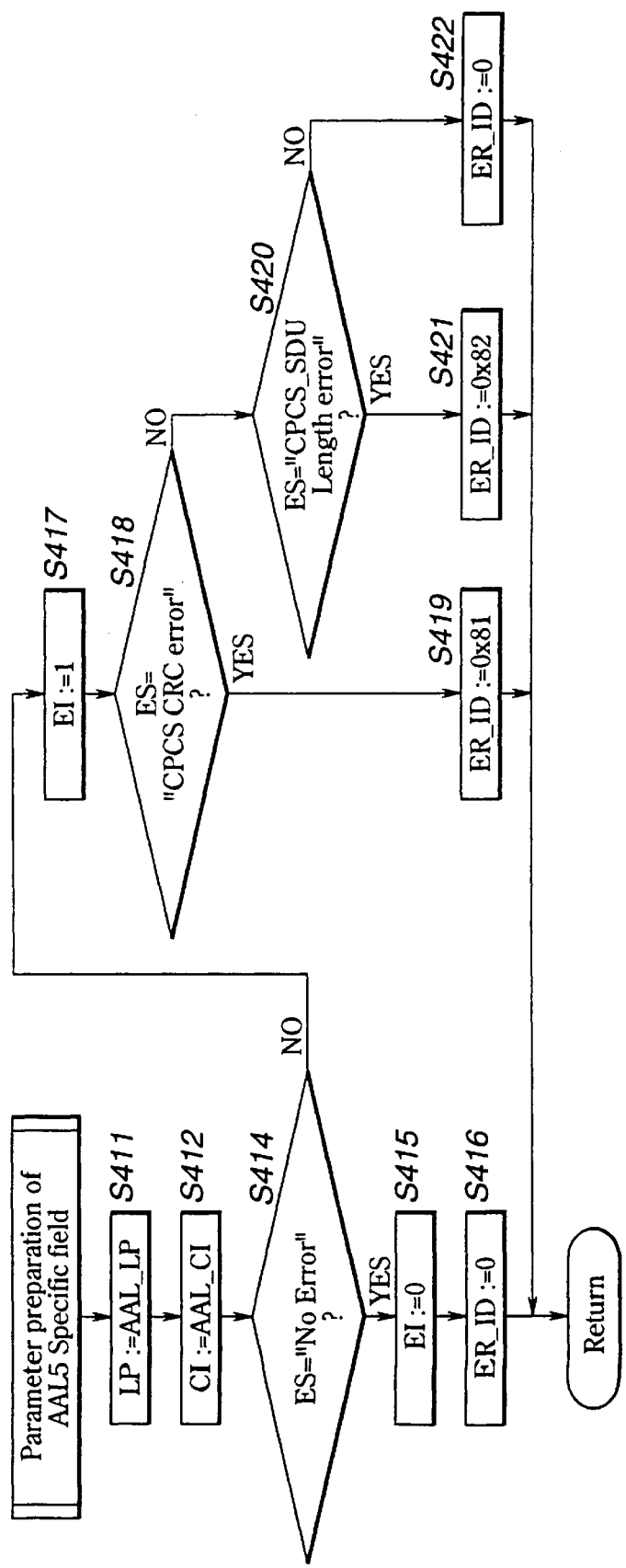
FIG. 42 is a flowchart for explaining more detailed processing of step S294 of FIG. 36.

FIG. 42 shows the detail of the parameter preparation processing of AAL5 Specific field at the step S294 of FIG. 36. At step S411, value of AAL-LP is set with respect to LP. This parameter is caused to undergo mapping from AAL_UNITDATA.req primitive. Then, at step S412, AAL-CI is set with respect to CI. This parameter is also caused to undergo mapping from AAL_UNITDATA.req primitive.

Then, at step S414, whether or not ES is No Error is judged. At this time, in the case where judgment of Yes is carried out, the processing operation proceeds to step S415, at which 0 is set with respect to EI. At step S416, 0 is set with respect to ER-ID.

In the case where judgment of No is carried out at the step S414, the processing operation proceeds to step S417, at which 1 is set with respect to EI. Then, at step S418, whether or not ES is CPCS CRC error is judged. In the case of Yes, the processing operation proceeds to step S419, at which 0x81 is set with respect to ER-ID.

In the case where judgment of No is carried out at the step S418, the processing operation proceeds to step S420, at which whether or not ES is CPCS-SDU Length error is judged. In the case where judgment of Yes is carried out, the processing operation proceeds to step S421, at which 0x82 is set with respect to ER-ID. In the case where judgment of No is carried out at the step S420, the processing operation proceeds to step S422, at which 0 is set with respect to ER-ID.

Figure 43:
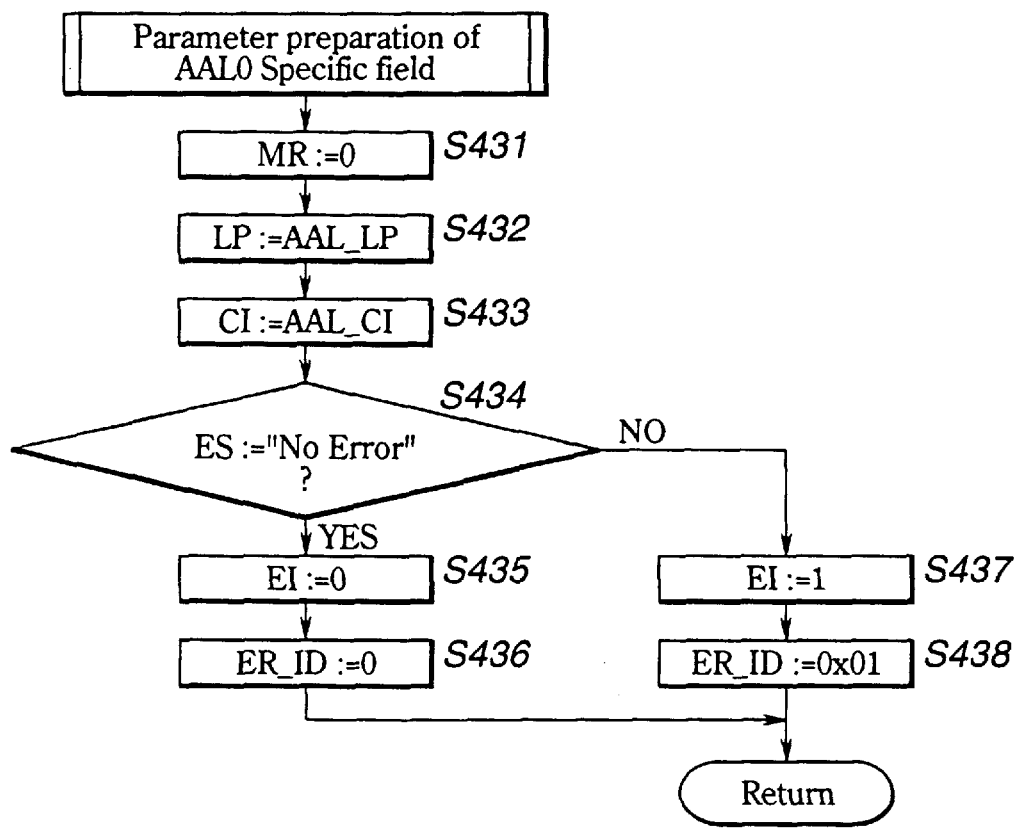
FIG. 43 is a flowchart for explaining more detailed processing of step S300 of FIG. 36.

FIG. 43 shows the detail of the parameter preparation processing of AAL0 Specific field at the step S300 of FIG. 36 and at the step S331 of FIG. 38. At step S431, 0 is set with respect to MR. At step S432, AAL-LP is set with respect to LP. At step S433, AAL-CI is set with respect to CI. At step S434, whether or not ES is No Error is judged. At this time, in the case where judgment of Yes is carried out, the processing operation proceeds to step S435, at which 0 is set with respect to EI. At step S436, 0 is set with respect to ER-ID.

In the case where judgment of No is carried out at the step S434, the processing operation proceeds to step S437, at which 1 is set with respect to EI. Then, at step S438, 0x01 is set with respect to ER-ID.

Figure 44:
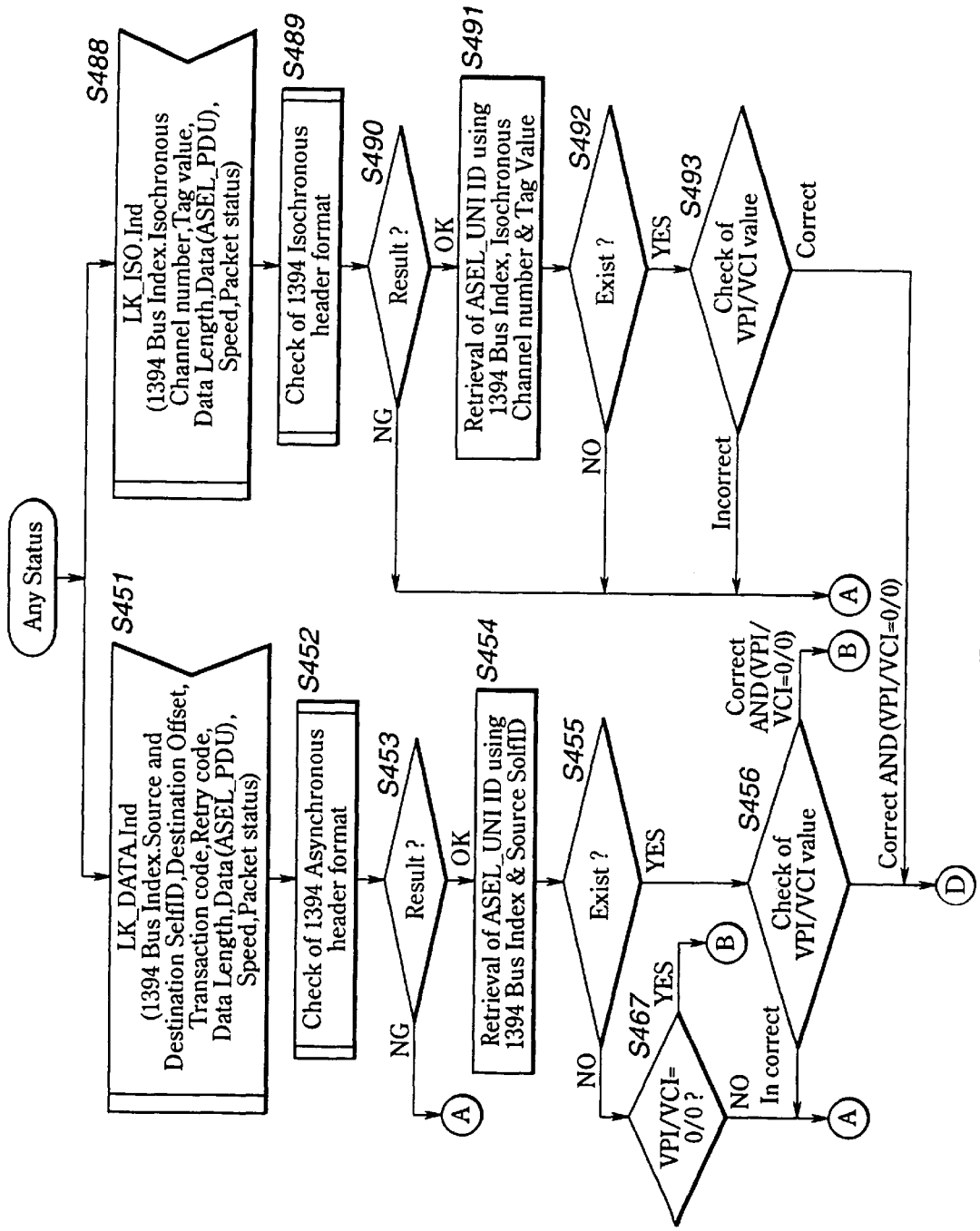
FIG. 44 is a flowchart for explaining processing in the case where data is received.
Figure 45:
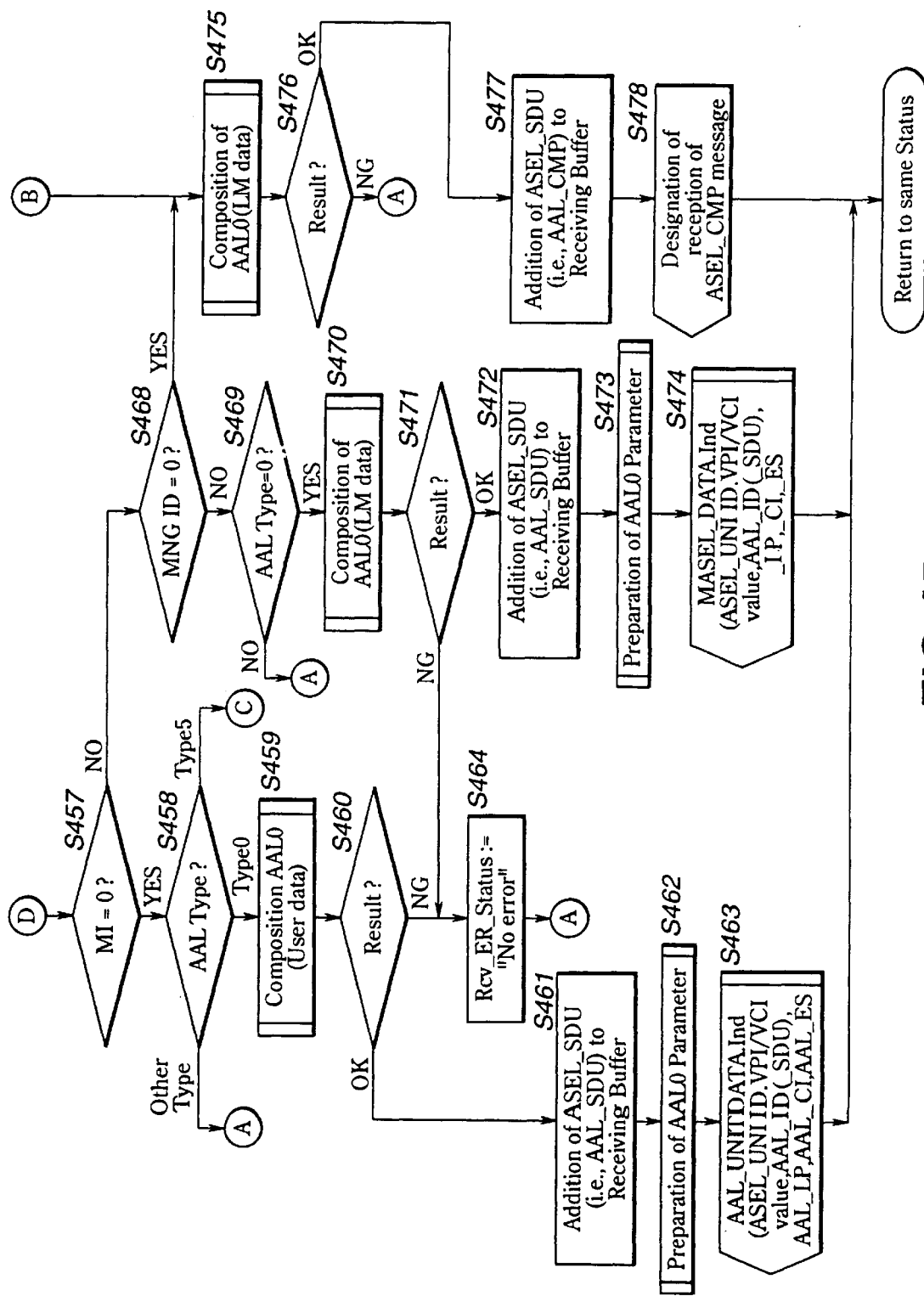
FIG. 45 is a flowchart for explaining processing in the case where data is received.
Figure 46:
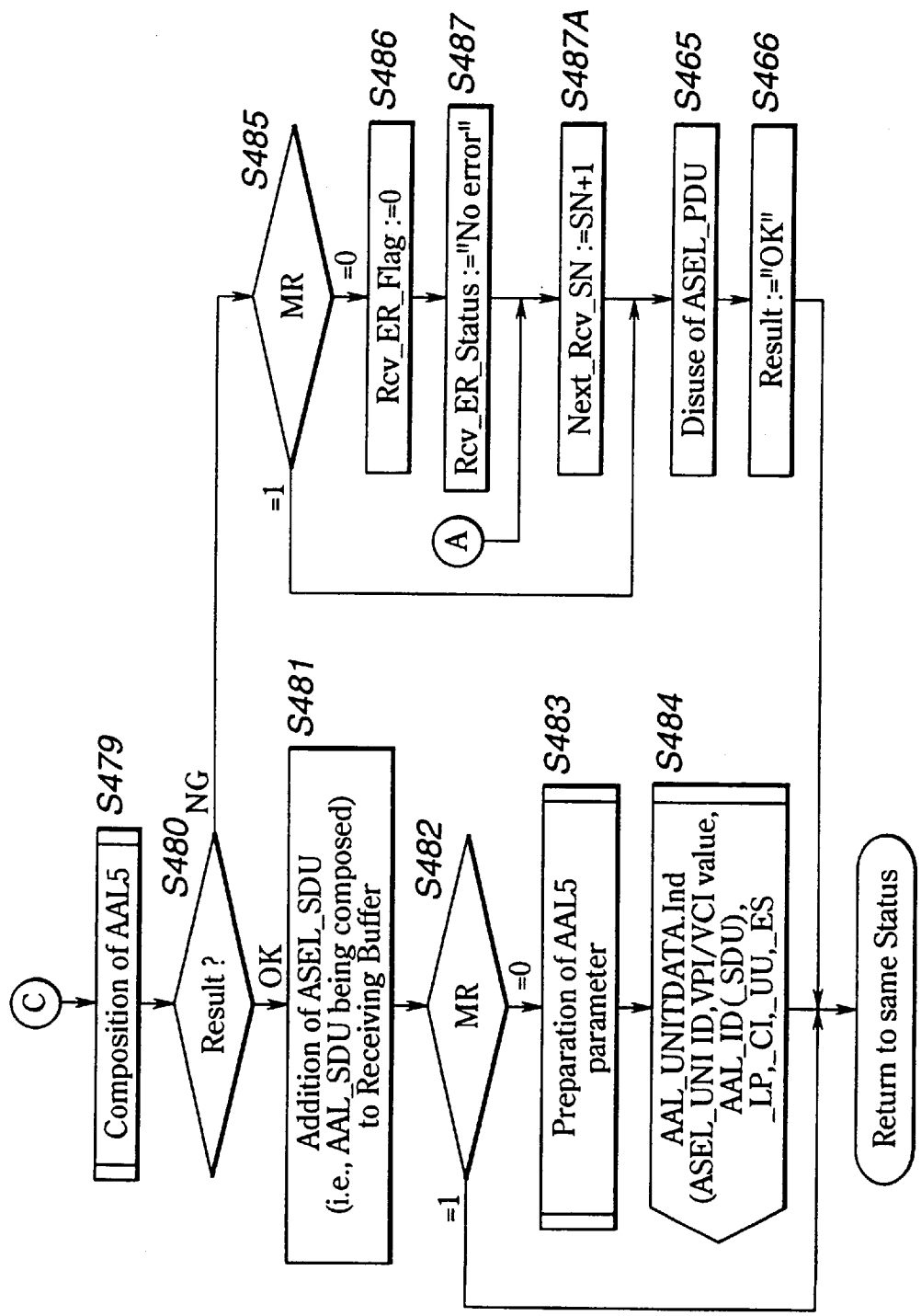
FIG. 46 is a flowchart for explaining processing in the case where data is received.

The flowcharts of FIGS. 44 to 46 represent the processing for receiving input of LK_DATA.Ind or LK_ISO.Ind from the 1394 Link layer of FIG. 6 to output AAL_UNITDATA.ind to Upper Layer, or to output MASEL_DATA.Ind with respect to ASEL layer management.

In an arbitrary (any) status, at step S451, LK_DATA.Ind is received from 1394Link layer. In this LK_DATA.Ind, 1394 Bus Index, Source selfID, Destination SelfID, Destination Offset, Transaction code, Retry code, Data Length, Data (ASEL-PDU), Speed, Packet Status are included.

Then, the processing operation proceeds to step S452, at which check processing of 1394 Asynchronous header format is carried out. The detail of this processing will be described later with reference to the flowchart of FIG. 47. Then, the processing operation proceeds to step S453, whether or not Result is OK is judged. In the case where Result is not OK, the processing operation proceeds to step S465. In the case where Result is OK, the processing operation proceeds to step S454, at which retrieval processing of ASEL-UNI ID using 1394 Bus Index and Source SelfID is carried out.

Then, at step S455, whether or not ASEL-UNI ID is retrieved is judged. In the case where ASEL-UNI ID is retrieved, the processing operation proceeds to step S456, at which check of VPI/VCI Value of ASEL header is carried out. In the case where this value is correct and VPI/VCI are not 0/0, the processing operation proceeds to step S457. In the case where this value is correct and VPI/VCI are 0/0, the processing operation proceeds to step S475. In the case where this value is not correct, the processing operation proceeds to step S465. In this case, the fact that VPI/VCI are 0/0 indicate that VPI Value is zero (0) and VCI Value is also zero (0).

In the case where it is judged at the step S455 that ASEL-UNI ID is not retrieved, the processing operation proceeds to step S467, at which whether or not VPI/VCI are both zero (0) is judged. In the case where judgment of Yes is carried out at the step S467, the processing operation proceeds to step S475. In the case where judgment of No is carried out, the processing operation proceeds to step S465.

At step S457, whether or not MI is zero (0) is judged. At this time, in the case where judgment of Yes is carried out, the processing operation proceeds to step S458, at which judgment of AAL Type is carried out. In the case where AAL Type is Type0, the processing operation proceeds to step S459. In the case where AAL Type is Type 5, the processing operation proceeds to step S479. In the case where AAL Type is any other Type, the processing operation proceeds to step S465.

At the step S459, composing processing of AAL0 (User data) is carried out. The detail of the processing will be described later with reference to the flowchart of FIG. 50. Then, the processing operation proceeds to step S460, at which whether or not Result is OK is judged. In the case where it is judged that Result is OK, the processing operation proceeds to step S461, at which the processing for adding (supplementing) ASEL_SDU (i.e., AAL-SDU) into receiving buffer is executed. Then, the processing operation proceeds to step S462. Thus, the preparation processing of AAL0 parameter is executed. The detail of this processing will be described later with reference to the flowchart of FIG. 53. Then, the processing operation proceeds to step S463. Thus, AAL_UNITDATA.Ind is outputted to Upper Layer of FIG. 6. In this AAL_UNIDATA.Ind, ASEL-UNI ID, VPI/VCI value, AAL-ID(SDU), AAL-LP, AAL-CI, AAL-ES are included. Then, there results the original status for a second time (the system control status returns to the original status).

In the case where it is judged at the step S460 that Result is NG, the processing operation proceeds to step S464, at which No error is set with respect to RCV_ER_Status. This parameter represents error status of AAL-SDU being received, and has independent values every respective ASEL-VCCs. Thereafter, the processing operation proceeds to step S465.

In the case where it is judged at the step S457 that value of MI is not zero (0), the processing operation proceeds to step S468, at which whether or not MNG ID is zero (0) is judged. At this time, in the case where judgment of Yes is carried out, the processing operation proceeds to step S475. On the contrary, in the case where judgment of No is carried out, the processing operation proceeds to step S469. At the step S469, whether or not AAL Type is zero (0) is judged. In the case where judgment of No is carried out at this step, the processing operation proceeds to the step S465. In the case where judgment of Yes is carried out at this step, the processing operation proceeds to step S470, at which composing processing of AAL0 (LM data) is executed. The detail of this processing will be described later with reference to the flowchart of FIG. 51.

Then, at step S471, whether or not Result is OK is judged. In the case where Result is NG, the processing operation proceeds to step S464. In the case where Result is OK, the processing operation proceeds to step S472. At the step S472, processing for adding (supplementing) ASEL_SDU (i.e., AAL-SDU) into the receiving buffer is executed. Further, at step S473, the preparation processing of AAL0 parameter is executed. The detail of this processing will be described later with reference to the flowchart of FIG. 53.

Then, the processing operation proceeds to step S474, at which MASEL_DATA.Ind is outputted to ASEL layer management of FIG. 6. In this MASEL_DATA.Ind, ASEL-UNI ID, VPI/VCI value, AAL-ID (SDU), AAL-LP, AAL-CI, AAL-ES are included. Thereafter, there results the original status for a second time (the system control status returns to the original status).

At step S475, the composing processing of AAL0 (LM data) is executed. The detail of this processing will be described later with reference to the flowchart of FIG. 51. Then, the processing operation proceeds to step S476, at which whether or not Result is OK is judged. In the case of NG, the processing operation proceeds to step S465. In the case of OK, the processing operation proceeds to step S477, at which processing for adding (supplementing) ASEL_SDU (i.e., ASEL_CMP) into the receiving buffer is executed. Then, the processing operation proceeds to step S478, at which local event to instruct reception of ASEL_CMP message is issued. Thereafter, there results the original status for a second time (the system control status returns to the original state).

At step S479, composing processing of AAL5 is executed. The detail of this processing will be described later with reference to the flowchart of FIG. 49. Then, the processing operation proceeds to step S480, at which whether or not Result is OK is judged. In the case where Result is OK, the processing operation proceeds to step S481, at which the processing for adding (supplementing) ASEL_SDU (i.e., AAL-SDU being composed) into the receiving buffer is executed. Then, at step S482, whether MR is either 0 or 1 is judged. In the case where MR is zero (0), the processing operation proceeds to step S483, at which the preparation processing of the AAL5 parameter is executed. The detail of this processing will be described later with reference to the flowchart of FIG. 52. Then, at step S484, AAL_UNIDATA.Ind is outputted to Upper Layer of FIG. 6. In this AAL_UNIDATA.Ind, ASEL-UNI ID, VPI/VCI value, AAL-ID(SDU), AAL-LP, AAL-CI, AAL-UU, AAL-ES are included. Thereafter, there results the original status for a second time (the system control status returns to the original status).

In the case where it is judged at step S482 that value of MR is 1, the processing of steps S483, S484 are skipped.

On the other hand, in the case where it is judged at step S480 that Result is NG, the processing operation proceeds to step S485, at which whether value of MR is either 0 or 1 is judged. In the case where it is judged at the step S485 that MR is 1, the processing operation proceeds to the step 465. In the case where it is judged that MR is 0, the processing operation proceeds to step S486, at which 0 is set with respect to Rcv_ER_Flag. This parameter represents that any error is included in AAL-SDU being received, and has independent values every respective ASEL-VCCs.

Then, the processing operation proceeds to step S487, at which No error is set with respect to Rcv_ER_Status.

Then, the processing operation proceeds to step S487A, at which value obtained by incrementing value of SN by 1 is set with respect to Next_Rcv_SN. This parameter indicates SN value expected next at the receiving side. This parameter is incremented by modulo 128 and has independent values every ASEL-VCCs.

Then, the processing operation proceeds to the step S465, at which the processing for disusing (aborting) ASEL-PDU is executed. At the step S466, OK is set with respect to Result. Thereafter, there results the original status for a second time (the system control status returns to the original status).

On the other hand, when input of LK_ISO.Ind is received from the 1394 Link layer of FIG. 6 at step S488 in an arbitrary status, processing of step S489 and those subsequent thereto are executed. In the above-mentioned example, in this LK_ISO.Ind, 1394 Bus Index, Isochronous Channel number, Tag value, Data Length, Data (ASEL-PDU), Speed, Packet status, etc. are included.

At the step S489, check processing of 1394 Isochronous header format is carried out. The detail of this processing will be described later with reference to the flowchart of FIG. 48. Then, the processing operation proceeds to step S490, at which whether or not Result is OK is judged. In the case where Result is NG, the processing operation proceeds to the step S465. Thus, the processing the step S465 and steps subsequent thereto will be executed.

On the contrary, in the case where it is judged that Result is OK, the processing operation proceeds to step S491, at which the retrieval processing of ASEL-UNI ID using 1394 Bus Index, Isochronous Channel number and Tag value is executed. At step S492, whether or not ASEL-UNI ID is retrieved is judged. In the case where ASEL-UNI ID is retrieved, the processing operation proceeds to step S493, at which check of VPI/VCI value of ASEL header is carried out. In the case where this value is correct, the processing operation proceeds to step S457. Thus, the processing of the step S457 and steps subsequent thereto will be executed.

In the case where it is judged at the step S492 that ASEL-UNI ID is not retrieved, or in the case where it is judged at the step S493 that value of VPI/VCI value is not correct, the processing operation proceeds to the step S465. Thus, the processing of the step S465 and steps subsequent thereto will be executed.

Explanation will now be given with reference to the flowcharts of FIGS. 47 to 53 in connection with the more detailed processing of the subroutine represented by the processing of FIGS. 44 to 46.

Figure 47:
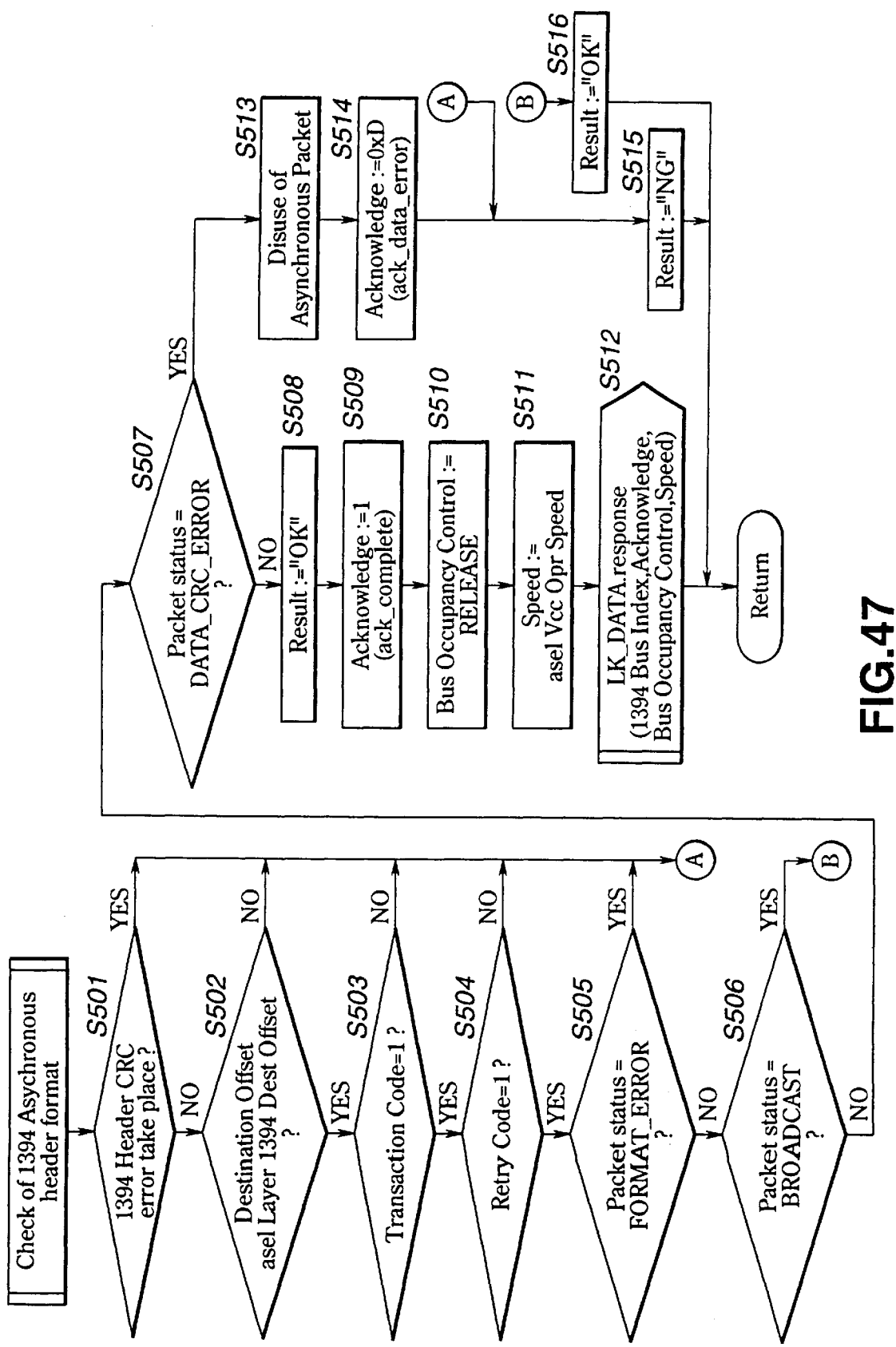
FIG. 47 is a flowchart for explaining more detailed processing of step S452 of FIG. 44.

FIG. 47 shows the detail of the check processing of 1394 Asynchronous header format at the step S452 of FIG. 44. Initially, at step S501, whether or not 1394 header CRC error takes place is judged. In the case where such error does not take place, the processing operation proceeds to step S502, at which whether or not value of Destination Offset is equal to value of aselLayer1394DestOffset is judged. In the case where values of the both are equal to each other, the processing operation proceeds to step S503, at which whether or not Transaction Code is 1 is judged. In the case where this value is 1, the processing operation proceeds to step S504, at which whether or not Retry Code is 1 is judged. In the case where this value 1, the processing operation further proceeds to step S505, at which whether or not Packet status is FORMAT_ERROR is judged. At this time, in the case where judgment of No is carried out, the processing operation proceeds to step S506.

When it is judged at the step S501 that error takes place, it is judged at the step S502 that Destination Offset is not equal to aselLayer1394DestOffset, it is judged at the step S503 that value of Transaction Code is not 1, it is judged at the step S504 that Retry Code is not 1, or it is judged at the step S505 that Packet status is FORMAT_ERROR, the processing operation proceeds to step S515, at which NG is set with respect to Result.

At step S506, whether or not Packet status is BROADCAST is judged. At this time, in the case where judgment of Yes is carried out, the processing operation proceeds to step S516, at which OK is set with respect to Result.

In the case where judgment of No is carried out at the step S506, the processing operation proceeds to step S507, at which whether or not Packet status is DATA_CRC_ERROR is judged. At this time, in the case where judgment of No is carried out, the processing operation proceeds to step S508, at which OK is set with respect to Result. Then, at step S509, 1 is set with respect to Acknowledge (there is caused to result status of ack_complete). At step S510, RELEASE is set with respect to Bus Occupancy control. At step S511, value of aselVccOprSpeed is set with respect to Speed. Further, at step S512, LK_DATA.resp is outputted to the 1394 Link layer of FIG. 6. In this case, in this LK_DATA.resp, 1394 Bus Index, Acknowledge, Bus Occupancy Control, Speed are included.

On the other hand, in the case where it is judged at the step S507 that Packet status is DATA_CRC_ERROR, the processing operation proceeds to step S513, at which the processing for disusing (aborting) Asynchronous packet is executed. Further, at step S514, 0xD is set with respect to Acknowledge (ack_data_error is caused to result). Then, the processing operation proceeds to step S515, at which NG is set with respect to Result.

Figure 48:
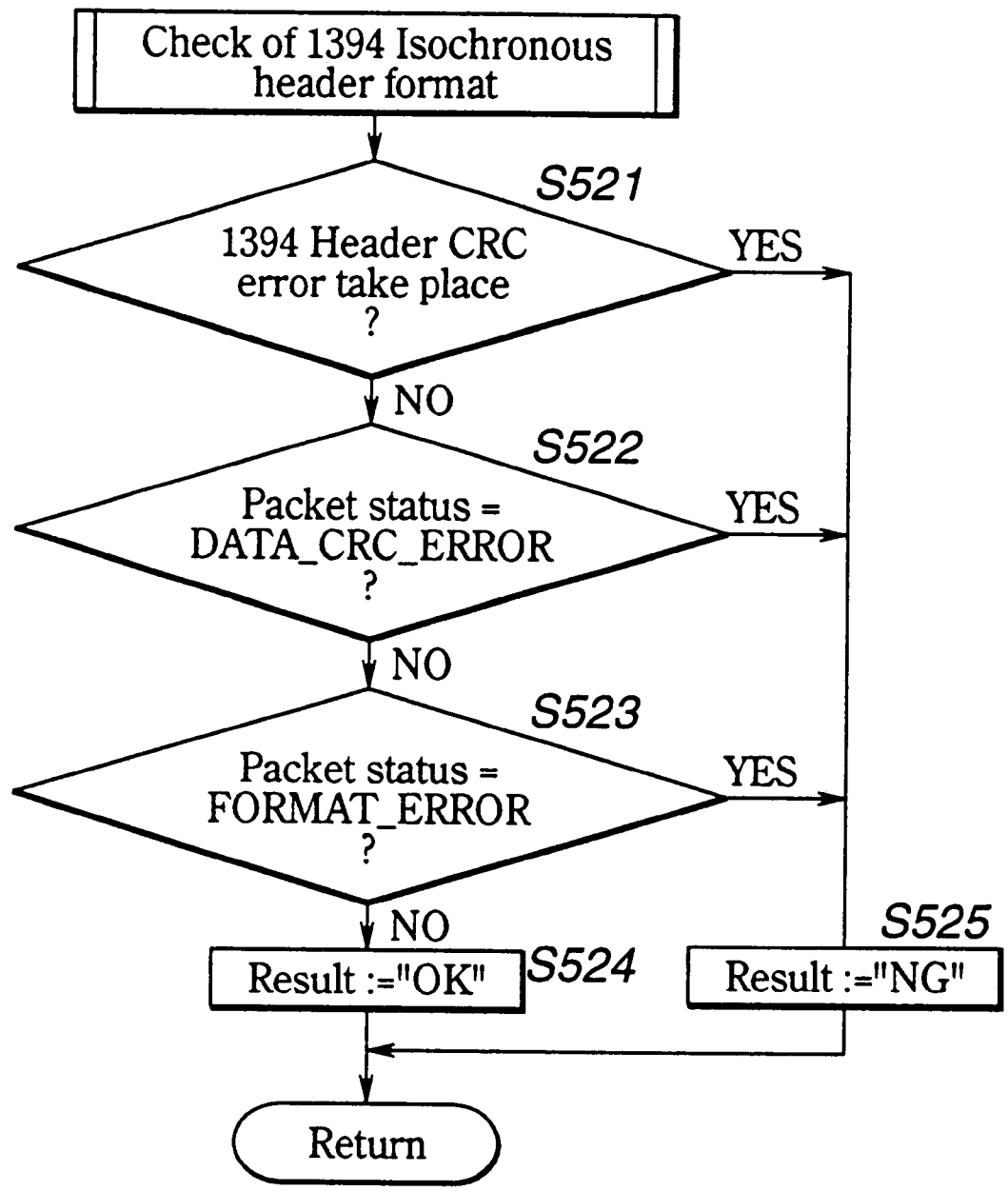
FIG. 48 is a flowchart for explaining more detailed processing of step S489 of FIG. 44.

FIG. 48 shows the detail of the check processing of the 1394 Isochronous header format at the step S489 of FIG. 44. Initially, at step S521, whether or not error takes place at the 1394 header CRC is judged. In the case where no error takes place, the processing operation proceeds to step S522, at which whether or not DATA_CRC_ERROR is set with respect to Packet status is judged. At this time, in the case where judgment of No is carried out, the processing operation proceeds to step S523, at which whether or not FORMAT_ERROR is set at (with respect to) Packet status is judged. At this time, in the case where judgment of No is carried out, the processing operation proceeds to step S524, at which OK is set at (with respect to) Result.

On the contrary, in the case where it is judged at the step S521 that any error takes place at 1394 header CRC, in the case where it is judged at the step S522 that DATA_CRC_ERROR is set with respect to Packet status, or in the case where it is judged at the step S523 that FORMAT_ERROR is set at (with respect to) Packet status, the processing operation proceeds to step S525, at which NG is set with respect to Result.

Figure 49:
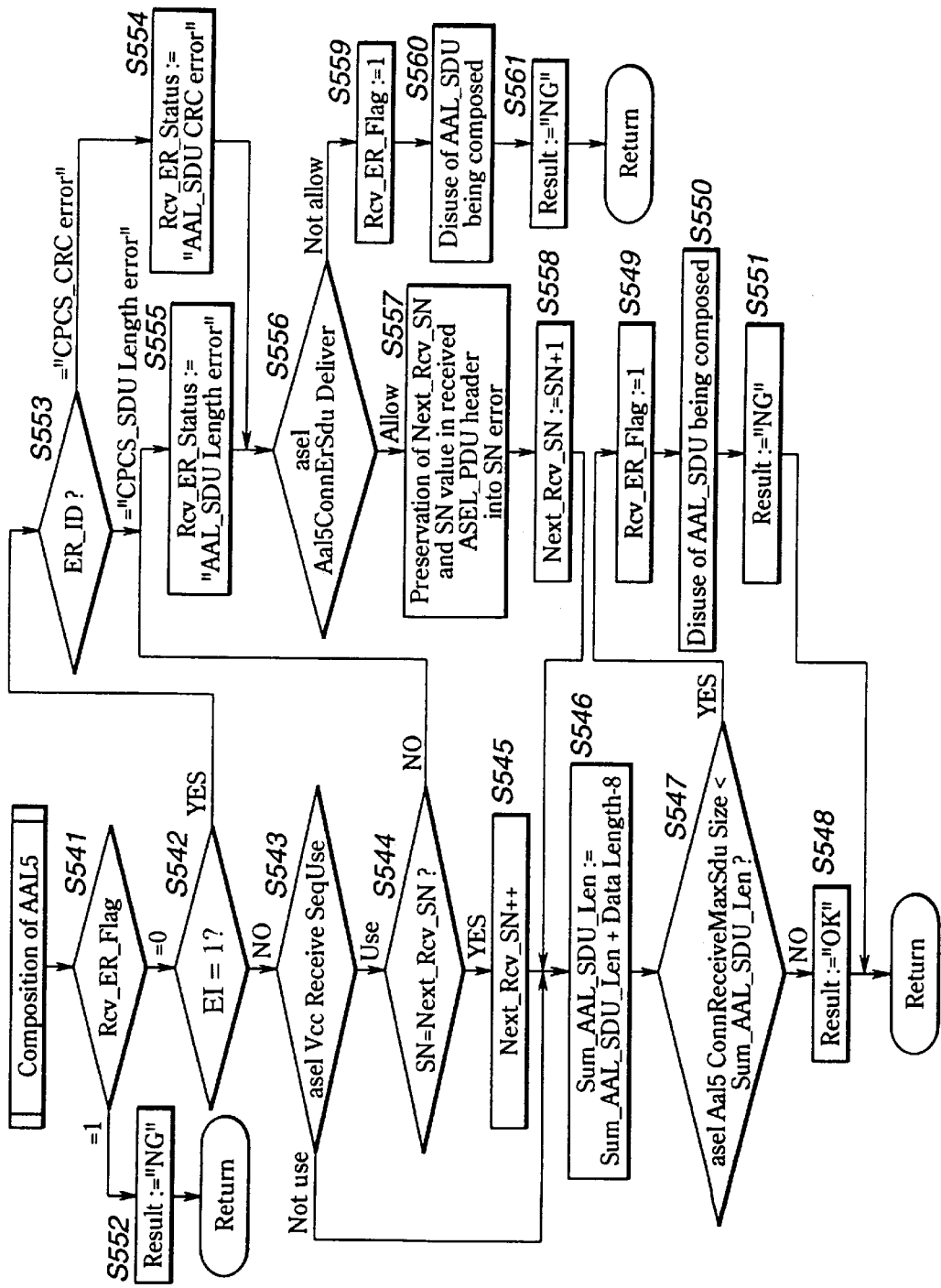
FIG. 49 is a flowchart for explaining more detailed processing of step S479 of FIG. 46.

FIG. 49 shows the detail of the composing processing of AAL5 at the step S479 of FIG. 46. At step S541, whether Rcv_ER_Flag is either 0 or 1 is judged. In the case where it is judged that Rcv_ER_Flag is 1, the processing operation proceeds to step S552, at which NG is set with respect to Result.

On the contrary, in the case where it is judged at the step S541 that Rcv_ER_Flag is zero (0), the processing operation proceeds to step S542, at which whether or not EI is 1 is judged. In the case where EI is not 1, the processing operation proceeds to step S543, at which whether or not aselVccReceiveSeqUse is Use is judged. In the case where it is judged that aselVccReceiveSeqUse is Use, the processing operation proceeds to step S544, at which whether or not SN is Next_Rcv_SN is judged.

In the case where judgment of Yes is carried out at the step S544, the processing operation proceeds to step S545, at which Next_Rcv_SN is incremented. Then, the processing operation proceeds to step S546. In the case where it is judged at the step S543 that aselVccReceiveSeqUse is not (in) Use (state), the processing of the step S544 and the step S545 are skipped. Thus, the processing operation proceeds to step S546.

At the step S546, value obtained by subtracting 8 from Data Length is added to Sum_AAL_SDU_Len. This parameter indicates the length of composed AAL-SDU being received, and has independent values every respective ASEL-VCCs.

Then, the processing operation proceeds to step S547, at which whether or not aselAal5ConnReceiveMaxSduSize is smaller than Sum_AAL_SDU_Len is judged. At this time, in the case where judgment of No is carried out, OK is set with respect to Result at step S548. In the case where judgment of Yes is carried out at the step S547, the processing operation proceeds to step S549, at which 1 is set with respect to Rcv_ER_Flag. Further, at step S550, the processing for disusing (aborting) AAL-ADU being composed is carried out. At step S551, NG is set with respect to Result.

In the case where it is judged at the step S544 that SN is not equal to Next_Rcv_SN, the processing operation proceeds to step S555, at which AAL-SDU Length Error is set at (with respect to) Rcv_ER_Status. At step S556, whether or not aselAal5ConnErSduDeliver is Allow is judged. In the case where aselAal5ConnErSduDeliver is Allow, the processing operation proceeds to step S557, at which processing for preserving (storing) Next_Rcv_SN and SN value in the received ASEL-PDU header into the SN error list is executed. Then, at step S558, value obtained by adding 1 to SN is set with respect to Next_Rcv_SN. Thereafter, the processing operation proceeds to step S546. Thus, the processing of the step S546 and steps subsequent thereto will be executed.

In the case where it is judged at the step S556 that aselAal5ConnErSduDeliver is not Allow, the processing operation proceeds to step S559, at which 1 is set with respect to Rcv_ER_Flag. At step S560, the processing for disusing (aborting) AAL-SDU being composed is executed. Then, at step S561, NG is set with respect to Result.

In the case where it is judged at the step S542 that EI is 1, the processing operation proceeds to step S553, at which whether ER-ID is CPCS-SDU Length error or CPCS CRC error is judged. In the case of the former, the processing operation proceeds to step S555. Thus, the processing of the step S555 and steps subsequent thereto will be executed. In the case of the latter, the processing operation proceeds to step S554, at which AAL-SDU CRC Error is set with respect to Rcv_ER_Status. Thereafter, the processing operation proceeds to step S556. Thus, the processing of the step S556 and steps subsequent thereto will be executed.

Figure 50:
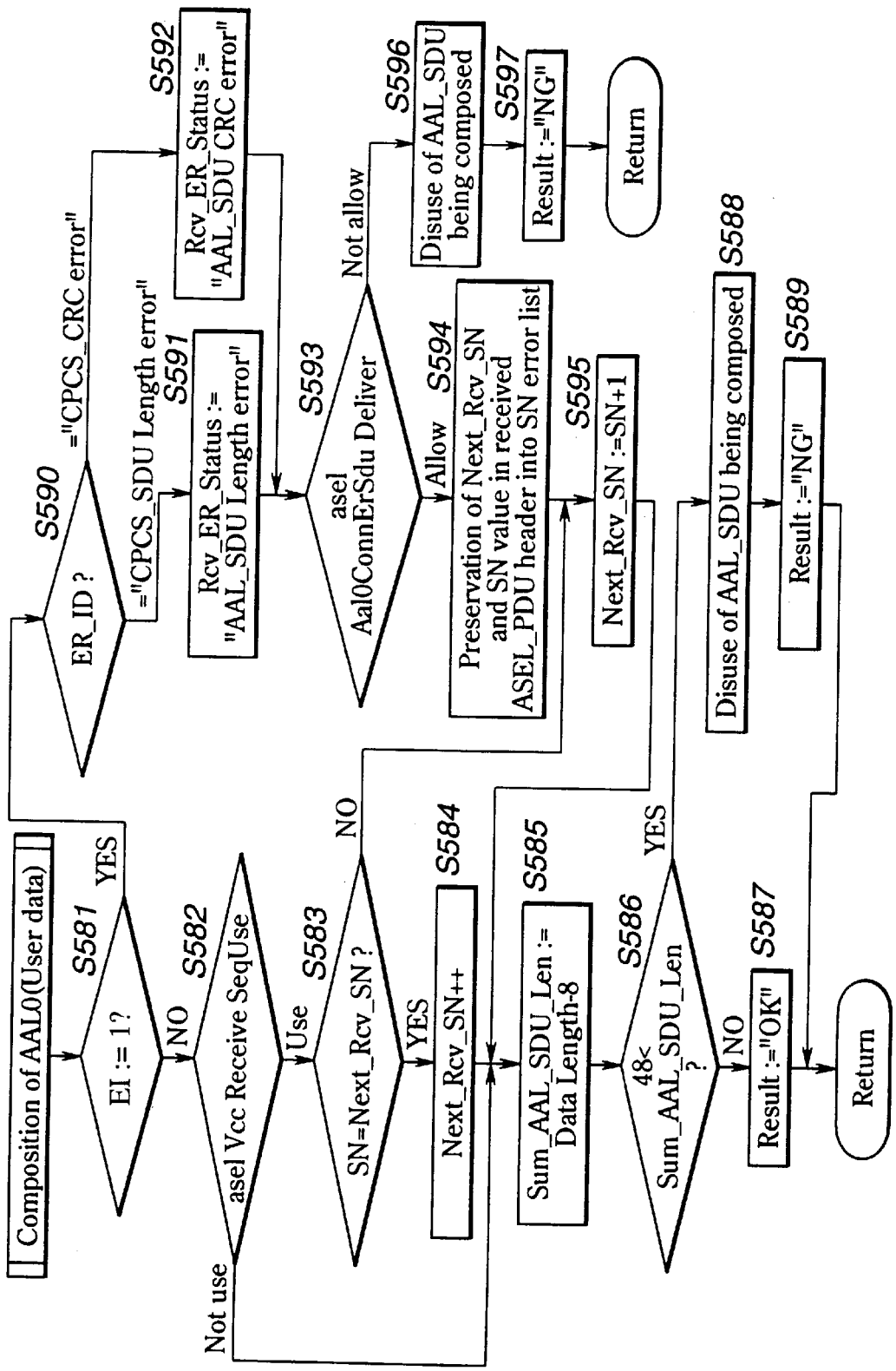
FIG. 50 is a flowchart for explaining more detailed processing of step S459 of FIG. 45.

FIG. 50 shows the detail of the composing processing of AAL0 (User data) at the step S459 of FIG. 45. At step S581, whether or not EI is 1 is judged. In the case where EI is not 1, the processing operation proceeds to step S582, at which whether or not aselVccReceiveSeqUse is Use is judged. In the case where aselVccReceiveSeqUse is Use, the processing operation proceeds to step S583, at which whether or not SN is equal to Next_Rcv_SN is judged. At this time, in the case where judgment of Yes is carried out, the processing operation proceeds to step S584, at which the value of Next_Rcv_SN is incremented.

In the case where it is judged at the step S582 that aselVccReceiveSeqUse is not Use, the processing of the steps S583, S584 are skipped. Thus, the processing operation proceeds to step S585.

At the step S585, value obtained by subtracting 8 from Data Length is set with respect to Sum_AAL_SDU_Len. Then, at step S586, whether or not Sum_AAL_SDU_Len is greater than 48 is judged. At this time, in the case where judgment of No is carried out, the processing operation proceeds to step S587, at which OK is set with respect to Result. On the contrary, in the case where judgment of Yes is carried out at the step S586, the processing operation proceeds to step S588, at which processing for disusing (aborting) AAL-SDU being composed is carried out. Then, the processing operation proceeds to step S589, at which NG is set with respect to Result.

In the case where it is judged at the step S583 that value of SN is not equal to value of Next_Rcv_SN, the processing operation proceeds to step S595, at which value obtained by incrementing value of SN by 1 is set with respect to Next_Rcv_SN. Then, the processing operation proceeds to step S585. Thus, the processing of the step S585 and steps subsequent thereto will be executed.

In the case where it is judged at step S581 that EI is 1, the processing operation proceeds to step S590, at which whether ER-ID is CPCS-SDU Length Error or CPCS CRC error is judged. In the case of the former, the processing operation proceeds to step S591, at which AAL-SDU Length Error is set with respect to Rcv_ER_Status. Then, the processing operation proceeds to step S593, at which whether or not aselAal0ConnErSduDeliver is Allow is judged. In the case where acelAal0ConnErSduDeliver is Allow, the processing operation proceeds to step S594, at which processing for preserving (storing) Next_Rcv_SN and SN value in the received ASEL-PDU header into the SN error list is executed. Then, the processing operation proceeds to step S595. Thus, the processing of the step S595 and steps subsequent thereto will be executed. On the contrary, in the case of the latter, the processing operation proceeds to step S592, at which AAL-SDU CRC Error is set with respect to Rcv_ER_Status. Thereafter, the processing operation proceeds to step S593.

In the case where it is judged at the step S593 that aselAal0ConnErSduDeliver is not Allow, the processing operation proceeds to step S596, at which processing for disusing (aborting) AAL-SDU being composed is executed. Further, at step S597, NG is set with respect to Result.

Figure 51:
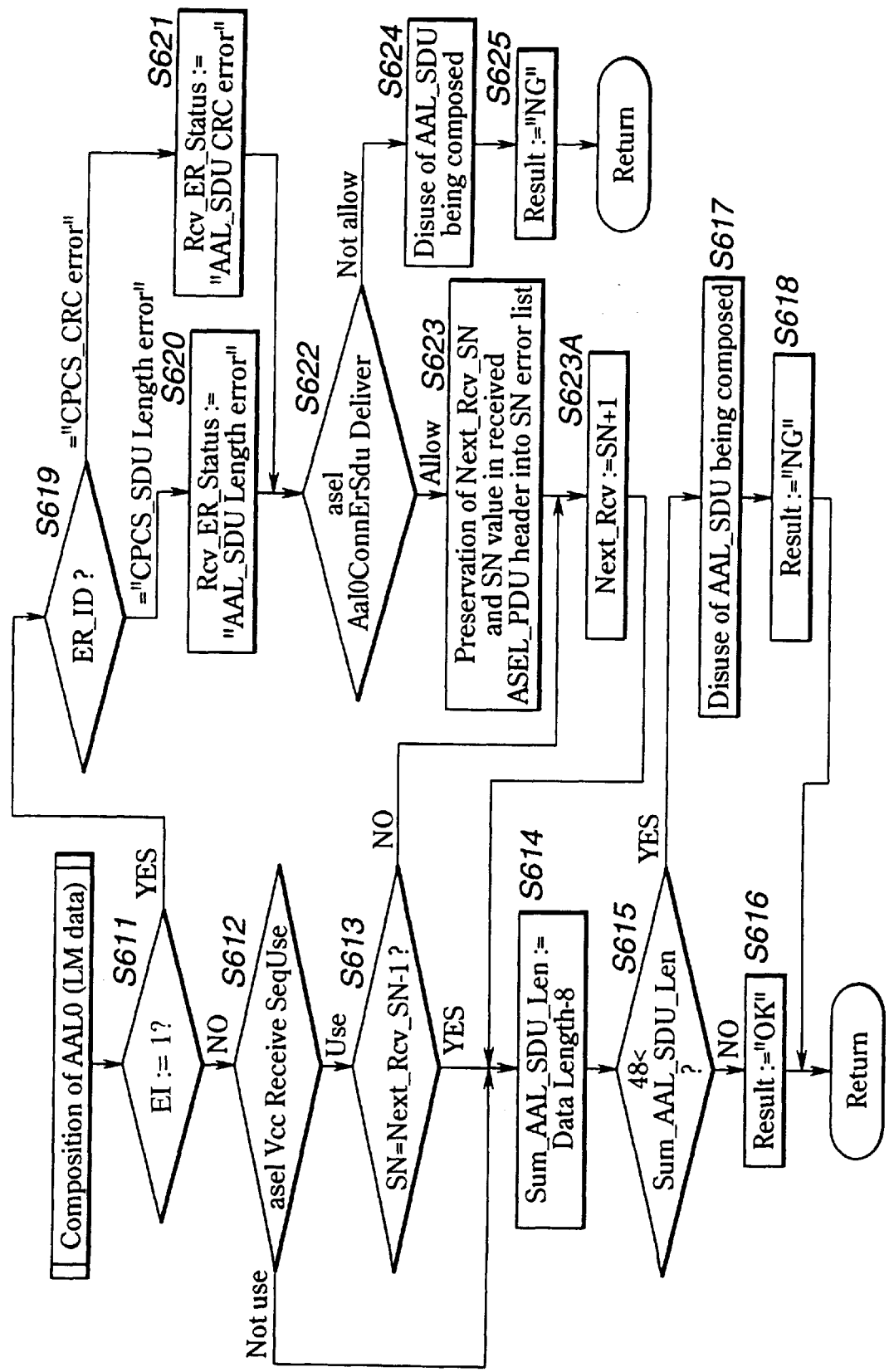
FIG. 51 is a flowchart for explaining more detailed processing of step S470 of FIG. 45.

FIG. 51 shows the detail of AAL0 (LM data) composing processing at the step S470 and the step S475 of FIG. 45. At step S611, whether or not EI is 1 is judged. In the case where EI is not 1, the processing operation proceeds to step S612, at which whether or not aselVccReceiveSeqUse is Use is judged. In the case where aselVccReceiveSeqUse is Use, the processing operation proceeds to step S613, at which whether or not SN is equal to value obtained by subtracting 1 from Next_Rcv_SN is judged. In the case where it has been judged that both values are equal to each other, the processing operation proceeds to step S614, at which value obtained by subtracting 8 from Data Length is set with respect to Sum_AAL_SDU_Len.

Then, at step S615, whether or not Sum_AAL_SDU_Len is greater than 48 is judged. At this time, in the case where judgment of No is carried out, the processing operation proceeds to step S616, at which OK is set with respect to Result. On the contrary, in the case where judgment of Yes is carried out at the step S615, the processing operation proceeds to step S617, at which the processing for disusing (aborting) AAL-SDU being composed is executed. Then, the processing operation proceeds to step S618, at which NG is set with respect to Result.

In the case where it is judged at the step S612 that acelVccReceiveSeqUse is not Use, the processing operation proceeds to step S614. Thus, the processing of the step S614 and steps subsequent thereto will be executed.

In the case where it is judged at the step S613 that SN is not equal to value obtained by subtracting 1 from Next_Rcv_SN, the processing operation proceeds to step S623A, at which value obtained by incrementing value of SN by 1 is with respect to Next_Rcv_SN. Thereafter, the processing operation proceeds to step S614. Thus, the processing of the step S614 and steps subsequent thereto will be executed.

In the case where it is judged at the step S611 that EI is 1, the processing operation proceeds to step S619, at which whether ER-ID is either CPCS-SDU Length error or CPCS CRC error is judged. In the case where it is judged that ER-ID is the former, the processing operation proceeds to step S620, at which AAL-SDU Length Error is set with respect to Rcv_ER_Status. Then, the processing operation proceeds to step S622, at which whether or not aselAal0ConnErSduDeliver is Allow is judged. In the case where it is judged that aselAsl0ConnErSduDeliver is Allow, the processing operation proceeds to step S623, at which processing for preserving (storing) Next_Rcv_SN and SN value in the received ASEL-PDU header into the SN error list is executed. Thereafter, the processing operation proceeds to step S623A. Thus, the processing of the step S623A and steps subsequent thereto will be executed. On the contrary, in the case where it is judged that ER-ID is the latter, the processing operation proceeds to step S621, at which AAL-SDU CRC Error is set with respect to Rcv_ER_Status. Thereafter, the processing operation proceeds to step S622.

In the case where it is judged at the step S622 that aselAal0ConnErSduDeliver is not Allow, the processing operation proceeds to step S624, at which processing for disusing (aborting) AAL-SDU being composed is executed. Then, NG is set with respect to Result at step S625.

Figure 52:
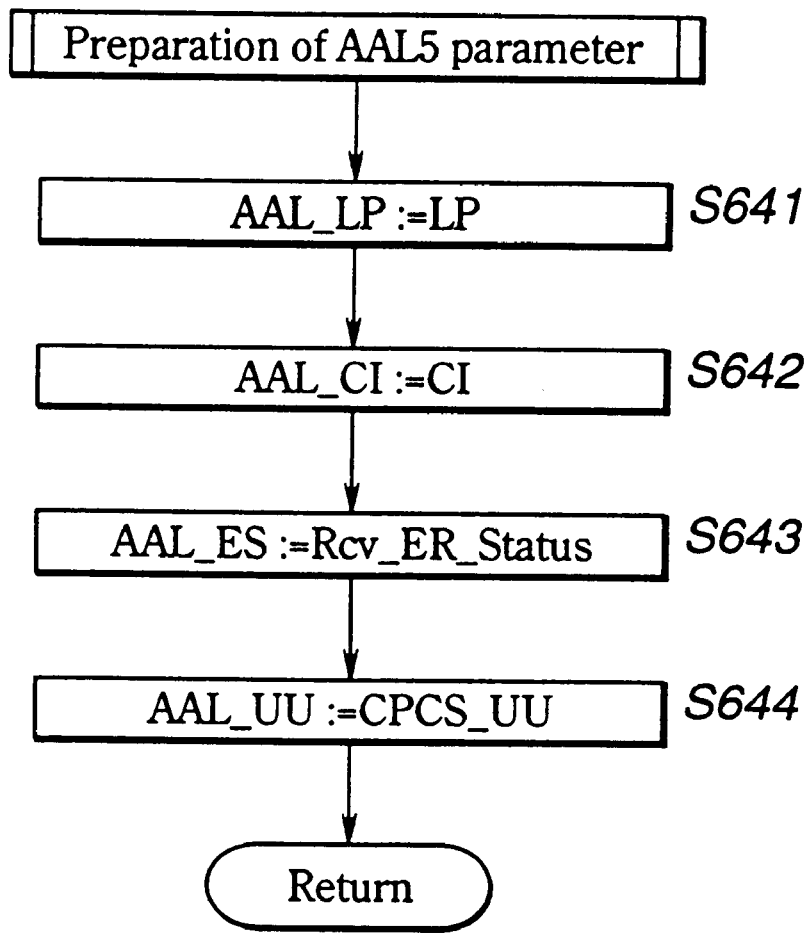
FIG. 52 is a flowchart for explaining more detailed processing of step S483 of FIG. 46.

FIG. 52 shows the detail of the processing for preparing AAL5 parameter at the step S483 of FIG. 46. At step S641, LP is set with respect to AAL-LP. This parameter is caused to undergo mapping with respect to AAL5 specific field of ASEL-PDU header. Then, the processing operation proceeds to step S642, at which CI is set with respect to AAL-CI. This parameter is also caused to undergo mapping with respect to AAL5 specific field of ASEL-PDU header.

Then, the processing operation proceeds to step S643, at which Rcv_ER_Status is set with respect to AAL-ES. Further, at step S644, CPCS-UU is set with respect to AAL-UU.

Figure 53:
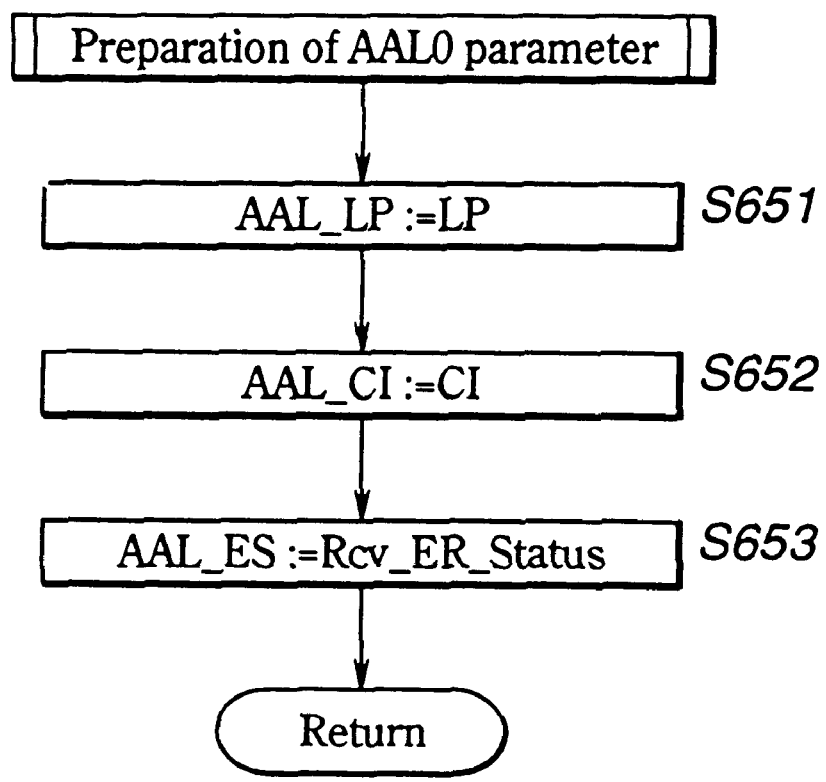
FIG. 53 is a flowchart for explaining more detailed processing of step 462 of FIG. 45.

FIG. 53 shows the detail of the processing for preparing AAL0 parameter at the step S462 and the step S473 of FIG. 45. At step S651, LP is set with respect to AAL-LP. This parameter is caused to undergo mapping with respect to AAL0 specific field of ASEL-PDU header. Then, at step S652, CI is set with respect to AAL-CI. This parameter is also caused to undergo mapping with respect to AAL0 specific field of ASEL-PDU header. Then, at step S653, Rcv_ER_Status is set with respect to AAL-ES.

Figure 54:
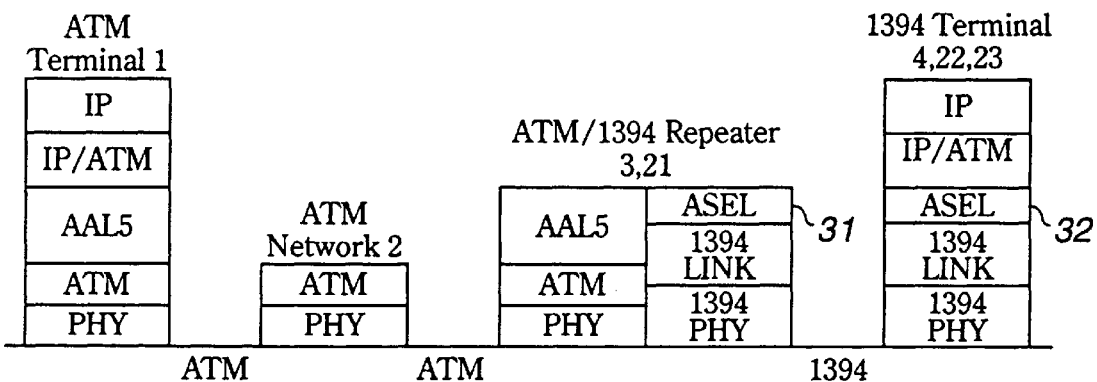
FIG. 54 is a view showing protocol stack of U plane at the time of use of IP/ATM in the case where ASEL is employed.
Figure 55:
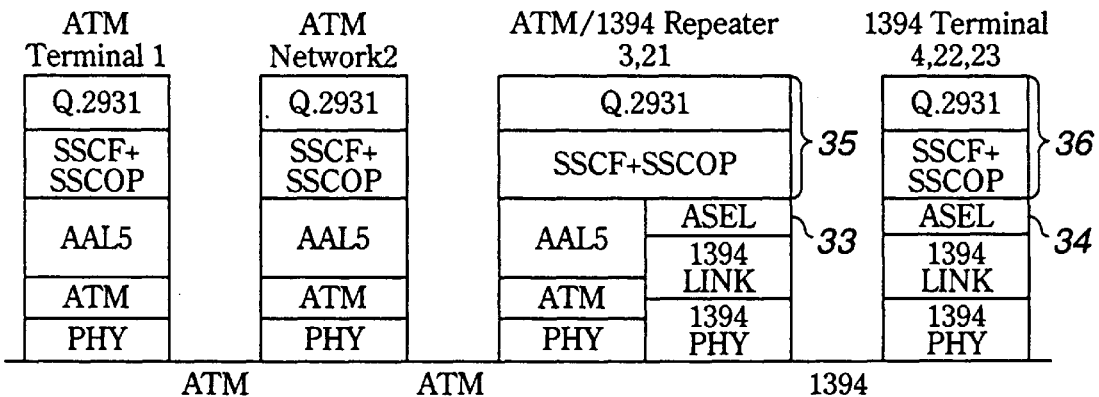
FIG. 55 is a view showing protocol stack of C plane at the time of use of IP/ATM in the case where ASEL is employed.

In the case where ASEL as described above is used to carry out communication between the ATM terminal 1 and the 1394 terminals 4, 22, 23 shown in FIG. 4 by using IP/ATM as the standard protocol similarly to the conventional case, protocol stacks of U (User) plane and C (Control) plane of end to end are caused to respectively undergo layout as shown in FIGS. 54 and 55.

As shown in FIG. 54, the protocol stack of the U plane of the ATM terminal 1 consists of PHY (Physical) layer, ATM layer, AAL5 layer, IP/ATM layer and IP layer, and the protocol stack of the U plane of the ATM network 2 consists of PHY layer and ATM layer.

The protocol stack of the U plane of the ATM/1394 repeaters 3, 21 consists, at the ATM network side, PHY layer, ATM layer and AAL5 layer, and consists, at the 1394 terminal side, 1394 PHY layer, 1394 LINK layer and ASEL layer 31. The protocol stack of the U plane of the 1394 terminals 4, 22, 23 consists of 1394 PHY layer, 1394 LINK layer, ASEL layer 32, IP/ATM layer and IP layer.

Between the ATM/1394 repeater 3 and the 1394 terminal 4, and between the ATM/1394 repeater 21 and the 1394 terminals 22, 23, AAL/ATM is caused to undergo emulation by ASEL 31, and the concept of VPC/VCC thus exists. For this reason, handling of packet of the U plane can be carried out by VPI/VCI value in place of IP. This VPI/VCI is ordinarily included in the descriptor table of AAL-PDU, but is not included in packet as in the case of interface data. As a result, when ASEL 31 carries out routing, it is unnecessary to copy the content (interface data) of packet. Accordingly, in the ATM/1394 repeaters 3, 21, burden (load) is lessened, and throughput of the ATM/1394 repeaters 3, 21 can be improved.

Moreover, as shown in FIG. 55, the protocol stack of the C plane of the ATM terminal 1 consists of PHY layer, ATM layer, AAL5 layer, SSCF(ITU-TQ. 2130)+SSCOP(ITU-TQ. 2110) layer, and Q.2931(ITU-TQ. 2931) layer. The protocol stack of the C plane of the ATM network 2 is of a structure similar to the case of the ATM terminal 1.

The protocol stack of the C plane of the ATM/1394 repeaters 3, 21 is of a structure at the ATM network side which is similar to the case of the ATM terminal 1 and the ATM network 2. On the other hand, the 1394 terminal side is of a structure similar to the protocol stack of the 1394 terminals 4, 22, 23, and consists of 1394 PHY layer, 1394 LINK layer and ASEL layer 33 (corresponding to the ASEL layer 31 of FIG. 54). The protocol stack of the C plane of the 1394 terminals 4, 22, 23 consists of 1394 PHY layer, 1394 LINK layer, ASEL layer 34 (corresponding to the ASEL layer 32 of FIG. 54), SSCF+SSCOP layer, and Q. 2931 layer.

Between the ATM/1394 repeater 3 and the 1394 terminal 4, and between the ATM/1394 repeater 21 and the 1394 terminals 22, 23, known signaling protocol (Q. 2931 and SSCF+SSCOP) used in UNI (User-Network Interface) of the ATM network 2 can be applied to the layer 35 or the layer 36. For this reason, it becomes unnecessary to develop peculiar signaling protocol from the first stage. As a result, the number of steps required for developing the system can be reduced, and the reliability of the system can be improved.

Further, by ASEL, it is possible to provide service by various applications of the connection type utilizing multi-point, multi-connection which are the feature of ATM as they are on infrastructure having elements of low cost, easiness of cabling, and implementation of effective utilization of resource of media by shared media (media shared type network: various terminals are connected to single cable (transmission medium) to carry out communication).

More practical example of the operation in the system of FIG. 4 will be further explained. As an example, there are taken three kinds of communications of communication between 1394 terminal 22-1 connected to ATM/1394 repeater 21 and ATM terminal 1, communication between 1394 terminal 22-1 and 1394 terminal 23-1, and communication between 1394 terminal 22-1 and 1394 terminal 22-2.

Even in the case where any one of communications is carried out, ASEL-CMEs of User side on all 1394 terminals Broadcast message of WakeUp (FIG. 15), whereby only ASEL-CME of Network side on the ATM/1394 repeater 21 receives that message. Thus, ASEL-CMEs of respective 1394 terminals inform ASEL-CME of ATM/1394 repeater 21 of the own Node Unique ID and Self ID. It is to be noted that transmission/reception of ASEL-CMP message (FIG. 14) is carried out in a closed manner only between ASEL-CMEs of Network side and User side opposite to each other through ASEL-CMI (FIG. 11), and is terminated by ASEL-CMEs of both ends. For this reason, (control procedure of) such message is not incorporated in the protocol stacks of FIGS. 54 and 55.

When ASEL-CME of the ATM/1394 repeater 21 receives WakeUp (FIG. 15), it assigns new ASEL-UNI ID thereto to register such ASEL-UNI ID in a manner related to 1394 Bus Index, and Node Unique ID and Self ID of User side. Then, the above-mentioned ASEL-CME transmits ActReq (FIG. 16) to ASEL-CMEs of respective 1394 terminals to make request for starting of respective ASEL-CMEs of the User side and to make request for registration of Node Unique ID and Self ID of Network side.

ASEL-CMEs of respective 1394 terminals carry out registration in correspondence with such request to carry out transition to Active status to transmit ActAck (FIG. 17) to ASEL-CME of the ATM/1394 repeater 21. Thus, both terminals and the repeater are brought into Active status.

When transition to Active status is carried out, MASEL_Act.Ind primitive is issued with respect to the ASEL layer management from the ASEL-CME. Thus, the ASEL layer management recognizes activated ASEL-UNI ID and 1394 Bus Index in which that ASEL-UNI exists. Thus, the above-described processing is carried out between (ASEL-CME of) the repeater 21 and (ASEL-CMEs of) all 1394 terminals connected, whereby the ATM/1394 repeater 21 can recognize connection relationship of respective 1394 terminals with respect to corresponding 1394 serial buses.

Practical procedure of communication will now be indicated. It is now assumed that, for setting of VCC, SVC (Switched Virtual Circuit) connection by the protocol stack of FIG. 55 is used, but PVC (Permanent Virtual Circuit) connection is not used. Initially, communication between the 1394 terminal 22-1 connected to the ATM/1394 repeater 21 and the ATM terminal 1 will be described.

Data which are desired to ultimately undergo transmission/reception between the 1394 terminal 22-1 and the ATM terminal 1 are data on the U plane as shown in FIG. 54. In order to open (provide) VCC which is the connection for carrying out transmission/reception of data of this U plane, the protocol stack of the C plane of FIG. 55 is used.

In order to carry out transmission/reception of the protocol on the C plane, VPI/VCI ordinarily open (provide) in advance two kinds of VCCs using 0/5 and 0/16 every respective ASEL-UNIs and respective ATM-UNIs. In addition, ASELs 33, 34 of the ATM/1394 terminal 21 and the 1394 terminal 22-1 have a function to convert data of the standard of IEEE 1394 into data of the standard of ATM (AAL), and a function to convert data of the standard of ATM (AAL) into data of the standard of IEEE 1394 in a manner opposite to the above.

Thus, as signaling protocols 35, 36 in the ATM/1394 repeater 21 and the 1394 terminal 22-1, protocol similar to the ATM terminal 1 and the ATM network 2 can be used. By these signaling protocols, various parameters (VPI/VCI Value, AAL Type, QoS class, Transmit/Receive Bandwidth, etc.) of VCC used in the U plane of FIG. 54 are determined.

Followed by the determination of these VCC parameters, in the ATM/1394 repeater 21 and the 1394 terminal 22-1, MASEL_ConSet.req primitive is issued with respect to respective ASEL-CMEs via ASEL layer management from application programs of the signaling protocols 35, 36. In this case, the ATM/1394 repeater 21 already recognizes by the signaling protocols that the ATM terminal 1 which is the terminating point of VCC of one side does not exist in ASEL-UNIs that the ATM terminal 1 contains (accommodates).

In ASEL-CME of User side mounted in the 1394 terminal 22-1, as shown in the flowchart of FIG. 25, in the case where MASEL_ConSet.req primitive is received, various parameters included in that primitive are preserved (stored) thereafter to carry out judgment as to whether or not QoS Type is CBR.

In the case of CBR, IsoReq (FIG. 18) to make request for assignment of Isochronous channel which solves assigned VPI/VCI is transmitted to the ATM/1394 repeater 21 in which ASEL-CME is mounted of Network side. ASEL-CME of the ATM/1394 repeater 21 sends IsoReply (FIG. 19) back to the ASEL-CME of the 1394 terminal 22-1 to designate Isochronous channel thereat. In this way, Isochronous channel used between the ATM/1394 repeater 21 and the 1394 terminal 22-1 is assigned. Thus, communication channel (path) in the IEEE 1394 standard is ensured.

In the case except for CBR, DestIDReq (FIG. 20) to make request for value of Destination ID of Asynchronous packet which solves assigned VPI/VCI is transmitted to the ATM/1394 repeater 21 in which ASEL-CME is mounted of Network side. The ASEL-CME of the ATM/1394 repeater 21 sends DestIDRply (FIG. 21) back to the ASEL-CME of the 1394 terminal 22-1. Thereat, Self ID in corresponding 1394 serial bus of the ATM/1394 repeater 21 itself which is the destination node is informed. Thus, communication channel (path) in the IEEE 1394 standard is ensured.

By the above-mentioned operation, VCC is opened (provided) between the ATM terminal 1 and the 1394 terminal 22-1. Moreover, since ASELs 31, 32 of the ATM/1394 repeater 21 and the 1394 terminal 22-1 have a function to convert data of the standard of IEEE 1394 into data of the standard of ATM(AAL) and a function to convert data of the standard of ATM(AAL) into data of the standard of IEEE 1394 in a manner opposite to the above, protocol (e.g., IP/ATM) similar to the upper layer of AAL5 in the ATM terminal 1 can be used as the upper layer of ASEL 32 in the 1394 terminal 22-1.

Explanation will now be given in connection with communication between 1394 terminal 22-1 and 1394 terminal 23-1 connected to the ATM/1394 repeater 21.

Similarly to the case of communication between the ATM terminal 1 and the 1394 terminal 22-1, also between the 1394 terminal 22-1 and the 1394 terminal 23-1, in order to open (provide) VCC for carrying transmission/reception of data on the U plane as shown in FIG. 54, the protocol stack of the C plane of FIG. 55 is used. Further, as signaling protocols 35, 36 in the ATM/1394 repeater 21, the 1394 terminal 22-1 and the 1394 terminal 23-1, common protocol can be used. By these signaling protocols, various parameters (VPI/VCI Value, AAL Type, QoS class, Transmit/Receive Bandwidth, etc.) of VCC used in the U plane of FIG. 54 are determined. It is to be noted that signaling protocols 35, 36 are caused to undergo transmission/reception between the 1394 terminal 22-1 and the 1394 terminal 23-1 necessarily through the ATM/1394 repeater 21.

Followed by the determination of these VCC parameters, in the ATM/1394 repeater 21, the 1394 terminal 22-1 and the 1394 terminal 23-1, MASEL_ConSet.Req primitive is issued with respect to respective ASEL-CMEs via the ASEL layer management from application programs of the signaling protocols 35, 36. It is to be noted that, by the signaling protocols, the ATM/1394 repeater 21 already recognizes that the 1394 terminal 22-1 and the 1394 terminal 23-1 which are terminating points of both VCCs exist in ASEL-UNIs that the ATM/1394 repeater 21 itself contains (accommodates), but they are connected to 1394 serial buses different from each other.

At ASEL-CMEs of User side mounted in the 1394 terminal 22-1 and the 1394 terminal 23-1, similarly to the above-mentioned case, after MASEL_ConSet.req primitive is received, various parameters are preserved (stored). Thereafter, judgment as to whether or not QoS Type is CBR is carried out.

In the case of CBR, similarly to the above-mentioned case, respective ASEL-CMEs of the User side transmits IsoReq (FIG. 18) to make request for assignment of Isochronous channel which solves assigned VPI/VCI to the ATM/1394 repeater 21 in which ASEL-CME is mounted of the Network side. In response thereto, the ASEL-CME of the ATM/1394 repeater 21 sends IsoReply (FIG. 19) back thereto to designate Isochronous channels thereat. In this case, since those terminals are different 1394 serial buses, it is possible to respectively independently designate Isochronous channel numbers. In a manner stated above, Isochronous channels used between the ATM/1394 repeater 21 and the 1394 terminal 22-1, and between the ATM/1394 repeater 21 and the 1394 terminal 23-1 are assigned. Thus, communication channel (path) in the IEEE 1394 standard is ensured.

In the case except for CBR, similarly to the above-mentioned case, respective ASEL-CMEs of the User side transmit DestIDReq (FIG. 20) to the ATM/1394 repeater 21 in which ASEL-CME is mounted of the Network side. In response thereto, the ASEL-CME of the ATM/1394 repeater 21 sends DestIDRply (FIG. 21) back thereto. Thereat, Self IDs in respective 1394 serial buses of the ATM/1394 repeater 21 itself, which are the destination nodes, are informed. Thus, communication channel (path) in the IEEE 1394 standard is ensured.

By the above-mentioned operation, VCC is opened (provided) between the 1394 terminal 22-1 and the 1394 terminal 23-1 repeating (relaying) the ATM/1394 repeater 21. In the above-mentioned example, in this VCC, ASEL 31 of the ATM/1394 repeater 21 carries out repeat (replay) operation of data caused to undergo transmission/reception between the 1394 terminal 22-1 and the 1394 terminal 23-1 by using the function to convert data of the standard of the IEEE 1394 into data of the standard of ATM(AAL), and the function to convert data of the standard of ATM(AAL) into data of the standard of the IEEE 1394 in a manner opposite to the above.

Subsequently, explanation will be given in connection with communication between the 1394 terminal 22-1 and the 1394 terminal 22-2 connected to the ATM/1394 repeater 21.

Also in this case, in order to open (provide) VCC for carrying out transmission/reception of data on U-plane as shown in FIG. 54, the protocol stack of the C plane of FIG. 55 is used. Further, as signaling protocols 35, 36 in the ATM/1394 repeater 21, the 1394 terminal 22-1 and the 1394 terminal 22-2, common protocol can be used. By these signaling protocols, various parameters (VPI/VCI Value, AAL Type, QoS class, Transmit/Receive Bandwidth, etc.) of VCC used in the U plane of FIG. 54 are determined. It is to be noted that the signaling protocols 35, 36 are caused to undergo transmission/reception between the 1394 terminal 22-1 and the 1394 terminal 22-2 necessarily through the ATM/1394 repeater 21.

Followed by the determination of these VCC parameters, in the ATM/1394 repeater 21, the 1394 terminal 22-1 and the 1394 terminal 22-2, MASEL_ConSet.req primitive is issued with respect to respective ASEL-CMEs via ASEL layer management from application programs of the signaling protocols 35, 36. In this case, by the signaling protocols, the ATM/1394 repeater 21 already recognizes that the 1394 terminal 22-1 and the 1394 terminal 22-2 which are terminating points of both VCCs exist in ASEL-UNIs that the ATM/1394 repeater 21 itself contains (accommodates) and are connected to the same 1394 serial bus. Thus, since it is unnecessary to carry out repeat (relay) operation in regard to data on this VCC, VCC which can be caused to directly undergo transmission/reception of data between the 1394 terminal 22-1 and the 1394 terminal 22-2 is opened (provided).

At ASEL-CMEs of User side mounted in the 1394 terminal 22-1 and the 1394 terminal 22-2, similarly to the above, various parameters of MASEL_ConSet.req primitive are preserved (stored). Thereafter, judgment as to whether or not QoS Type is CBR is carried out.

In the case of CBR, similarly to the above, respective ASEL-CMEs of the User side transmit IsoReq (FIG. 18) to the ATM/1394 repeater 21 in which ASEL-CME is mounted of Network side. In response thereto, the ASEL-CME of the ATM/1394 repeater 21 sends IsoReply (FIG. 19) back thereto to designate Isochronous channel thereat. In this case, the same Isochronous channel number is designated with respect to respective ASEL-CMEs of the User side. In this instance, a way of use may be employed to designate Tag Value corresponding to the high order 2 bits of the assigned Isochronous channel so as to take (0, 1) to thereby display that corresponding channel is the channel that only ASEL 32 of User side receives. In this way, Isochronous channel used between the 1394 terminal 22-1 and the 1394 terminal 22-2 is assigned. Thus, communication channel (path) in the IEEE 1394 standard permitted to directly undergo transmission/reception of data is ensured.

In the case except for CBR, similarly to the above, respective ASEL-CMEs of the User side transmit DestIDReq (FIG. 20) to the ATM/1394 repeater 21 in which ASEL-CME is mounted of Network side. In response thereto, the ASEL-CME of the ATM/1394 repeater 21 sends DestIDRply (FIG. 21) back thereto. Thereat, the 1394 terminal 22-1 is informed of Self ID of the 1394 terminal 22-2 which is the destination node, and the 1394 terminal 22-2 is informed of Self ID of the 1394 terminal 22-1 which is the destination node. Thus, communication channel (path) in the IEEE 1394 standard permitted to directly undergo transmission/reception of data is ensured.

By the above-mentioned operation, VCC is directly opened (provided) between the 1394 terminal 22-1 and the 1394 terminal 22-2 without repeating (relaying) the ATM/1394 repeater 21. It is to be noted that, in this VCC, ASEL 31 of the ATM/1394 repeater 21 is not concerned with data caused to undergo transmission/reception between the 1394 terminal 22-1 and the 1394 terminal 23-1.

It is to be noted that since connection control primitive group (MASEL_ConSet.req, MASEL_ConRec.req, MASEL_ConSet.conf, MASEL_ConRel.req, MASEL_ConRel.conf) are included in the primitives for ASEL layer management, those primitives are issued via the ASEL layer management. However, by selecting actual software installing method, it is also possible as a matter of course to employ, e.g., embodiments such that those primitives are issued directly from application programs of the signaling protocols 35, 36, or are issued directly from the signaling protocols 35, 36 themselves.

In addition, while single ATM terminal is connected to the ATM network in the above-described embodiments, plural ATM terminals may be connected to the ATM network so that respective 1394 terminals accept offer of desired data from the plural ATM terminals.

INDUSTRIAL APPLICABILITY

In accordance with the communication control equipment and the communication control method according to this invention, since such an approach is employed to convert data of the second transmission standard received through the repeater into data of the first transmission standard, and to convert predetermined data of the first transmission standard into data of the second transmission standard, the existing signaling protocol used in accordance with the first transmission standard can be applied. Thus, the number of development steps of the system can be reduced, and the reliability can be improved.

In accordance with the communication control equipment and the communication control method according to this invention, since such an approach is employed to process, by the same signaling protocol as the signaling protocol used at the first terminal, data of the first transmission standard transmitted from the first terminal and data converted into data of the first transmission standard from the second transmission standard, which has been transmitted from the second terminal, the number of development steps of the system and the reliability can be improved.

In accordance with the communication control equipment and the communication control method according to this invention, since such an approach is employed to convert data of the first transmission standard transmitted from the first terminal into data of the second transmission standard, and to convert data of the second transmission standard transmitted from the second terminal into data of the first transmission standard; and to carry out, at the second terminal, a processing to convert data of the second transmission standard which has been caused to undergo transmission (transmitted) through the repeater into data of the first transmission standard, and to convert predetermined data of the first transmission standard into data of the second transmission standard, routing can be carried out only by connection information in the first transmission standard. For this reason, burden (load) of the repeater can be lessened. In addition, the conventional signaling protocol used in accordance with the first transmission standard can be applied between the repeater and the second terminal. Thus, the number of development steps of the system can be reduced and the reliability can be improved.

In accordance with the communication control equipment and the communication control method according to this invention, since communication channel (path) for transferring data of the transmission standard that the terminal and any other terminal carry out transmission/reception is set in advance by using predetermined control commands therebetween through the repeater or directly therebetween, burden (load) of the repeater can be lessened. In addition, transfer of data can be made substantially without intervention of the repeater.

What is claimed is:

1. A communication control equipment adapted for carrying out transmission of data transmitted from a first terminal to a second terminal through a repeater and to carry out transmission of data transmitted from the second terminal to the first terminal through the repeater, thus to control communication between the first terminal and the second terminal, wherein the repeater comprises
first converting means for converting data of a first transmission standard transmitted from the first terminal into data of a second transmission standard, and
second converting means for converting data of the second transmission standard transmitted from the second terminal into data of the first transmission standard, and wherein the second terminal comprises
third converting means for converting the data of the second transmission standard which has been caused to undergone transmission from the repeater into data of the first transmission standard, and
fourth converting means for converting predetermined data of the first transmission standard into data of the second transmission standard.

2. A communication control method for carrying out transmission of data transmitted from a first terminal to a second terminal through a repeater and to carry out transmission of data transmitted from the second terminal to the first terminal through the repeater, thus to control communication between the first terminal and the second terminal, wherein processing procedure by the repeater comprises
a step of converting the data of a first transmission standard transmitted from the first terminal into data of a second transmission standard to carry out transmission thereof to the second terminal, and
a step of converting the data of the second transmission standard from the second terminal into data of the first transmission standard to carry out transmission thereof to the first terminal, and wherein a processing procedure by the second terminal comprises
a step of converting the data of the second transmission standard which has been caused to undergo transmission through the repeater into data of the first transmission standard, and
a step of converting pre determined data of the first transmission standard into data of the second transmission standard to carry out transmission thereof to the repeater.

\* \* \* \* \*